United States Patent

Shionoya et al.

[11] Patent Number: 5,617,500
[45] Date of Patent: Apr. 1, 1997

[54] SYSTEM FOR DETECTING AN OPTICAL INFORMATION AND SCANNING MICROSCOPE SYSTEM

[75] Inventors: Takashi Shionoya, Kawasaki; Junji Ikeda, Yokohama, both of Japan

[73] Assignee: Nikon Corporation, Japan

[21] Appl. No.: 443,225

[22] Filed: May 17, 1995

[30] Foreign Application Priority Data

May 20, 1994 [JP] Japan .................................. 6-107091
Mar. 3, 1995 [JP] Japan .................................. 7-070676
Mar. 3, 1995 [JP] Japan .................................. 7-070677

[51] Int. Cl.⁶ .......................... G02B 6/10; G02B 21/00; G11B 7/00
[52] U.S. Cl. ............................ 385/132; 385/11; 385/14; 385/27; 385/28; 385/40; 359/368; 359/370; 359/371; 369/112; 369/110
[58] Field of Search .................... 385/14, 15, 28, 385/29, 11, 39, 40, 44, 45, 49, 88, 89, 129, 130, 132; 356/345; 369/112, 110; 359/368, 370, 371

[56] References Cited

U.S. PATENT DOCUMENTS

| | | | |
|---|---|---|---|
| 4,407,008 | 9/1983 | Schmidt | 356/318 X |
| 5,195,152 | 3/1993 | Gupta | 385/49 |
| 5,289,454 | 2/1994 | Mohapatra et al. | 369/112 |
| 5,389,783 | 2/1995 | Shionoya et al. | 250/234 |
| 5,432,881 | 7/1995 | Doi | 385/132 |
| 5,452,382 | 9/1995 | Shionoya et al. | 385/11 |
| 5,508,805 | 4/1996 | Muranishi et al. | 356/345 |

FOREIGN PATENT DOCUMENTS

| | | | |
|---|---|---|---|
| 0489580 | 6/1992 | European Pat. Off. | 385/132 X |
| 0620458 | 10/1994 | European Pat. Off. | 385/132 X |
| 4-208913 | 7/1992 | Japan | 385/132 X |
| 4-252444 | 9/1992 | Japan | 385/132 X |
| 4-296810 | 10/1992 | Japan | 385/132 X |
| 6-82731 | 3/1994 | Japan | 385/132 X |
| 6-160718 | 6/1994 | Japan | 385/132 X |

OTHER PUBLICATIONS

Hiroshi Ooki and Jun Iwasaki, "A novel type of laser scanning microscope: theoretical considerations", Optics Communications 85 (1991) pp. 177–182.

Primary Examiner—Brian Healy
Attorney, Agent, or Firm—Pennie & Edmonds

[57] ABSTRACT

This laser scanning microscope has a second light source for emitting second light into one of branch channel waveguides, and a third photodetector for detecting a light intensity distribution formed on the end face of the trunk channel waveguide based on the second light, and a controller for controlling the voltage to be applied from a voltage application unit to electrode on the waveguide in accordance with the output signal from the third photodetector.

25 Claims, 33 Drawing Sheets

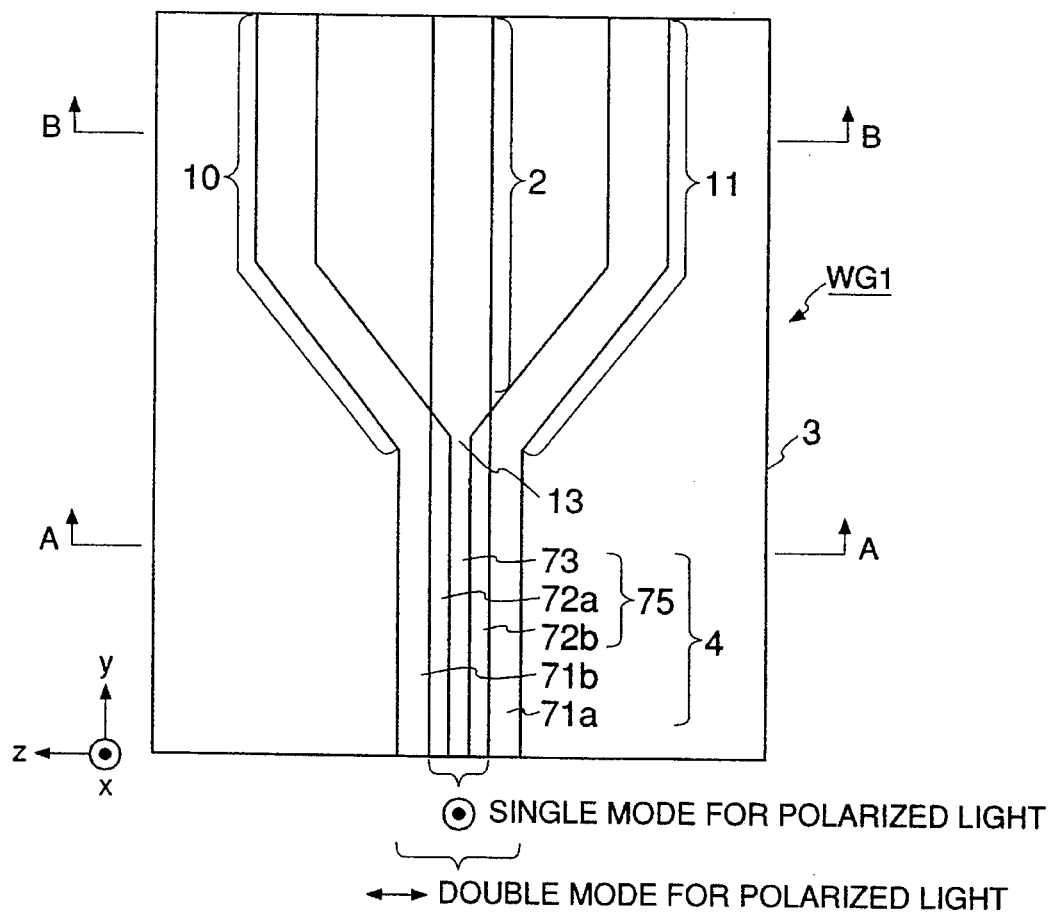
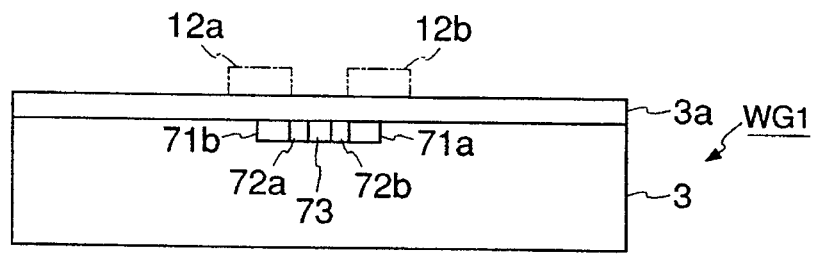
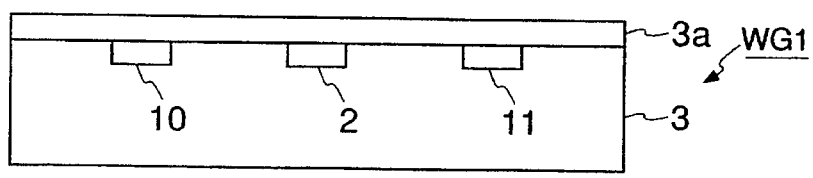

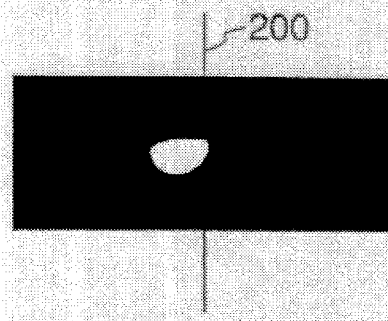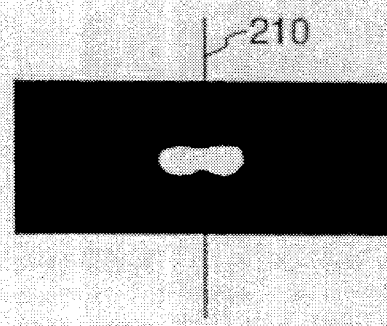

SYSTEM FOR DETECTING AN OPTICAL INFORMATION AND SCANNING MICROSCOPE SYSTEM

BACKGROUND OF THE INVENTION

1. Field of the Invention

The present invention relates to an optical information detection device for detecting the information of light incident into a double-mode channel waveguide by utilizing interference between 0th-mode light and 1st-mode light in the double-mode channel waveguide, and a mode interference type laser scanning microscope.

2. Related Background Art

In recent years, optical waveguides have received a lot of attention in various fields since an optical system can be rendered compact and lightweight using the optical waveguide, and is free from adjustment of the optical axis. The optical waveguides are classified into a single-mode waveguide (which guides light in a single mode) in which only 0th-mode light is excited on the basis of the difference between the refractive indices of an optical waveguide (core portion) and a substrate (cladding portion), and the width or refractive index distribution of the optical waveguide, a double-mode waveguide (which guides light in double modes) in which two mode light beams, i.e., 0th- and 1st-mode light beams are excited, and a multi-mode-waveguide (which guides light in multi modes) in which three or more mode light beams, i.e., 0th-, 1st-, 2nd-mode light beams, and the like are excited. In the double-mode waveguide and the multi-mode waveguide, a plurality of mode light beams are not always excited, and these waveguides are classified depending on the maximum number of mode light beams to be excited. For example, only 0th-mode light may be excited depending on the position or state of light incident into the optical waveguide.

As an application of such an optical waveguide to a new field, an optical information detection device which utilizes a mode interference phenomenon in a double-mode channel waveguide is known. This device is receiving a lot of attention from researchers in various fields as an effective device which can be used in various applications. The basic principle of the optical information detection device and an application to a mode interference type laser scanning microscope are described in detail in H. Ooki and J. Iwasaki, Opt. Commun. 85 (1991) 177–182, and Japanese Patent Laid-Open Nos. 4-208913 and 4-296810. Also, an application to an optical pickup is described in detail in Japanese Patent Laid-Open No. 4-252444.

SUMMARY OF THE INVENTION

It is an object of the present invention to provide a device for eliminating the influence of a DC drift over a long period of time.

According to this device, a mode interference type laser scanning microscope, which comprises: a first light source for irradiating first light onto an object to be detected; a focusing optical system for focusing light emitted from the first light source onto the object to be detected, and focusing light reflected by the object to be detected; a scanning device for moving the first light relative to the object to be detected; a substrate having an electrooptic effect and comprising a trunk channel waveguide which has an end face for receiving the light reflected by the object to be detected and excites only 0th-mode light or 0th-mode light and 1st-mode light, a branching portion connected to the trunk channel waveguide, and two branch channel waveguides which are connected to the trunk channel waveguide via the branching portion, and respectively guide reflected light beams branched by the branching portion; first and second photodetectors for respectively detecting the branched reflected light beams emerging from the two branch channel waveguides; and electrodes which are formed nearby the substrate and apply an electric field to the trunk channel waveguide, comprises: a second light source for irradiating second light to one of the two branch channel waveguides; and a third photodetector for detecting a light intensity distribution formed on the end face of the trunk channel waveguide based on the second light from the second light source, and outputting a signal corresponding to the detected light intensity distribution.

A device according to the present invention comprises: a trunk channel for guiding principal light incident from its one end in double modes; electrodes for generating an electric field to control a coupling length of the trunk channel; right and left branch channels connected to the other end of the trunk channel; and right and left photodetectors for detecting the principal light beams emerging from the other ends of the two branch channels, and is characterized in that a voltage V obtained by superposing an AC voltage on a DC voltage is applied to the electrodes, output signals from the right and left photodetectors are input to a main differential amplifier via right and left low-pass filters, an output signal from a calibration light intensity distribution detector is input to a calibration differential amplifier, an output signal from the calibration differential amplifier is input to band-pass filters, and the DC voltage is controlled on the basis of output signals from the band-pass filters.

According to a device of the present invention, an optical information detection device, which comprises: a trunk channel for guiding principal light incident from its one end in double modes; electrodes for generating an electric field to control a coupling length of the trunk channel; a voltage application unit for applying a voltage V to the electrodes; right and left branch channels connected to the other end of the trunk channel; right and left photodetectors for detecting the intensities of the principal light beams emerging from the other ends of the two branch channels; and a controller for detecting information included in the principal light incident on one end of the trunk channel on the basis of output signals from the two photodetectors, is characterized in that the voltage application unit applies an AC voltage V to the electrodes, and the controller picks up the outputs from the two photodetectors in synchronism with a timing at which the AC voltage V becomes equal to a prescribed value.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2A is an explanatory view showing an optical waveguide portion of the mode interference type laser scanning microscope according to the first embodiment of the present invention;

FIG. 2B is a sectional view of an optical branching device in FIG. 2A taken along arrows A—A in FIG. 2A;

FIG. 2C is a sectional view of the optical branching device in FIG. 2A taken along arrows B—B in FIG. 2A;

FIG. 6 is an explanatory view showing a light intensity pattern at the end face of an optical waveguide obtained when 0th-mode light and 1st-mode light are excited in a double-mode channel waveguide having a waveguide length suitable for measuring an amplitude object;

FIG. 7 is an explanatory view showing a light intensity pattern at the end face of an optical waveguide obtained when 0th-mode light and 1st-mode light are excited in a double-mode channel waveguide having a waveguide length suitable for measuring a phase object;

DETAILED DESCRIPTION OF THE PREFERRED EMBODIMENTS

Prior to a description of the first to sixth embodiments according to the present invention, how the invention was achieved will be explained in detail below with reference to FIG. 13.

Figure 13:
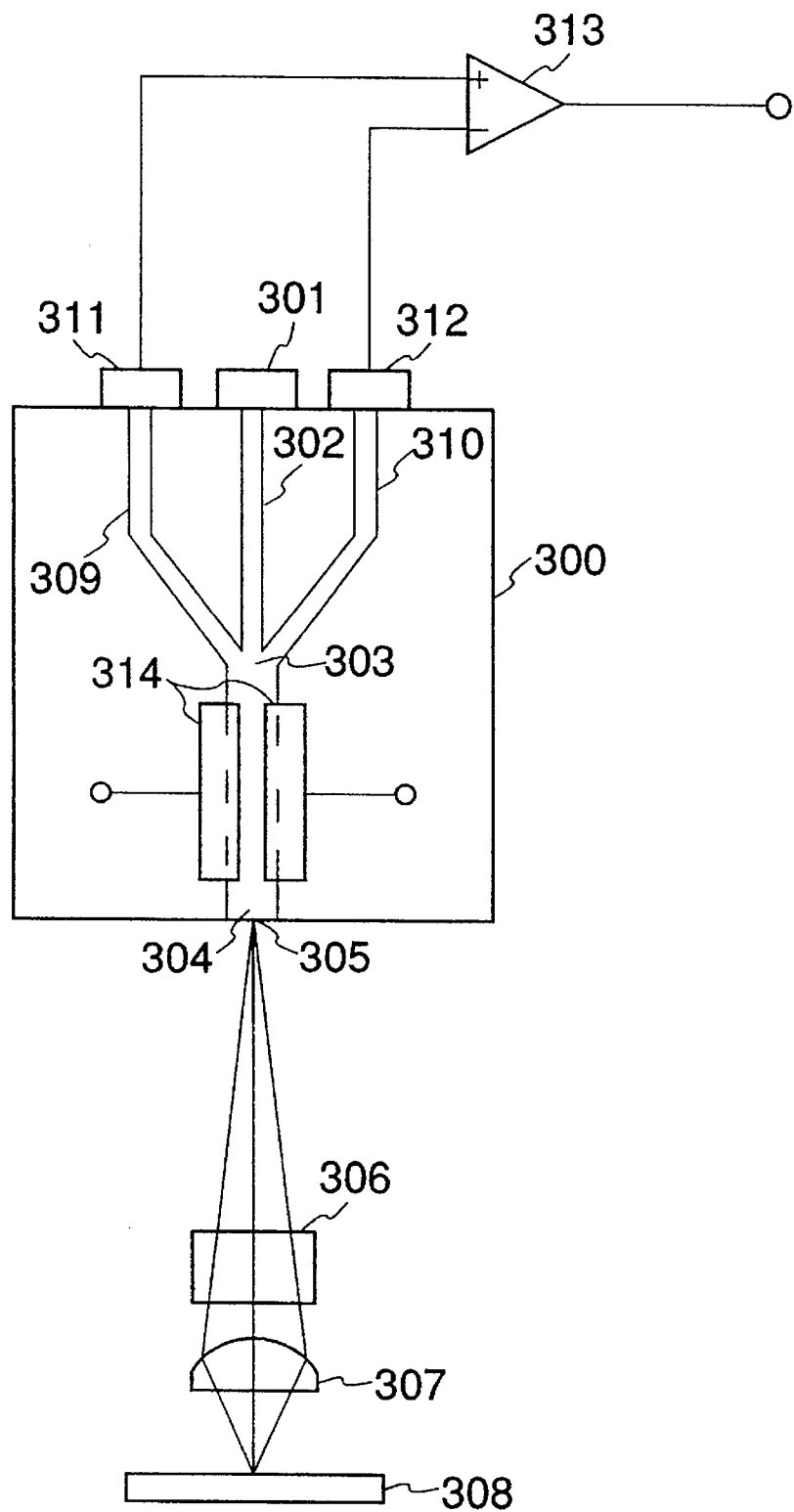
FIG. 13 is a schematic diagram showing the arrangement of a mode interference type laser scanning microscope.

FIG. 13 is a schematic diagram of a mode interference type laser scanning microscope described in Japanese Patent Laid-Open No. 4-296810. This microscope has a channel waveguide. The channel waveguide is constituted by a double-mode channel waveguide 304 having an end face 305 at the spot image position, a branching portion 303, and three single-mode channel waveguides 302, 309, and 310 connected to the double-mode channel waveguide via the branching portion. Of the three single-mode channel waveguides 302, 309, and 310, the two side single-mode channel waveguides 309 and 310 are used for guiding light propagating along the double-mode channel waveguide 304 to photodetectors 311 and 312, and the photodetectors 311 and 312 are arranged at the end faces of these waveguides. The central single-mode channel waveguide 302 is used for guiding light to be irradiated onto an object 308 to be detected, and a light source 301 for irradiating light onto the object 308 to be detected is arranged at the end face of the waveguide 302. The central single-mode channel waveguide 302 is arranged, so that its central line matches that of the double-mode channel waveguide 304.

Illumination light emitted by the light source 301 propagates along the central single-mode channel waveguide 302, then propagates along the double-mode channel waveguide 304, and emerges from the end face 305 of the double-mode channel waveguide 304. Since the central line of the central single-mode channel waveguide 302 matches that of the double-mode channel waveguide 304, light input from the central single-mode channel waveguide 302 to the double-mode channel waveguide 304 excites only 0th-mode light in the double-mode channel waveguide 304. Therefore, light emerging from the end face 305 of the double-mode channel waveguide 304 is in a single-mode state.

The light emerging from the end face 305 is focused by a focusing optical system 307, and is irradiated onto the object 308 to be detected. Light reflected by the object 308 to be detected is focused on the end face 305 of the double-mode channel waveguide 304 by the focusing optical system 307, and propagates along the double-mode channel waveguide 304. Since the incident end of the double-mode channel waveguide 304 acts as a pinhole, this microscope serves as a confocal laser scanning microscope. The reflected light propagating along the double-mode channel waveguide 304 is branched to the single-mode channel waveguides 309, 310, and 302 by the branching portion 303. The light beams propagating along the two side single-mode channel waveguides 309 and 310 are detected by the photodetectors 311 and 312.

In this case, when a region, irradiated with a laser beam, on the object 308 to be detected has a step or a change in reflectance, light reflected by the object 308 to be detected generates a gradient in its phase or amplitude distribution. For this reason, a gradient is generated in the phase or amplitude distribution of light incident on the end face 305 of the double-mode channel waveguide 304. Therefore, by detecting the gradient of the phase or amplitude distribution of light incident into the double-mode channel waveguide 304 (information detection), the step or the change in reflectance of the object to be detected can be observed. When light having a gradient in its phase or amplitude distribution is incident into the double-mode channel waveguide 304, 1st-mode light is excited in the double-mode channel waveguide 304 in addition to the 0th-mode light. For this reason, the intensity distribution of light propagating along the double-mode channel waveguide 304 changes due to interference between the two mode light beams. The light propagating along the double-mode channel waveguide 304 is branched by the branching portion 303. The two branched beams propagate along the two single-mode channel waveguides 309 and 310, and are detected by the two photodetectors 311 and 312. Thereafter, a differential detector 313 calculates the difference between the two output signals from the photodetectors 311 and 312. More specifically, the change in intensity distribution of light propagating along the double-mode channel waveguide 304 can be detected by the differential signal output from the differential detector 313. From this differential signal, a small step (phase information) or a change in reflectance (amplitude information) of the object 308 to be detected is detected. When the length (coupling length) at which the phase difference between 0th-mode light and 1st-mode light which propagate along the double-mode channel waveguide becomes 180° is represented by $L_C$, and the length of the double-mode region is represented by L, only the information of the phase distribution (phase information) of the reflected light based on the step of the object to be detected is detected when the length of the double-mode region satisfies:

$$L=L_C(2m+1)/2 \quad (m=0, 1, 2, \ldots) \tag{1}$$

and, only the information of the amplitude distribution (amplitude information) of the reflected light based on the transmittance or reflectance of the object to be detected is detected when the length of the double-mode region satisfies:

$$L = mL_C \ (m = 1, 2, \ldots) \quad (2)$$

When the length of the double-mode region is set to be a length other than equations (1) and (2), both the information of the phase distribution (phase information) and the information of the amplitude distribution (amplitude information) can be detected at a predetermined ratio. This arrangement corresponds to a mode interference system.

Note that the length of the double-mode region is the effective length of the double-mode channel waveguide 304.

Optical coupling occurs among the respective channel optical waveguides 302, 309 and 310 in a region where the distance between each two adjacent channel optical waveguides is not sufficient, and light often propagates in the double modes in such a region.

Therefore, the length of the double-mode region means a length in which light actually propagates in the double modes.

As shown in FIG. 13, when a substrate constituting the optical waveguide consists of a material such as $LiNbO_3$ or the like which has an electrooptic effect, electrodes 314 are preferably arranged in the vicinity of the double-mode channel waveguide 304 via a buffer layer. The buffer layer normally consists of $SiO_2$, $Al_2O_3$, or the like. The reason why such electrodes are arranged is that an electric field can be applied to the double-mode channel waveguide 304 by applying a voltage to the electrodes 314, thereby changing the above-mentioned coupling length. In this case, the change in coupling length corresponds to the magnitude of the electric field. More specifically, by controlling the voltage to be applied to the electrodes 314, one or both the phase information and amplitude information of the object to be detected can be arbitrarily observed even when the length of the double-mode region is constant.

An optical information detection device need only comprise the double-mode channel waveguide 304, the branching portion 303, the channel waveguides 309 and 310, and the photodetectors 311 and 312 in the arrangement of the mode interference type laser scanning microscope shown in FIG. 13. In this device, the channel waveguides 309 and 310 need not always be single-mode channel waveguides as long as they can guide light. The optical information detection device can detect the information of light incident on the end face of the double-mode channel waveguide. Information detection of light incident into the double-mode channel waveguide can be measured in the same manner as in the mode interference type laser scanning microscope. More specifically, when the length of the double-mode region is set to be a length given by equation (1), only the information of the phase distribution (phase information) of light to be subjected to information detection can be detected. On the other hand, when the length of the double-mode region is set to be a length given by equation (2), only the information of the amplitude distribution (amplitude information) of light to be subjected to information detection can be detected. Furthermore, when the length of the double-mode region is set to be a length other than equations (1) and (2), both the amplitude information and phase information of light to be subjected to information detection can be simultaneously detected at a predetermined ratio. When the length of the double-mode region is improper for information detection of light, the coupling length can be changed by controlling the voltage to be applied to electrodes as in the mode interference type laser scanning microscope.

However, when an electric field is applied to the optical waveguide using a material with an electrooptic effect such as $LiNbO_3$, $LiTaO_3$, or the like in the substrate like in the conventional optical information detection device or mode interference type laser scanning microscope, a phenomenon called a DC drift appears, and the electric field cannot be accurately applied to the optical waveguide. As described above, the optical information detection device and the mode interference type laser scanning microscope must control the electric field to be applied to the optical waveguide in accordance with an observation mode of light incident into the double-mode channel waveguide so as to accurately determine the coupling length of the double-mode region. Therefore, when an electric field is not accurately applied to the optical waveguide (double-mode channel waveguide), the coupling length of the double-mode region shifts from a predetermined length (a length suitable for optical information detection or for observing the information of an object to be detected), and the information of light incident into the double-mode channel waveguide cannot be accurately observed.

The DC drift is a phenomenon that when a voltage is applied to electrodes formed in the vicinity of the optical waveguide via the buffer layer for a long period of time, a charge moves in the substrate surface or the buffer layer arranged between the electrodes and the optical waveguide to generate a counter-electric field, and an electric field is not effectively generated in the optical waveguide. In order to eliminate the DC drift, a method of annealing (performing a heat treatment of) the buffer layer formed between the substrate and the electrodes, or the like has been proposed. However, it is difficult to eliminate the DC drift over a long period of time.

Therefore, the present invention has as its object to provide an optical information detection device, a mode interference type laser scanning microscope, and an optical information detection method, which can eliminate a DC drift over a long period of time.

The device according to the first to sixth embodiments will be briefly described below.

According to the device of the present invention, an optical information detection device, which comprises: a substrate having an electrooptic effect and comprising a trunk channel waveguide which has an end face for receiving first light and excites 0th-mode light and 1st-mode light or only 0th-mode light and guides the first light in double modes, a branching portion connected to the trunk channel waveguide, and two branch channel waveguides which are connected to the trunk channel waveguide via the branching portion, and respectively guide the first light beams branched by the branching portion; first and second photodetectors for respectively detecting the branched first light beams emerging from the two branch channel waveguides; and electrodes which are formed on the substrate and apply an electric field to the trunk channel waveguide, comprises: a light source for irradiating second light to one of the two branch channel waveguides; and a third photodetector for detecting a light intensity distribution formed on the end face of the trunk channel waveguide based on the second light from the second light source, and outputting a signal corresponding to the detected light intensity distribution.

In this case, the device preferably comprises a voltage application unit for applying a voltage to the electrodes, and a controller for controlling the voltage to be applied from the voltage application unit to the electrodes in accordance with the output signal from the third photodetector.

A mode interference type laser scanning microscope, which comprises: a first light source for irradiating first light onto an object to be detected; a focusing optical system for focusing light emitted from the first light source onto the object to be detected, and focusing light reflected by the object to be detected; a scanning device for moving the first light relative to the object to be detected; a substrate having an electrooptic effect and comprising a trunk channel waveguide which has an end face for receiving the light reflected by the object to be detected and excites only 0th-mode light or 0th-mode light and 1st-mode light, a branching portion connected to the trunk channel waveguide, and two branch channel waveguides which are connected to the trunk channel waveguide via the branching portion, and respectively guide reflected light beams branched by the branching portion; first and second photodetectors for respectively detecting the branched reflected light beams emerging from the two branch channel waveguides; and electrodes which are formed on the substrate and apply an electric field to the trunk channel waveguide, comprises: a second light source for irradiating second light to one of the two branch channel waveguides; and a third photodetector for detecting a light intensity distribution formed on the end face of the trunk channel waveguide based on the second light from the second light source, and outputting a signal corresponding to the detected light intensity distribution.

In this case, the microscope preferably comprises a central branch channel waveguide which is arranged between the two branch channel waveguides, and guide light from the first light source in a single mode to guide the first light from the first light source to the trunk channel waveguide.

In this case, preferably, the trunk channel waveguide consists of a material having refractive index anisotropy to serve as a single-mode channel waveguide for linearly polarized light in a direction a of polarization and to serve as a double-mode channel waveguide for linearly polarized light in a direction b (for a≠b) of polarization, the first light emitted by the first light source is linearly polarized light in the direction a of polarization, the second light emitted by the second light source is linearly polarized light in the direction b of polarization, the central branch channel waveguide and the trunk channel waveguide guide the first light, which is emitted by the first light source and is linearly polarized light in the direction a of polarization, in a single mode, and a polarization conversion member for converting the direction of polarization of light is arranged between the trunk channel waveguide and an object to be detected.

In these cases, preferably, the trunk channel waveguide consists of three or more materials, and one of the three or more materials serves as a core portion for one of light beams in the directions a and b of polarization and serves as a cladding portion for the other light beam.

In these cases, preferably, the central branch channel waveguide comprises a return light prevention member for preventing light in the direction b of polarization, which is incident from the end face of the trunk channel waveguide, from propagating along the central branch channel waveguide and becoming incident on the first light source.

In these cases, preferably, the microscope comprises a power distributor connected to one of the two branch channel waveguides, and two channel waveguides connected to the power distributor, one of the first and second photodetectors for detecting light emerging from the channel waveguide is arranged in one of the two channel waveguides, and the second light source for irradiating the second light is arranged in the other channel waveguide of the two channel waveguides.

In these cases, preferably, the trunk channel waveguide consists of an $LiNbO_3$ single crystal, a transition metal-diffused $LiNbO_3$ single crystal, and a proton-exchanged $LiNbO_3$ single crystal, the $LiNbO_3$ single crystal serves as a cladding portion for light beams in the directions a and b of polarization, the transition metal-diffused $LiNbO_3$ single crystal serves as a core portion for light beams in the directions a and b of polarization, and the proton-exchanged single crystal serves as a cladding portion for light in the direction a of polarization and as a core portion for light in the direction b of polarization.

In these cases, preferably, the microscope comprises a voltage application unit for applying a voltage to the electrodes, and a controller for receiving the signal from the third photodetector and controlling the value of the voltage to be applied from the voltage application unit to the electrodes in correspondence with a change in signal.

In an optical information detection method, which comprises the steps of: irradiating first light onto a double-mode channel waveguide; branching the first light propagating along the double-mode channel waveguide into two branch channel waveguides; detecting light beams emerging from the two branch channel waveguides; detecting an intensity distribution of the light propagating along the double-mode channel waveguide; and arbitrarily detecting phase or amplitude information, or both the phase information and amplitude information of the first light incident into the double-mode channel waveguide by applying an electric field to the double-mode channel waveguide, comprises the steps of irradiating second light from one of the two branch channel waveguides; and controlling the electric field to be applied to the double-mode channel waveguide, so that an intensity distribution of the second light emerging from the double-mode channel waveguide becomes constant.

The conventional microscope, as shown in FIG. 13, can detect one or both of phase information and amplitude information by changing the voltage to be applied to the electrodes 314. However, even when a predetermined voltage is applied to the electrodes 314 to set the refractive index of the optical waveguide to be a predetermined refractive index, so that the length of the double-mode region satisfies equation (1), i.e., the length of the coupling length is set to be a predetermined length, the strength of the electric field to be applied to the optical waveguide changes as time elapses due to a DC drift. As a result, the coupling length shifts from the predetermined length, and the length of the double-mode region does not satisfy equation (1).

The present inventors found that the use of a method described in japanese Patent Laid-Open No. 6-82731 as a method of adjusting the voltage to be applied to a waveguide device used in a mode interference type laser scanning microscope is effective in controlling a DC drift. According to the method described in Japanese Patent Laid-Open No. 6-82731, in an optical waveguide device which comprises, on a substrate having an electrooptic effect, a double-mode channel waveguide and two single-mode channel waveguides connected to the double-mode channel waveguide via a branching portion, light is incident from one of the two single-mode channel waveguides to excite 0th-mode light and 1st-mode light in the double-mode channel waveguide, the two mode light beams propagate along the double-mode channel waveguide while interfering with each other, and the light intensity pattern at the end face of the double-mode channel waveguide at that time is observed via a television camera, or the like, thereby adjusting the voltage to be applied to electrodes in the vicinity of the double-mode channel waveguide, and obtaining voltage values when the double-mode region satisfies equations (1) and (2). FIG. 7 shows the intensity pattern of light at the exit end of the double-mode channel waveguide when equation (1) is satisfied, and FIG. 6 shows the intensity pattern of light at the exit end of the double-mode channel waveguide when equation (2) is satisfied.

The invention described in Japanese Patent Laid-Open No. 6-82731 obtains the voltage values when the double-mode region satisfies equations (1) and (2). The present invention controls the electric field to be applied to the double-mode channel waveguide to be a constant electric field by utilizing this method. More specifically, in the conventional optical information detection device and mode interference type laser scanning microscope, a second light source for irradiating second light onto one of the two side branch channel waveguides for detecting the intensity distribution of light propagating along the double-mode channel waveguide is arranged. A third photodetector detects the intensity distribution pattern obtained when the second light emitted by the second light source emerges from the end face of the double-mode channel waveguide. Then, by controlling the voltage to be applied to the electrodes to obtain a constant intensity distribution pattern, a DC drift can be controlled. Therefore, according to the present invention, since the influence of the DC drift can be eliminated over a long period of time while detecting the information of light incident into the double-mode channel waveguide, information detection of light incident into the double-mode channel waveguide can be accurately performed.

The above-mentioned device will be described in detail below with reference to the accompanying drawings.

Figure 1:
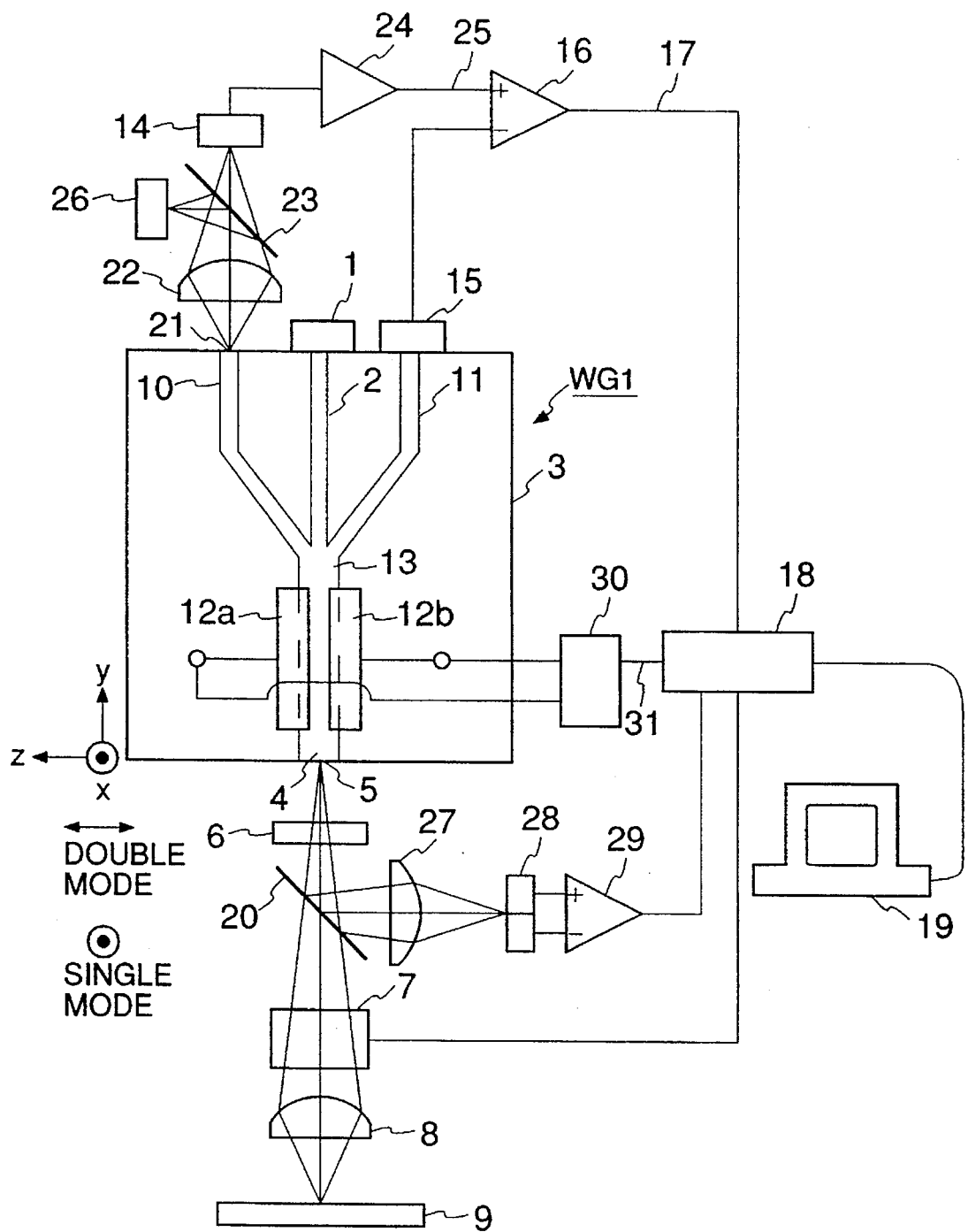
FIG. 1 is a schematic diagram showing a mode interference type laser scanning microscope according to the first embodiment of the present invention.

FIG. 1 is a schematic diagram showing a mode interference type laser scanning microscope according to the first embodiment of the present invention.

In this mode interference type laser scanning microscope, two light sources are arranged: a first light source 1 is a laser beam source 1 for irradiating first light onto an object 9 to be detected, and a second light source 26 is a laser beam source 26 for emitting second light for controlling a DC drift which is generated by generating an electric field in a trunk channel waveguide 4 upon application of a predetermined voltage to electrodes 12a and 12b. An optical branching device WG1 comprises a channel waveguide for guiding light beams emitted by the laser beam sources 1 and 26, and light reflected by the object 9 to be detected. The channel waveguide is formed on an $LiNbO_3$ substrate 3, and is constituted by the trunk channel waveguide 4, a branching portion 13, and branch channel waveguides 2, 10, and 11. The trunk channel waveguide 4 consists of a material having refractive index anisotropy to serve as a single-mode channel waveguide for linearly polarized light in a direction a of polarization (polarized light in a direction x of depth of the optical waveguide) and to serve as a double-mode channel waveguide for linearly polarized light in a direction b of polarization (polarized light in the widthwise direction of the optical waveguide). The central branch channel waveguide 2 serves as a single-mode channel waveguide for both linearly polarized light beams in the directions a (polarized light in the direction x of depth of the optical waveguide) and b (polarized light in the widthwise direction of the optical waveguide). The widthwise direction of the optical waveguide is a direction perpendicular to the direction x of depth of the optical waveguide and the optical axis of the optical waveguide. The branch channel waveguides 10 and 11 serve as single-mode waveguides for linearly polarized light in the direction b of polarization (polarized light in the widthwise direction of the optical waveguide), and do not serve as an optical waveguide for light in the direction a of polarization (polarized light in the widthwise direction of the optical waveguide). The microscope also comprises photodetectors 14 and 15 (first and second photodetectors) for detecting light reflected by the object 9 to be detected, and a photodetector 28 (third photodetector) for detecting the intensity distribution of light emerging from the trunk channel waveguide 4.

The laser beam source 1 (first light source) is a light source for emitting linearly polarized light (first light) in the direction a of polarization (polarized light in the direction of depth of the optical waveguide), and is arranged at the end face of the central branch channel waveguide 2 to maximize the coupling efficiency of light. The central branch channel waveguide 2 is formed to serve as a single-mode channel waveguide for linearly polarized light (first light) in the direction a of polarization, which light is emitted by the laser beam source 1 (first light source). Light (first light) emitted by the laser beam source 1 (first light source) propagates along the central branch channel waveguide 2 and the trunk channel waveguide 4, and emerges from an end face 5 of the trunk channel waveguide 4. The trunk channel waveguide 4 has the optical path changeable. Since the light (first light) emitted by the laser beam source 1 (first light source) has the direction a of polarization (i.e., is polarized light in the direction of depth of the optical waveguide), when the light propagates along the trunk channel waveguide 4, the trunk channel waveguide 4 serves as a single-mode channel waveguide for the first light from the laser beam source 1, and only 0th-mode light is excited in the trunk channel waveguide 4.

A quarter-wave plate 6 (polarization conversion member), a beam splitter 20, and an X-Y two-dimensional scanner 7 (scanning device), and an objective lens 8 are arranged in the order named between the substrate 3 and the object 9 to be detected. The light emerging from the end face 5 of the trunk channel waveguide 4 is converted from linearly polarized light into circularly polarized light by the quarter-wave plate 6 (polarization conversion member). Thereafter, the converted light is transmitted through the beam splitter 20 and is scanned by the X-Y two-dimensional scanner 7 (scanning device), and is focused on the object 9 to be detected by focusing optical system 8. The optical system constituted by the above-mentioned members also serves as an optical system for converting circularly polarized light reflected by the object 9 to be detected into linearly polarized light in the direction b of polarization (in the widthwise direction of the optical waveguide) perpendicular to the direction of polarization of illumination light (the light emitted by the laser beam source 1 and emerging from the end face 5 of the trunk channel waveguide 4), and focusing the converted light onto the end face 5 of the trunk channel waveguide 4. The light (first light) reflected by the object 9 to be detected is incident on the end face 5 of the trunk channel waveguide 4, and propagates along the trunk channel waveguide 4. Thereafter, the light is branched, and propagates along the two side branch channel waveguides 10 and 11 of the three branch channel waveguides. The photodetector 15 (second photodetector) is arranged at the end face of the branch channel waveguide, and detects the intensity of the propagating light, In this case, since the reflected light (first light) propagating along the trunk channel waveguide 4 is converted into linearly polarized light in the direction b of polarization (polarized light in the widthwise direction of the optical waveguide) upon being transmitted through the quarter-wave plate 6 (polarization conversion member), the trunk channel waveguide 4 serves as a double-mode channel waveguide for the reflected light (first light). The light emerging from an end face 21 of the branch channel waveguide 10 is focused on the photodetector 14 (first photodetector) via a focusing lens 22 and a beam splitter 23, and the photodetector 14 (first photodetector) detects the intensity of the focused light. The photodetectors 14 and 15 (first and second photodetectors) are connected to a differential detector 16 for detecting the difference between the light amounts. An amplifier 24 is connected between the photodetector 14 (first photodetector) and the differential detector 16, and compensates for a light amount corresponding to some lost light components which emerge from the branch channel waveguide 10 and are reflected by the beam splitter 23. This compensation is performed so that the two optical signals input to the differential detector 16 have the same intensity when light beams with equal light amounts propagate through the branch channel waveguides 10 and 11. The output signal from the differential detector 16 is input to a controller 18 via a signal line 17. The controller 181 and the X-Y two-dimensional scanner 7 (scanning device) are electrically connected to each other, and the position information of a light spot irradiated from the scanner 7 onto the object (sample) 9 is input from the scanner 7 to the controller 18. The controller 18 synthesizes differential images of the object 9 to be detected, which images are input to the controller via the signal line 17, and displays the synthesized image on a monitor 19.

Figure 8:
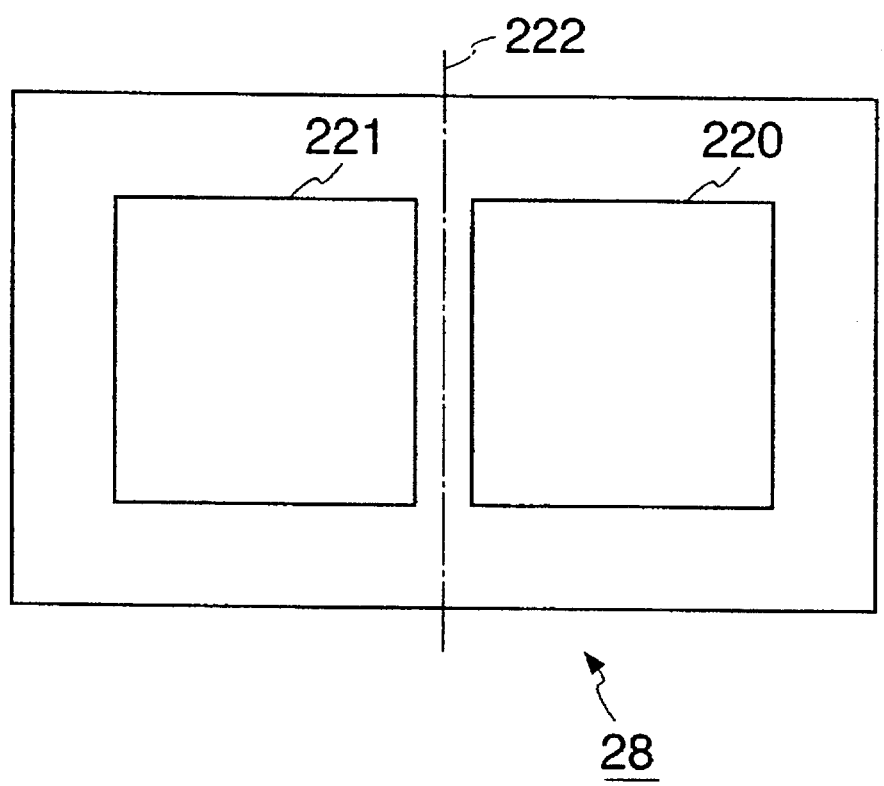
FIG. 8 is an explanatory view showing the arrangement of the light-receiving surfaces of a two-split photodiode.

The laser beam source 26 (second light source) is a light source for emitting linearly polarized light in the direction b of polarization (polarized light in the widthwise direction of the optical waveguide), and light emitted by the laser beam source 26 (second light source) is reflected by the beam splitter 23. The reflected light is focused by the focusing lens 22, and is incident into the branch channel waveguide 10 via the end face 21. The light guided along the branch channel waveguide 10 propagates along the trunk channel waveguide 4 via the branching portion 13. As described above, since the trunk channel waveguide 4 serves as a double-mode channel waveguide for linearly polarized light in the direction b of polarization (polarized light in the widthwise direction of the optical waveguide), and this light is incident into the trunk channel waveguide 4 from a position offset from the center of the trunk channel waveguide 4, both the 0th-mode light 1st-mode light are excited in the trunk channel waveguide 4. The two mode light beams interfere with each other when they propagate along the trunk channel waveguide 4. The pattern of the intensity distribution of light at the end face 5 of the trunk channel waveguide 4 changes depending on the voltage to be applied to the electrodes 12a and 12b. The light emitted by the light source 26 and emerging from the end face 5 of the trunk channel waveguide 4 is converted from linearly polarized light into circularly polarized light by the quarter-wave plate 6 (polarization conversion member), and the converted light is reflected by the beam splitter 20. The reflected light is focused on the two-split photodiode 28 (third photodetector) by a focusing lens 27. FIG. 8 shows the structure of the light-receiving surfaces of the two-split photodiode 28. On the light-receiving surfaces of the two-split photodiode 28 (third photodetector), a pattern image of the intensity distribution of light at the end face 5 of the trunk channel waveguide 4 is formed. The photodiode 28 is arranged, so that an image of the center of the trunk channel waveguide 4 on the photodiode 28 overlaps (preferably, coincides with) a boundary 222 between two light-receiving surfaces 220 and 221 of the two-split photodiode 28 (third photodetector). The two-split photodiode 28 (third photodetector) is connected to a differential detector 29 for obtaining the difference between the light amounts on the two light-receiving surfaces. A signal output from the differential detector 29 is input to the controller 18.

Figure 11:
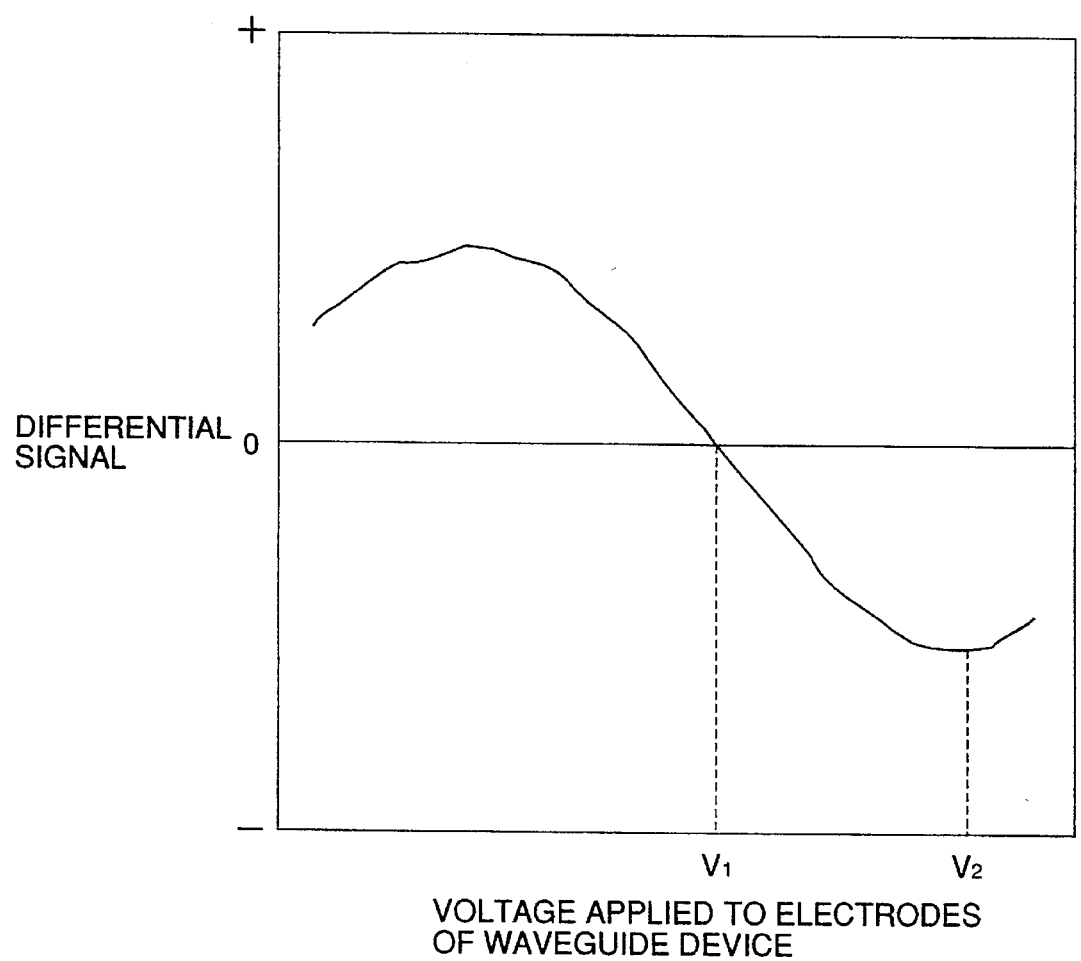
FIG. 11 is a graph for explaining the relationship between the voltage to be applied to electrodes and the differential signal from a differential detector which receives two signals output from a two-split photodiode.
Figure 12:
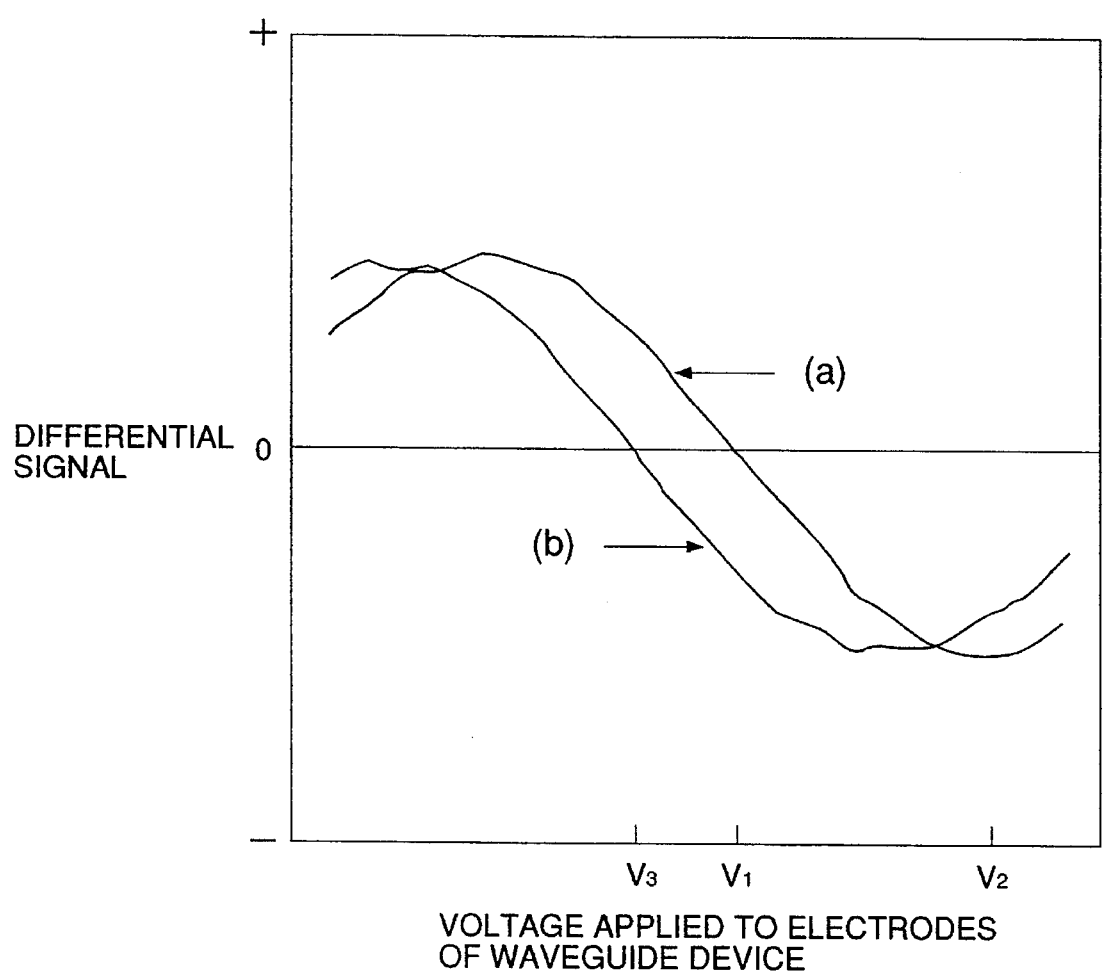
FIG. 12 is a graph showing a change in relationship between the voltage to be applied to the electrodes and the differential signal from the differential detector which receives two signals output from the two-split photodiode when a DC drift occurs.

FIG. 11 shows the relationship between the voltage to be applied to the electrodes 12a and 12b, and the differential signal output from the differential detector 29. For example, when a voltage ($V_1$) suitable for observing a differential image associated with phase information is applied, the light intensity pattern shown in FIG. 7 is obtained, and the signal output from the differential detector becomes zero. However, when a DC drift has occurred, since the refractive index of the optical waveguide 4 changes, the coupling length changes, as described above, the length of the double-mode region 4 does not satisfy the condition given by equation (1), and the pattern of the intensity distribution of light at the end face 5 of the trunk channel waveguide 4, which pattern is formed on the light-receiving surfaces of the two-split photodiode 28 (third photodetector), changes, and the differential signal obtained at the voltage $V_1$ shifts from zero. Therefore, when the differential signal obtained when the voltage to be applied to the electrodes 12a and 12b is $V_1$ shifts from zero, it is determined that a DC drift has occurred. FIG. 12 shows the relationships between the voltage to be applied to the electrodes 12a and 12b and the differential signal output from the differential detector 29 obtained when the DC drift has occurred and when no DC drift occurs. Referring to FIG. 12, a curve (a) represents the relationship obtained when no DC drift occurs, and a curve (b) represents the relationship obtained when a DC drift occurs. As can be seen from FIG. 12, the voltage suitable for observing a differential image associated with phase information changes from $V_1$ to $V_3$. The differential signal from the differential detector 29 is input to the controller 18, and the controller 18 outputs a control signal for controlling the output voltage of a voltage application unit 30 to the voltage application unit 30 via a signal line 31 in correspondence with the differential signal. When the differential signal shifts from zero, the controller 18 outputs a control signal via the signal line 31 to change the voltage output from the voltage application unit 30, thereby changing the coupling length of the double-mode region, so that the length of the double-mode region satisfies equation (1). When another length of the double-mode region is selected, the coupling length can be similarly corrected. For example, the voltage is adjusted upon observation of the object to be detected, the intensity pattern of light emerging from the end face 5 of the trunk channel waveguide 4 at that time is detected by the photodiode 28 (third photodetector), and the signal output from the differential detector 29 at that time is stored in, e.g., the controller 18. Then, the voltage to be applied to the electrodes 12a and 12b can be controlled, so that the signal output from the differential detector 29, which changes due to the DC drift, has the same level as that of the stored signal. In this case, DC drift control may be performed all the time or may be performed at a predetermined time interval.

Upon observation of, e.g., an amplitude object, the following operation may be performed. The voltage applied upon observation of an amplitude object is a voltage $V_2$ in FIG. 11. This voltage does not correspond to the differential signal=0 unlike $V_1$. For this reason, each time images for, e.g., one frame are fetched, the voltage to be applied to the electrodes 12a and 12b is changed by $|V_1-V_2|$, and the voltage output from the voltage application unit 30 is controlled to attain the above-mentioned DC drift control. After the control, the voltage to be output from the voltage application unit 30 is changed by $|V_1-V_2|$ to obtain a voltage suitable for observation of an amplitude object. As can be seen from FIG. 12, the difference $|V_1-V_2|$ between voltages suitable for observation of phase and amplitude objects undergoes almost no change even when a DC drift has occurred. This method can be applied not only to observation of an amplitude object but also observation of both phase and amplitude objects. In this case, the voltage ($V_4$) to be applied initially is detected, and thereafter, the voltage is changed by $|V_1-V_4|$ to attain the same control as the DC drift control for a phase object. The DC drift control is not limited to the above-mentioned method, and the voltage to be applied to the electrodes 12a and 12b need only be controlled, so that the pattern of the intensity distribution of light emerging from the end face 5 of the trunk channel waveguide 4 becomes constant. For example, at the beginning of observation of the object 9 to be detected, the pattern of the intensity distribution of light emerging from the exit end face 5 of the double-mode channel waveguide 4 may be detected by the photodiode 28 (third photodetector), the photodiode 28 (third photodetector) may be moved so that the differential signal of signals output from the photodiode 28 (third photodetector) becomes zero, observation of the object to be detected may be started from this state, and the voltage to be applied to the electrodes 12a and 12b may be controlled, so that the differential signal of signals output from the photodiode 28 (third photodetector) becomes zero.

Note that the two-split photodiode 28 (third photodetector) also receives light (first light) emitted by the laser beam source 1 (first light source). However, as described above, since the trunk channel waveguide 4 serves as a single-mode channel waveguide for the light (first light) from the laser beam source 1 (first light source), it outputs only 0th-mode light. When only the 0th-mode light is output, even when the voltage to be applied to the electrodes 12a and 12b changes, the pattern of the intensity distribution of light at the end face 5 of the trunk channel waveguide 4 is left unchanged, and the differential signal from the differential detector 29 always remains the same in the presence of this light (first light). For this reason, the light (first light) emitted by the laser beam source 1 (first light source) does not influence the DC drift control at all. On the other hand, of light (first light) which is emitted by the laser beam source 1 (first light source) and is reflected by the object 9 to be detected, some light components propagating along the branch channel waveguide 10 are reflected by the beam splitter 23 and are incident on the laser beam source 26 (second light source). However, since the laser beam sources 1 and 26 (first and second light sources) are different laser beam sources, the light (first light) emitted by the laser beam source 1 (first light source) does not influence the laser beam source 26 (second light source) at all. On the contrary, some light components of light (second light emitted by the laser beam source 26 (second light source) are transmitted through the beam splitter 20 and are irradiated onto the object 9 to be detected. The light (second light) reflected by the object 9 to be detected is converted into linearly polarized light (second light) in the direction a of polarization (polarized light in the direction of depth of the optical waveguide) upon being transmitted through the quarter-wave plate 6 (polarization conversion member). For this reason, the trunk channel waveguide 4 serves as a single-mode channel waveguide for linearly polarized light (second light) in the direction a of polarization, and light propagates through the central branch channel waveguide 2 of the three branch channel waveguides 10, 2, and 11 but does not propagate through the branch channel waveguides 10 and 11. Thus, this light does not influence an image to be observed by the microscope at all. Light (second light) propagating along the central branch channel waveguide 2 is incident on the laser beam source 1 first light source). However, since the laser beam sources 1 and 26 (first and second light sources) are different laser beam sources, the light (second light) emitted by the laser beam source 26 (second light source) does not influence the laser beam source 1 (first light source) at all.

The arrangement of the waveguides 4, 10, 2, and 11 formed on the substrate 3 will be described below with reference to FIGS. 2A, 2B, and 2C. In this embodiment, the laser beam source 1 comprises a semiconductor laser. The substrate 3 consists of an x-cut, y-propagation $LiNbO_3$ single crystal. As shown in FIGS. 2A to 2C, the trunk channel waveguide 4 is constituted by Ti-diffused, proton-exchanged $LiNbO_3$ regions 72a and 72b, and proton-exchanged $LiNbO_3$ regions 71a and 71b to have a Ti-diffused $LiNbO_3$ region 73 as a central region. The central branch channel waveguide 2 consists of Ti-diffused $LiNbO_3$. The branch channel waveguides 10 and 11 consist of proton-exchanged $LiNbO_3$. A buffer layer 3a is formed on the substrate 3. The buffer layer 3a consists of an insulating member such as $Al_2O_3$, $SiO_2$, or the like. Of methods of forming an optical waveguide on a substrate consisting of an $LiNbO_3$ single crystal, a Ti diffusion method and a proton exchange method are popular. When Ti is diffused in an $LiNbO_3$ single crystal, the refractive indices increase for both ordinary and extraordinary rays. In the first embodiment, since the crystal orientation is x-cut, y-propagation, linearly polarized light having the direction b of polarization in the widthwise direction (z-direction) of the waveguide becomes extraordinary rays, and linearly polarized light having the direction a of polarization in the direction of depth (x-direction) of the waveguide becomes ordinary rays. On the other hand, when this $LiNbO_3$ single crystal is proton-exchanged, the refractive index for extraordinary rays increases more than that obtained by Ti diffusion, but the refractive index for ordinary rays slightly decreases. The refractive index of the proton-exchanged $LiNbO_3$ decreases by annealing (heat treatment) after proton exchange. The central branch channel waveguide 2 manufactured by Ti diffusion is a single-mode linear waveguide for both extraordinary and ordinary rays. In the proton-exchanged $LiNbO_3$ regions 71a and 71b of the trunk channel waveguide 4, since only the refractive index for extraordinary rays (polarized light in the widthwise direction of the optical waveguide) increases, the trunk channel waveguide 4 is a double-mode channel waveguide which guides extraordinary rays by the regions 71a, 71b, 72a, 72b, and 73. On the other hand, the trunk channel waveguide 4 guides ordinary rays (polarized light in the direction of depth of the optical waveguide) by only the regions 72a, 72b, and 73, and serves as a single-mode channel waveguide in this case. In this manner, the trunk channel waveguide 4 serves as a double-mode channel waveguide for linearly polarized light (extraordinary rays) in the widthwise direction of the optical waveguide, but as a single-mode channel waveguide for linearly polarized light (ordinary rays) in the direction of depth of the optical waveguide. In the first embodiment, the laser beam source 1 is arranged, so that the direction a of polarization of light (first light) emitted by the laser beam source (first light source) matches the direction of depth of the trunk channel waveguide 4. The direction of polarization of light (first light) reflected by the object 9 to be detected is converted into the direction b of polarization matching the widthwise direction (z) of the trunk channel waveguide 4 by the quarter-wave plate 6 (polarization conversion member), and the converted light is incident into the trunk channel waveguide 4. With this structure, the trunk channel waveguide 4 always guides illumination light (first light) emitted by the laser beam source 1 (first light source) in the 0th mode, and outputs it from the end face 5. Since the light (first light) propagating in the 0th mode emerges from the end face in a single-mode state, the light (first light) reflected by the object 9 to be detected includes only differential information of the object 9 to be detected. Since both the central branch channel waveguide 2 and the trunk channel waveguide 4 serve as single-mode channel waveguides for illumination light (first light), they need only be connected with precision high enough to efficiently transfer the light amount. For this reason, the branching portion 13 on the substrate 3 can be easily formed. Since the trunk channel waveguide 4 serves as a double-mode channel waveguide for light (first light) reflected by the object 9 to be detected, the differential information of the object 9 to be detected can be extracted from the reflected light (first light) by branching the light (first .light) propagating along the waveguide 4 into the branch channel waveguides 10 and 11.

Figure 14A:
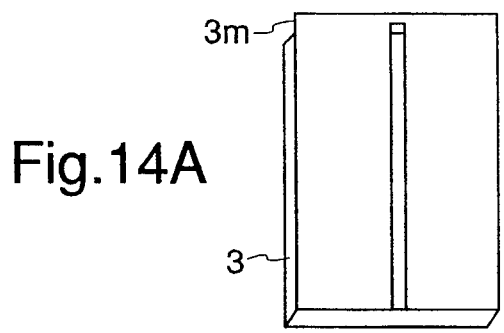
FIGS. 14A to 14G are views for explaining the method of manufacturing an optical branching device.
Figure 14E:
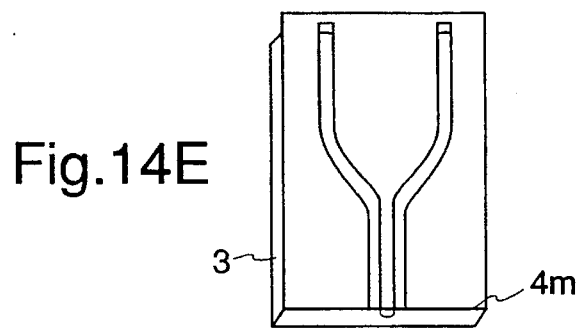
Figure 14B:
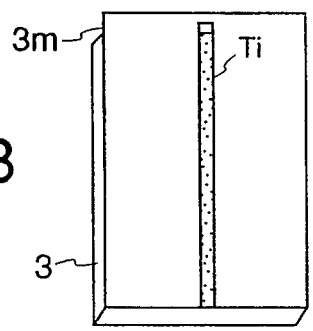
Figure 14F:
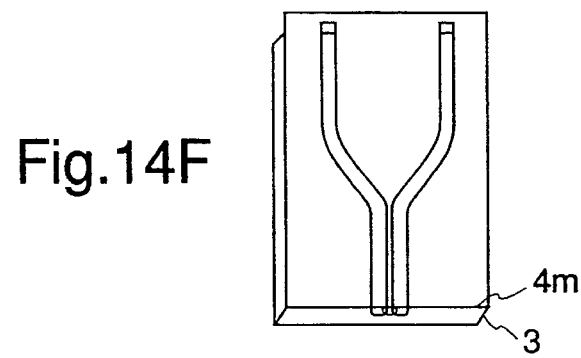
Figure 14C:
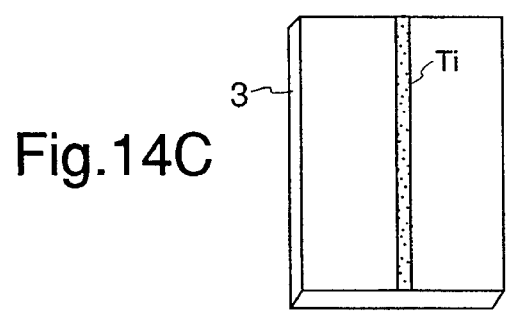
Figure 14G:
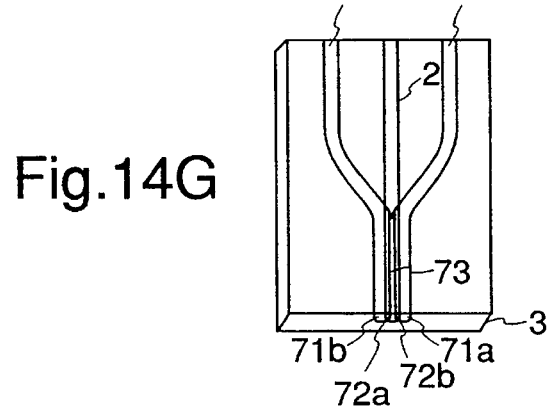
Figure 14D:
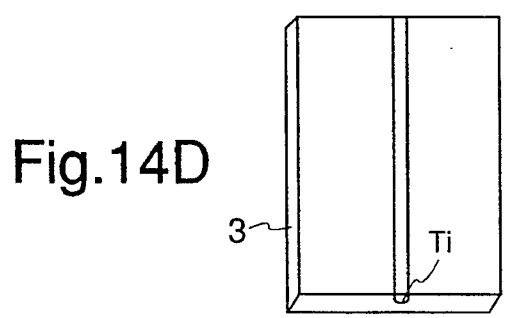

A method of manufacturing the channel waveguides 4, 10, 2, and 11 on the LiNbO$_3$ substrate 3 will be described below with reference to FIGS. 14A to 14G. A mask 3*m* is formed on the substrate 3, so that a region extending along the x-direction on the LiNbO$_3$ substrate 3 is exposed (FIG. 14A). Titanium (Ti) is deposited on the exposed region on the substrate (FIG. 14B). The mask 3*m* is removed from the substrate 3 (FIG. 14C). Furthermore, the substrate 3 is heated at a high temperature of 1,000° C. or higher to diffuse Ti into the substrate 3 (FIG. 14D). More specifically, Ti is diffused in a region of the central branch channel waveguide 2, and the regions 73, 72*a*, and 72*b* of the trunk channel waveguide 4 on the LiNbO$_3$ substrate 3 by a thermal diffusion method. In the thermal diffusion method, Ti is deposited on the above-mentioned regions on the substrate 3, and the resultant structure is heated in a high-temperature furnace for a predetermined period of time to diffuse the deposited Ti into the LiNbO$_3$ substrate 3, thereby forming Ti-diffused LiNbO$_3$ single crystal regions. Then, a metal mask 4*m* is arranged, as shown in FIG. 14E, and an acidic solution such as a pyrophosphoric acid is poured onto the exposed region on the substrate 3, thereby exchanging Li ions in this region with H ions (FIG. 14F). That is, proton exchange is performed on regions of the two side branch channel waveguides 10 and 11, and the regions 71*a*, 71*b*, 72*a*, and 72*b* of the trunk channel waveguide 4 on the LiNbO$_3$ substrate 3. More specifically, a portion other than the above-mentioned regions 71*a*, 71*b*, 72*a*, and 72*b* is masked, and the substrate 3 is dipped into a solution to exchange Li ions in the substrate 3 with H ions (protons) in the solution, thereby forming a high-refractive index layer near the surface of the substrate 3. As the solution, benzoic acid, silver nitrate, pyrophosphoric acid, or the like is used. Thereafter, the mask is removed, and the substrate is subjected to annealing (heat treatment) under predetermined conditions, thereby changing the refractive index and refractive index distribution of the proton-exchanged regions to desired values. Finally, the entrance and exit ends are polished, thus completing the channel waveguides.

As described above, in the first embodiment, since the directions of polarization of illumination light and reflected light are set to be different from each other, and the trunk channel waveguide 4 consists of a material having refractive index anisotropy in association with the direction of polarization, the illumination light (first light) propagates along the trunk channel waveguide 4 in the single mode, and the reflected light (first light) propagates along the waveguide 4 in the double modes. Thus, the illumination light (first light) always propagates along the trunk channel waveguide 4 as only the 0th-mode light. In a conventional apparatus, a connection portion between the central branch channel waveguide 2 and the trunk channel waveguide 4 must be mechanically precisely manufactured so as not to excite 1st-mode light when the illumination light (first light) is guided along the trunk channel waveguide. However, in the first embodiment, since both the channel waveguides are single-mode channels, they do not excite 1st-mode light, and need only be connected with precision high enough to efficiently transfer the light amount. Therefore, since the branching portion 13 on the substrate 3 can be easily manufactured, the manufacturing cost can be reduced.

All the channel waveguides may be manufactured by diffusing Ti onto the LiNbO$_3$ substrate. In this case, the central line of the central branch channel waveguide 2 must match that of the trunk channel waveguide 4. Since light (second light) emitted by the laser beam source 26 (second light source) and input from the branch channel waveguide 10 is reflected by the object 9 to be detected and influences image information, the output of the laser beam source 26 (second light source) is preferably lowered to eliminate the influence of the laser beam source 26 (second light source) on image information.

The scanner is realized by a device such as a rotary polygonal mirror, a combination of a galvano meter and a mirror, and the like. Such scanners may comprise a scanner described in U.S. Pat. No. 4,407,008.

Figure 35:
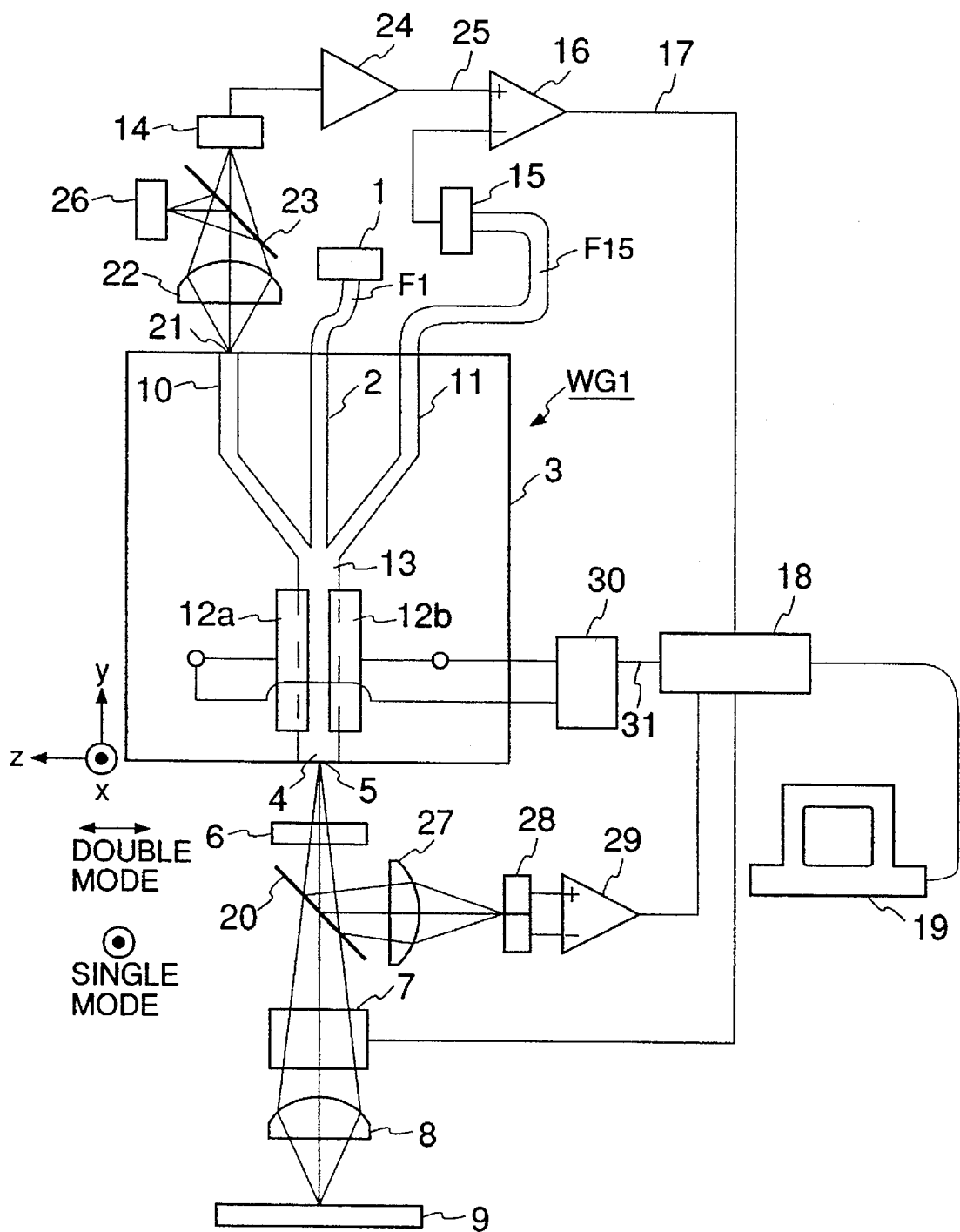
FIG. 35 is a schematic diagram showing an apparatus using fibers in the apparatus of the first embodiment.

FIG. 35 shows an apparatus in which the laser beam source 1 and the waveguide 2 are connected via an optical fiber F1, and the photodetector 15 and the waveguide 11 are optically connected via an optical fiber F15. In FIG. 35, other components are the same as those in FIG. 1.

Figure 36:
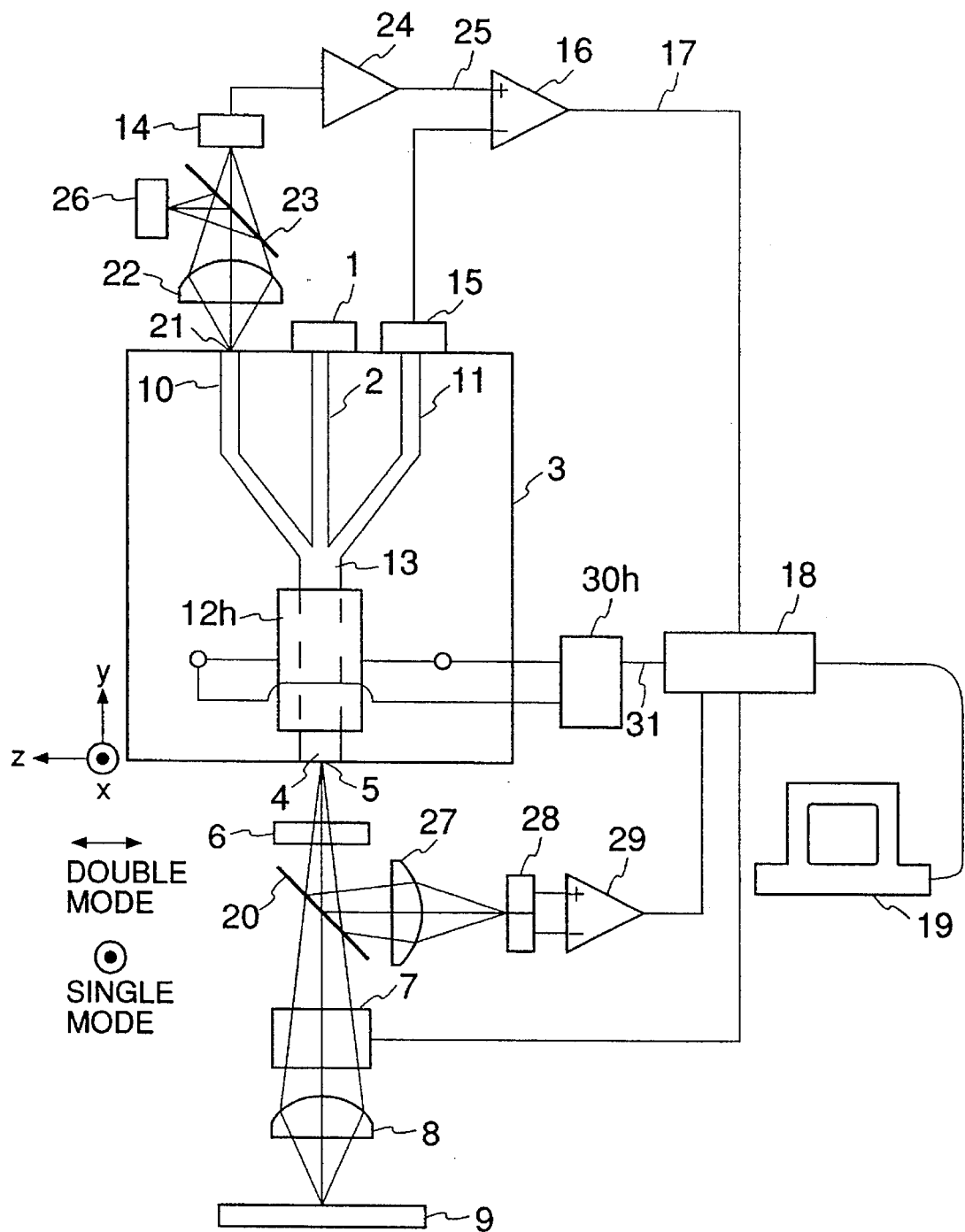
FIG. 36 is a schematic diagram showing an apparatus which uses a heater in place of electrodes in the apparatus of the first embodiment.

FIG. 36 shows an apparatus in which a heater 12*h* is arranged on the buffer layer 3*a* in place of the electrodes 12*a* and 12*b* shown in FIG. 1, so as to change the perfect coupling length of the waveguide 4. In this apparatus, a current supply unit 30*h* is used in place of the voltage application unit 30 shown in FIG. 1. The current supply unit 30*h* supplies a current to the heater 12*h*. The controller 18 controls the amount of current to be supplied from the current supply unit 30*h* to the heater 12*h*. In FIG. 36, other components are the same as those in FIG. 1.

Figure 3A:
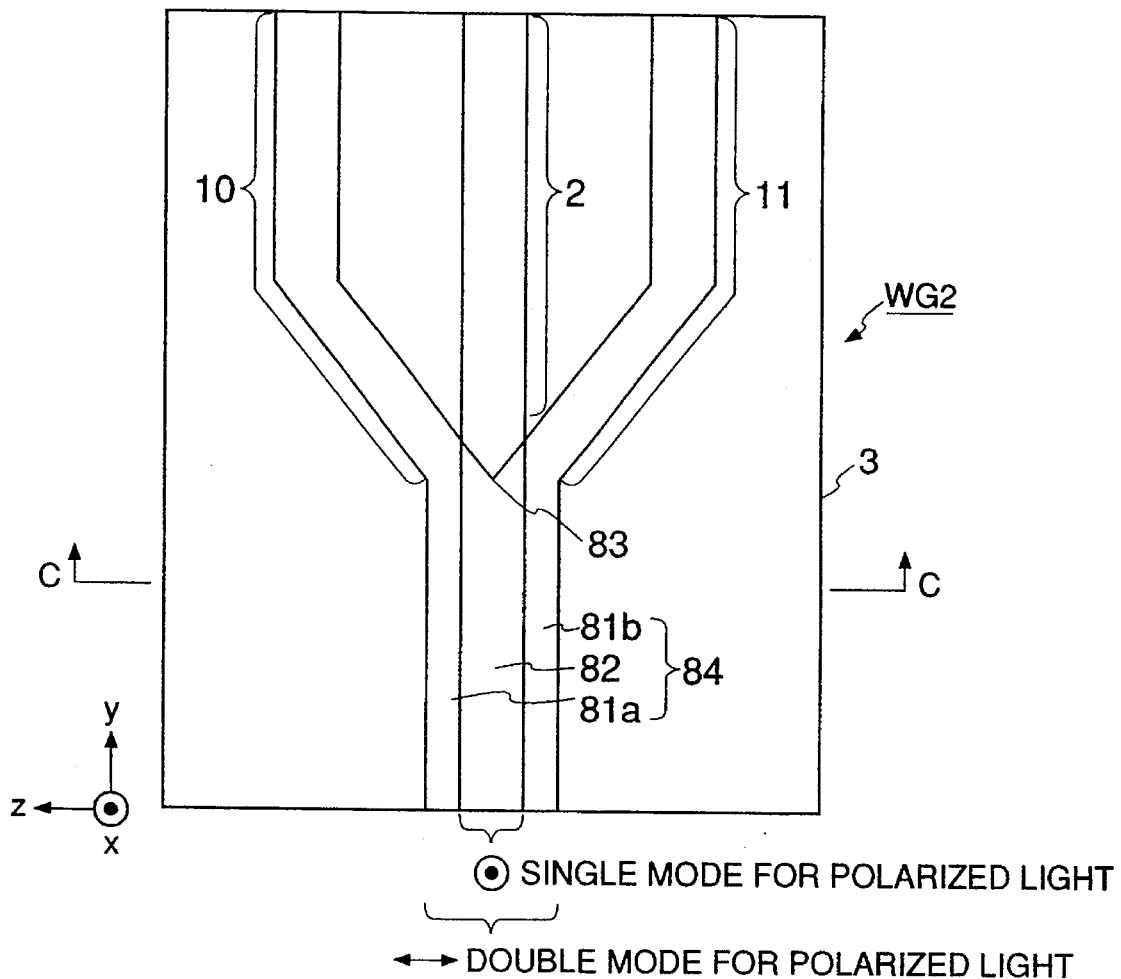
FIG. 3A is an explanatory view showing an optical waveguide portion of a mode interference type laser scanning microscope according to the second embodiment of the present invention.
Figure 3B:
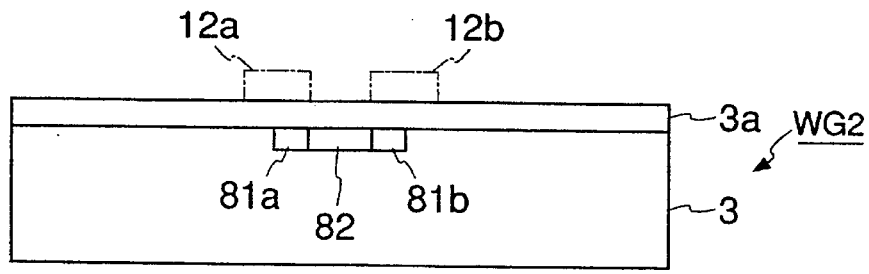
FIG. 3B is a sectional view of an optical branching device in FIG. 3A taken along arrows C—C in FIG. 3A.

FIGS. 3A and 3B are schematic views showing a waveguide device used in a mode interference type laser scanning microscope according to the second embodiment of the present invention. The arrangement of the second embodiment is substantially the same as that in the first embodiment., except for only the channel waveguide portion. For this reason, in the second embodiment, only the channel waveguide portion will be described below.

In the arrangement of the channel waveguide portion, a trunk channel waveguide 84 which serves as a double-mode channel for extraordinary rays is constituted by a region 82 which is subjected to both Ti diffusion and proton exchange, and regions 81*a* and 81*b* which are subjected to only proton exchange. Since the shapes and forming method of the branch channel waveguides 10, 2, and 11 are the same as those in the first embodiments a detailed description thereof will be omitted. In the proton-exchanged regions, since only the refractive index for extraordinary rays (linearly polarized light in the widthwise direction of the optical waveguide) increases, the regions 81*a*, 81*b*, and 82 guide extraordinary rays, and the trunk channel waveguide 84 serves as a double-mode channel waveguide. On the other hand, only the region 82 guides ordinary rays (linearly polarized light in the direction of depth of the optical waveguide), and the trunk channel waveguide 84 serves as a single-mode channel waveguide.

Propagation of light in an optical waveguide WG2 shown in FIGS. 3A and 3B which is used in place of the optical waveguide WG1 in FIG. 1 will be described below. Light (first light) emitted by the laser beam source 1 (first light source) propagates along the central branch channel waveguide 2. As described above, the light (first light) propagating along the central branch channel waveguide 2 is ordinary rays. The light (first light) via a branching portion 83 propagates along the region 82 of the trunk channel waveguide 84. Since the region 82 serves as a single-mode channel for ordinary rays, propagating light (first light) is only the 0th-mode light. The direction of polarization of reflected light (first light) which is reflected by the object 9 to be detected and is returned to the trunk channel waveguide 84 is perpendicular to that of light (first light) emerging from the trunk channel waveguide 84, and the light incident on the substrate 3 propagates along the regions 81a, 81b, and 82 of the trunk channel waveguide 84 while exciting the 0th-mode light and 1st-mode light or only the 0th-mode light. As described above, the trunk channel waveguide 84 serves as a double-mode channel waveguide for extraordinary rays. The reflected light beams (first light) branched by the branching portion 83 propagate along the branch channel waveguides 10 and 11 and reach the photodetectors 14 and 15 (first and second photodetectors).

Other arrangements are the same as those in the first embodiment, and the voltage to be applied to the electrodes is corrected in the same manner as in the first embodiment so as to eliminate any DC drift.

Figure 4A:
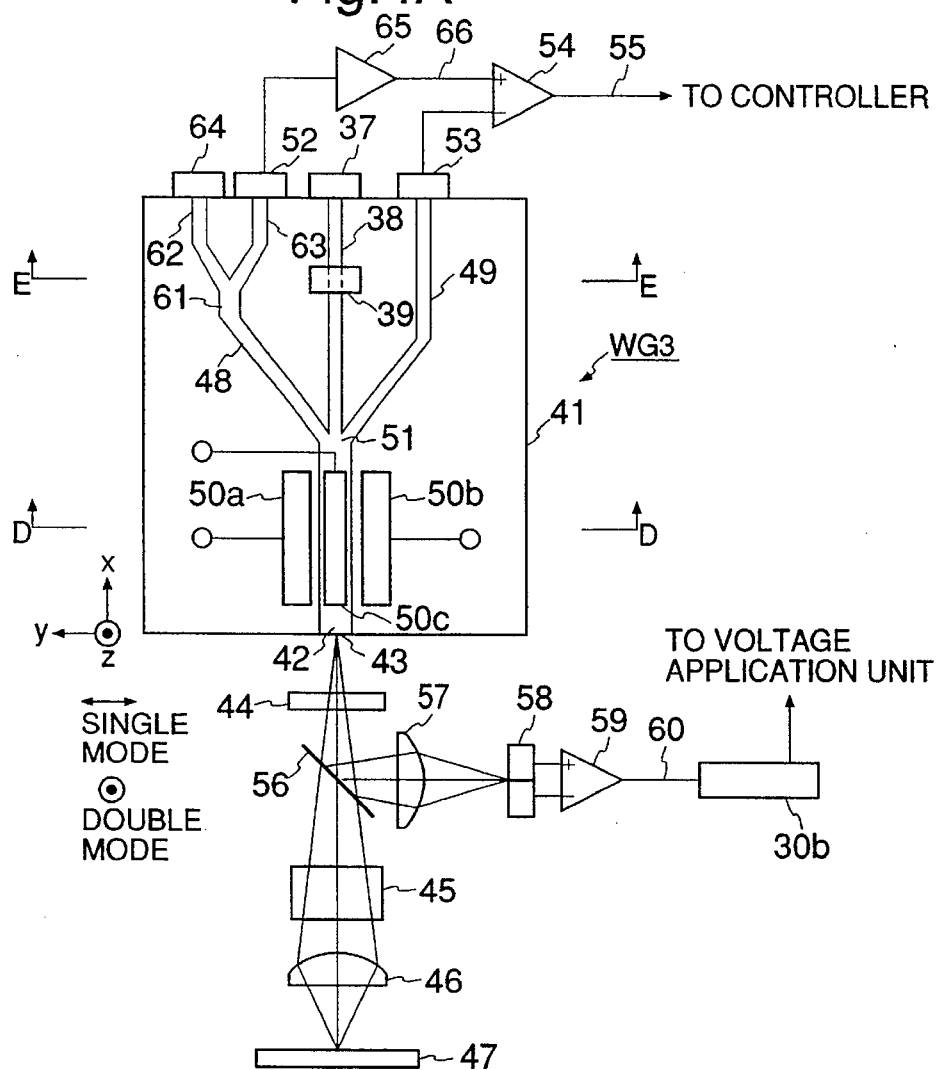
FIG. 4A is a schematic view showing a mode interference type laser scanning microscope according to the third embodiment of the present invention.
Figure 4B:
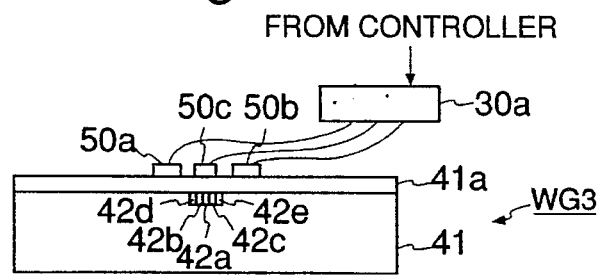
FIG. 4B is a sectional view of an optical branching device in FIG. 4A taken along arrows D—D in FIG. 4A.
Figure 4C:
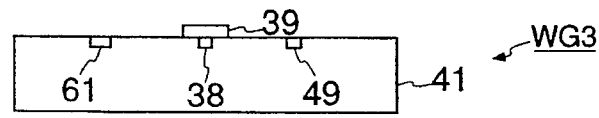
FIG. 4C is a sectional view of the optical branching device in FIG. 4A taken along arrows E—E in FIG. 4A.

FIGS. 4A, 4B, and 4C are schematic views showing a mode interference type laser scanning microscope according to the third embodiment of the present invention. An optical branching device WG3 shown in FIGS. 4A to 4C comprises a substrate 41, a double-mode waveguide 42 which is formed on a predetermined region of the substrate 41 to extend in the x-direction of the substrate 41, single-mode waveguides 38, 48, and 49 which are contiguous with the double-mode waveguide 42 via a branching portion 51, a buffer layer 41a formed on the substrate 41, electrodes 50a, 50b, and 50c formed on the buffer layer 41a, a metal cladding layer 39 directly formed on the single-mode waveguide 38, and single-mode waveguides 62 and 63 which are contiguous with the single-mode waveguide 48 via a branching portion 61.

The double-mode waveguide 42 comprises an LiNbO$_3$ region 42a containing Ti, proton-exchanged LiNbO$_3$ regions 42b and 42c containing Ti, and proton-exchanged LiNbO$_3$ regions 42d and 42e, as in the waveguide shown in FIG. 2B. The single-mode waveguides 38, 48, 49, 62, and 63 consist of LiNbO$_3$ containing protons.

The differences between the third and first embodiments are that in the former the substrate comprises a z-cut, x-propagation LiNbO$_3$ substrate, and the branching portion 61 (power distributor) and the channel waveguides 62 and 63 are formed to input light emitted by the second light source into the branch channel waveguide 48, and to detect light propagating along the branch channel waveguide 48. Since the substrate is the z-cut, x-propagation LiNbO$_3$ substrate 41, the electrodes 50a to 50c for changing the refractive index of the trunk channel waveguide 42 are arranged to apply a longitudinal electric field to the trunk channel waveguide 42. The direction of polarization of light emitted by a light source 37 (first light source) for irradiating light (first light) into the central branch channel waveguide 38 matches the direction b of polarization in the first embodiment (the direction of polarization in the widthwise direction of the optical waveguide), and the direction of polarization of light emitted by a light source 64 (second light source) for irradiating light (second light) into the channel waveguide 62 matches the direction a of polarization in the first embodiment (the direction of polarization in the direction of depth of the optical waveguide). Other arrangements are substantially the same as those in the first embodiment.

The arrangement of the channel waveguides used in the third embodiment is substantially the same as those of the channel waveguides shown in FIGS. 2A to 3B, except that the branch channel waveguide in FIG. 2A or 2B is constituted by the branch channel waveguide 48, the branching portion 61, and the channel waveguides 62 and 63. The method of forming the branch channel waveguide 48, the branching portion 61, and the channel waveguides 62 and 63 is the same as those in the first and second embodiments, i.e., these portions are formed by proton exchange of the LiNbO$_3$ substrate 41. Other channel waveguides are formed in the same manner as in the first and second embodiments.

A polarizer 39 (return light prevention member) arranged on the central branch channel waveguide 38 uses the metal cladding layer 39 of, e.g., Au, Al, or the like. The polarizer 39 (return light prevention member) is used for preventing light (first light) reflected by an object 47 to be detected and propagating along the trunk channel waveguide 42 from being returned to the light source 37 (first light source). The polarizer 39 (return light prevention member) using the metal cladding layer absorbs TM-mode light, and transmits TE-mode light.

In the third embodiment, since the z-cut, x-propagate LiNbO$_3$ substrate 41 is used as a substrate, ordinary rays correspond to light (TE-mode light) in the direction b of polarization in the first embodiment (polarized light in the widthwise direction of the optical waveguide), and extraordinary rays correspond to light (TM-mode light) in the direction a of polarization in the first embodiment (polarized light in the direction of depth of the optical waveguide). Therefore, unlike in the first embodiment, the laser beam source 37 (first light source) for irradiating light (first light) onto the object 47 to be detected is arranged to input linearly polarized light in the direction b of polarization (polarized light in the widthwise direction of the optical waveguide) into the central branch channel waveguide 38. On the other hand, the laser beam source 64 (second light source) for controlling a DC drift is arranged to input linearly polarized light (second light) in the direction a of polarization (polarized light in the direction of depth of the optical waveguide) into the channel waveguide 62.

Therefore, illumination light (first light) which is emitted by the light source 37 (first light source) and propagates along the central branch channel waveguide 38 is incident into the polarizer 39 (return light prevention member) using the metal cladding layer, and is transmitted therethrough since it is a TE mode. On the contrary, since light (first light) reflected by the object 47 to be detected is converted into TM-mode light (first light) by a quarter-wave plate 44 (polarization conversion member), even when the light is incident into the central branch channel waveguide 38 after it propagates through the trunk channel waveguide 42, it is prevented by the polarizer 39 (return light prevention member) from reaching the light source 37 (first light source).

The light source 37 (first light source) comprises a semiconductor laser beam source, and is fixed to the LiNbO$_3$ substrate 41 so as to maximize the optical coupling efficiency to the central branch channel waveguide 38 formed on the LiNbO$_3$ substrate with an electrooptic effect and to emit only ordinary rays as propagating light. The light (first light) transmitted through the polarizer 39 (return light prevention member) propagates along the central branch channel waveguide 38, and then propagates along the trunk channel waveguide 42, provided with the electrodes 50a to 50c formed on the substrate surface, via the branching portion 51. The electrodes 50a to 50c are connected to a voltage application unit 30a.

In the branching portion 51, the three branch channel waveguides are connected to the trunk channel waveguide 42. Of these branch channel waveguides, the central branch channel waveguide 38 is used for illumination, the branch channel waveguide 49 is used for detection, and the branch channel waveguide 48 is used for detection and illumination of the light source for DC drift detection.

Illumination light emerging from an end face 43 of the trunk channel waveguide 42 is linearly polarized light in the widthwise direction of the trunk channel waveguide, and is converted from the linearly polarized light into circularly polarized light when it is transmitted through a quarter-wave plate 44 (polarization conversion member). The converted light is transmitted through a beam splitter 56, and becomes incident on an objective lens 46 via an X-Y two-dimensional scanner 45 (scanning device). The light is then focused on the object 47 to be detected. The light is reflected by the object 47 to be detected, and is transmitted through the beam splitter 56 via the objective lens 46 and the X-Y two-dimensional scanner 45 (scanning device). The light is transmitted through the quarter-wave plate 44 (polarization conversion member) again to be converted from circularly polarized light into linearly polarized light whose direction of polarization is perpendicular to that of the light emerging from the trunk channel waveguide 42, and is focused on the end face 43 of the trunk channel waveguide 42 formed on the LiNbO$_3$ substrate, thus forming a light spot here. Thereafter, as in the first embodiment, the ratio of amounts of light distributed to the two side branch channel waveguides 48 and 49 changes depending on the presence/absence of a small step or a change in reflectance on the object 47 to be detected. A photodetector 53 (second photodetector) fixed on the substrate 41 detects light (first light) emerging from the branch channel waveguide 49, and a photodetector 52 (first photodetector) fixed on the substrate 41 detects light (first light) which propagates through the branch channel waveguide 48, is branched by the branching portion 61, and emerges from the channel waveguide 63. The photodetectors 52 and 53 (first and second photodetectors) are connected to a differential detector 54 for detecting the difference between the amounts of light. An amplifier 65 is connected between the photodetector 52 (first photodetector) and the differential detector 54 to correct the amount of light propagating along the channel waveguide 62 via the branching portion 61, so that two signals input to the differential detector 54 have equal intensities when light beams of equal amounts propagate through the branch channel waveguides 48 and 49. A mode interference image is obtained from a differential signal 55. Although light reflected by the object 47 to be detected also reaches the central branch channel waveguide 38 of the three branch channel waveguides, since the light is TM-mode light, it is absorbed upon transmission through the polarizer 39 (return light prevention member) utilizing the metal cladding layer 39, and the return light does not influence the laser beam source 37 (first light source).

The laser beam source 64 (second light source) is a light source for emitting linearly polarized light (second light) having the direction a of polarization (polarized light in the direction of depth of the optical waveguide), and is fixed to the LiNbO$_3$ substrate 41 to maximize the optical coupling efficiency with respect to the channel waveguide 62 formed on the LiNbO$_3$ substrate 41 having the electrooptic effect. In this arrangement, in place of the beam splitter in the first embodiment, the branching waveguides 61, 62, and 63 as a power distributor are used. By using the branching waveguides, alignment of the beam splitter, and the like in the first embodiment can be omitted. Light (second light) guided along the branch channel waveguide 48 propagates along the trunk channel waveguide 42 via the branching portion 51. Since the trunk channel waveguide 42 serves as a double-mode channel waveguide for linearly polarized light in the direction a of polarization (polarized light in the direction of depth of the optical waveguide), and light (second light) is incident from a position offset from the center of the trunk channel waveguide 42, both the 0th-mode light and 1st-mode light are excited in the trunk channel waveguide 42. These mode light beams interfere with each other when they propagate along the trunk channel waveguide. The intensity distribution of light at the end face 43 of the trunk channel waveguide 42 changes depending on the voltage to be applied to the electrodes 50a, 50b, and 50c. When the length of the double-mode channel waveguide satisfies equation (1), as described above, an image shown in FIG. 7 is obtained, and when it satisfies equation (2), an image shown in FIG. 6 is obtained. Light (second light) emerging from the end face 43 of the trunk channel waveguide 42 is linearly polarized light, and is converted from linearly polarized light into circularly polarized light when it is transmitted through the quarter-wave plate 44 (polarization conversion member). The converted light is reflected by the beam splitter 56, and is focused on a two-split photodiode 58 (third photodetector) having two light-receiving surfaces by a focusing lens 57. An intensity pattern image of light at the end face 43 of the trunk channel waveguide 42 is formed on the light-receiving surfaces of the two-split photodiode 58 (third photodetector). The two-split photodiode 58 (third photodetector) is connected to a differential detector 59 for detecting the difference between the amounts of light on the two light-receiving surfaces.

The method of correcting a DC drift is the same as that in the first embodiment. In FIGS. 4A to 4C, a controller 30b for forming an image on the basis of the differential signal and a signal from the X-Y two-dimensional scanner (scanning device) and for controlling the voltage application unit 30a has the same arrangement as that of the first embodiment shown in FIG. 1. Other arrangements are the same as those in the first embodiment.

Note that the trunk channel waveguide 42 which serves as a double-mode channel for extraordinary rays and as a single-mode channel for ordinary rays may adopt either the arrangement shown in FIGS. 2A to 2C or FIGS. 3A and 3B.

Figure 5A:
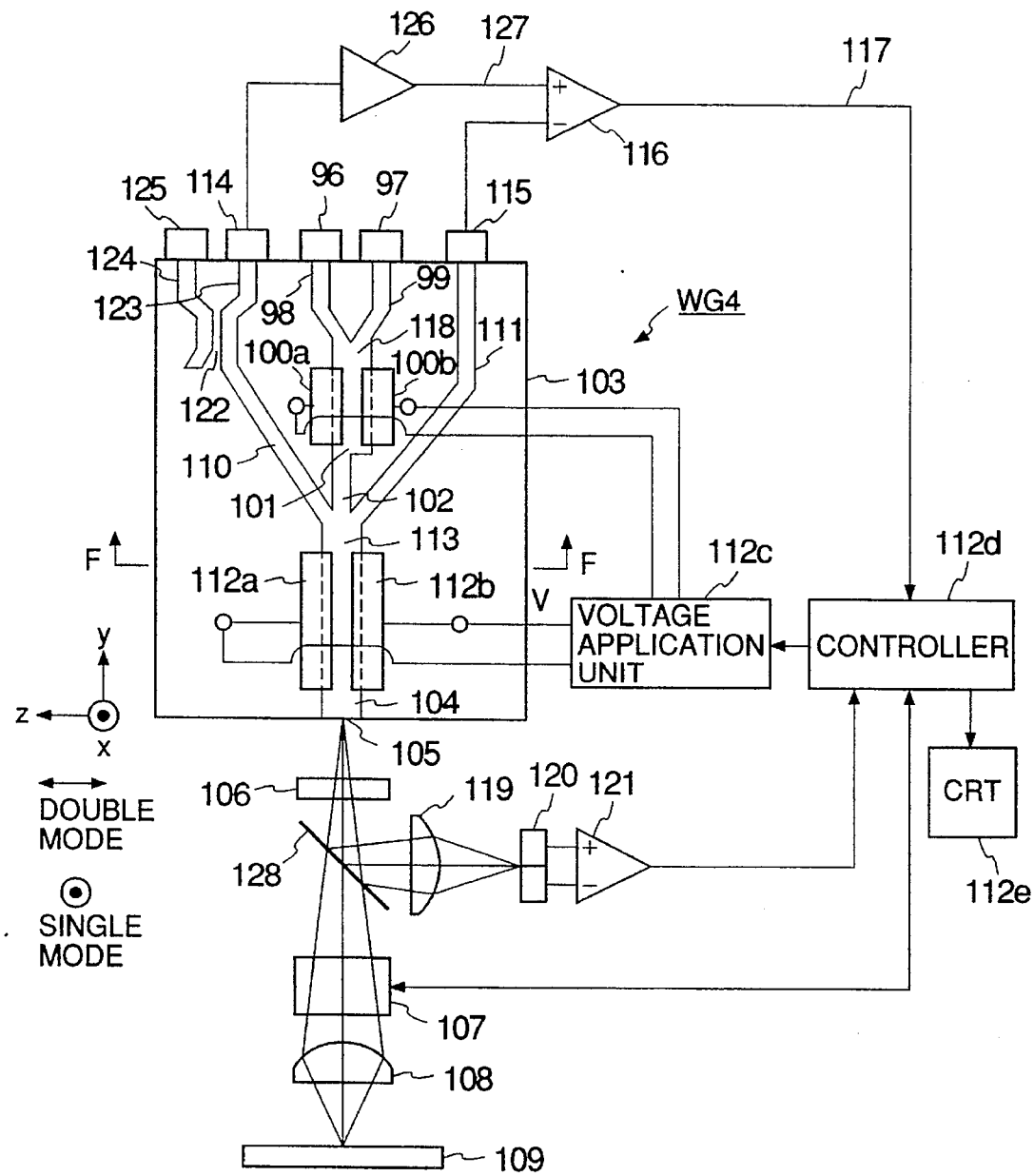
FIG. 5A is a schematic view showing a mode interference type laser scanning microscope according to the fourth embodiment of the present invention.
Figure 5B:
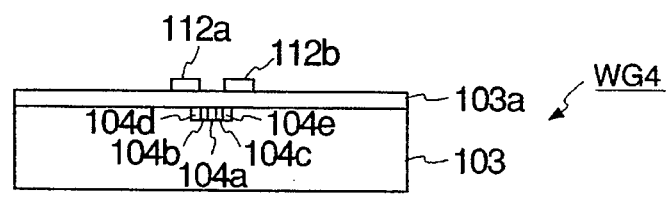
FIG. 5B is a sectional view of an optical branching device in FIG. 5A taken along arrows F—F in FIG. 5A.

FIGS. 5A and 5B are schematic views showing a mode interference type laser scanning microscope according to the fourth embodiment of the present invention.

An optical branching device WG4 shown in FIGS. 5A and 5B comprises a substrate 103, a double-mode waveguide 104 which is formed on a predetermined region on the substrate 103 to extend in the y-direction of the substrate 103, single-mode waveguides 110, 102, and 111 which are contiguous with the double-mode waveguide 104 via a branching portion 113, a buffer layer 103a formed on the substrate 103, and electrodes 112a and 112b formed on the buffer layer 103a.

The double-mode waveguide 104 comprises an LiNbO$_3$ region 104a containing Ti, proton-exchanged LiNbO$_3$ regions 104b and 104c containing Ti, and proton-exchanged LiNbO$_3$ regions 104d and 104e, as in the waveguide shown in FIG. 2B. The single-mode waveguides 98, 99, 110, 102, 111, 123, and 124 consist of LiNbO$_3$ containing protons.

The differences between the fourth and first embodiments are that in the former a mode splitter (return light prevention member) for splitting different polarized light beams (TE-mode light and TM-mode light) from each other is used for preventing return light to a laser beam source 96, and a directional coupler 122 (power distributor) is used as means for distributing light propagating along the branch channel waveguide 110 to the two channel waveguides 123 and 124. The mode splitter (return light prevention member) is constituted by the double-mode channel waveguide 101 and a branching portion 118. Electrodes 100a and 100b are mode splitter electrodes for finely adjusting the mode split ratio of the mode splitter (return light prevention member). The mode splitter (return light prevention member) is a device for guiding TM-mode light (ordinary rays in this embodiment) incident from the single-mode channel waveguide 98 to the central branch channel waveguide 102, and for guiding TE-mode light (extraordinary rays in this embodiment) incident from the central branch channel waveguide 102 to the mode splitter (return light prevention member) to the channel waveguide 99. The mode splitter electrodes 100a and 100b may be omitted. However, these electrodes are preferably arranged since imperfection of TE/TM-mode splitting caused by a variation in manufacturing process of the optical waveguide can be removed by adjusting the voltage to be applied to the mode splitter electrodes 100a and 100b. The directional coupler 122 is a power distributor which divides an optical power into two powers at a predetermined ratio, and outputs the divided powers. The power shift ratio of the directional coupler (power distributor) is determined by the length of the coupling portion.

The laser beam source 96 (first light source) is a semiconductor laser beam source for emitting illumination light (first light) in the direction a of polarization (polarized light in the direction of depth of the trunk channel waveguide), and is joined to the LiNbO$_3$ substrate 103 to maximize the optical coupling efficiency with respect to the single-mode channel waveguide 98 formed on the LiNbO$_3$ substrate having an electrooptic effect, and to emit only ordinary rays as illumination light (first light). A laser beam (first light) incident into the single-mode channel waveguide 98 corresponds to ordinary rays and is incident on the mode splitter (return light prevention member) having the double-mode channel waveguide 101. The illumination light (first light; ordinary rays) which is incident into the central branch channel waveguide 102 via the mode splitter (return light prevention member) propagates along the trunk channel waveguide 104 provided with the electrodes 112a and 112b formed on the substrate surface via the branching portion 113. The electrodes 112a and 112b are connected to a voltage application unit 112c.

In the branching portion 113, the three branch channel waveguides 110, 111, and 112 are coupled to the trunk channel waveguide 104. Upon observation of a microscope image, the central branch channel waveguide 102 is used for illumination, the two side branch channel waveguides 110 and 111 are used for detection, and only the branch channel waveguide 110 is used for measuring a DC drift.

Illumination light (first light) emerging from an end face 105 of the trunk channel waveguide 104 is linearly polarized light, and is converted from linearly polarized light into circularly polarized light when it is transmitted through a quarter-wave plate 106 (polarization conversion member). The converted light is transmitted through a beam splitter 128, and is incident on an objective lens 108 via an X-Y two-dimensional scanner 107 (scanning device). The light is then focused on an object 109 to be detected. The light reflected by the object 109 to be detected is transmitted through the beam splitter 128 via the objective lens 108 and the X-Y two-dimensional scanner 107 (scanning device). The light is then transmitted through the quarter-wave plate 106 (polarization conversion member) again to be converted from circularly polarized light into linearly polarized light whose direction of polarization is perpendicular to that when it emerges from the waveguide 104. The converted light is focused on the end face 105 of the trunk channel waveguide 104 formed on the LiNbO$_3$ substrate 103, thus forming a light spot here. Thereafter, the ratio of amounts of light to be distributed to the two side branch channel waveguides 110 and 11 changes depending on the presence/absence of a small step or a change in reflectance on the object 109 to be detected. A photodetector 115 (second photodetector) fixed on the substrate 103 detects light from the branch channel waveguide 111, and a photodetector 114 (first photodetector) fixed on the substrate 103 detects light (first light) which propagates along the branch channel waveguide 110, is distributed to the channel waveguide 123 via the directional coupler 122 (power distributor), and propagates along the channel waveguide 123. The photodetectors 114 and 115 (first and second photodetectors) are connected to a differential detector 116 for detecting the difference between the amounts of light. An amplifier 126 is connected between the photodetector 114 (first photodetector) and the differential detector 116 to correct the amount of light propagating along the channel waveguide 124 via the directional coupler 122 (power distributor), so that two signals input to the differential detector 116 have equal intensities when light beams with equal amounts propagate through the channel waveguides 110 and 111. A mode interference image is obtained from a differential signal 117.

The coupling portion of the directional coupler 122 (power distributor) is constituted by two single-mode channel waveguides, but may comprise a double-mode channel waveguide.

Although light (first light) reflected by the object 109 to be detected propagates along the central branch channel waveguide 102 of the three branch channel waveguides, it is converted into extraordinary rays (first light) before it becomes incident on the mode splitter (return light prevention member). Therefore, this light (first light) is guided to the single-mode channel waveguide 99 by the mode splitter (return light prevention member) and reaches the photodetector 97. At this time, since the light does not propagate to the single-mode channel waveguide 98, return light does not influence the laser beam source 96 (first light source).

A laser beam source 125 (second light source) is a light source for emitting linearly polarized light (second light) in the direction b of polarization (polarized light in the widthwise direction of the optical waveguide), and is fixed to the LiNbO$_3$ substrate 103 to maximize the optical coupling efficiency to the channel waveguide 124 formed on the LiNbO$_3$ substrate 103 having an electrooptic effect. In this arrangement, in place of the beam splitter in the first embodiment, a directional coupler serving as a power distributor is used. Since the directional coupler is used, alignment of the beam splitter, and the like in the first embodiment can be omitted. Light guided along the branch channel waveguide 110 propagates along the trunk channel waveguide 104 via the branching portion 113. Since the trunk channel waveguide 104 serves as a double-mode channel waveguide for linearly polarized light in the direction b of polarization (polarized light in the widthwise direction of the optical waveguide), and the light (second light) is incident from a position offset from the center of the trunk channel waveguide 104, both 0th-mode light and 1st-mode light are excited in the trunk channel waveguide 104. These mode light beams interfere with each other when they propagate along the trunk channel waveguide 104. The intensity distribution of light at the end face 105 of the trunk channel waveguide 104 changes depending on the voltage to be applied to the electrodes. As described above, when the length of the double-mode channel waveguide satisfies equation (1), an image shown in FIG. 7 is obtained, and when it satisfies equation (2), an image shown in FIG. 6 is obtained. The light (second light) emerging from the end face 105 of the trunk channel waveguide 104 is linearly polarized light, and is converted from linearly polarized light into circularly polarized light when it is transmitted through the quarter-wave plate 106 (polarization conversion member). The converted light is reflected by the beam splitter 128, and is focused by a focusing lens 119 on a two-split photodiode 120 (third photodetector) having two light-receiving surfaces. An intensity pattern image of light at the end face 105 of the trunk channel waveguide 104 is formed on the light-receiving surfaces of the two-split photodiode 120 (third photodetector). The two-split photodiode 120 (third photodetector) is connected to a differential detector 121 for detecting the difference between the amounts of light on the two light-receiving surfaces.

The method of correcting a DC drift is the same as that in the first embodiment.

In FIGS. 5A and 5B, the functions of a controller 112d for forming an image of a differential signal on the basis of the differential signal input from a differential amplifier 116 via the signal line 117 and a signal input from the X-Y two-dimensional scanner 107 (scanning device) and indicating the spot position on the sample 109, and for controlling the voltage application unit for applying a voltage to the electrodes 100a, 100b, 112a, and 112b, and a monitor 112e for receiving a video signal form the controller 112d are the same as those in the arrangement of the first embodiment shown in FIG. 1.

Each of the trunk channel waveguide 104 and the branch channel waveguides 110, 111, and 102 which serve as double-mode channels for extraordinary rays and as single-mode channels for ordinary rays may have either the arrangement shown in FIGS. 2A to 2C or FIGS. 3A and 3B. The channel waveguides 101, 98, and 99 are formed by thermally diffusing Ti into the LiNbO$_3$ substrate, and the channel waveguides 122, 123, and 124 are formed by proton exchange of the LiNbO$_3$ substrate.

Figure 9A:
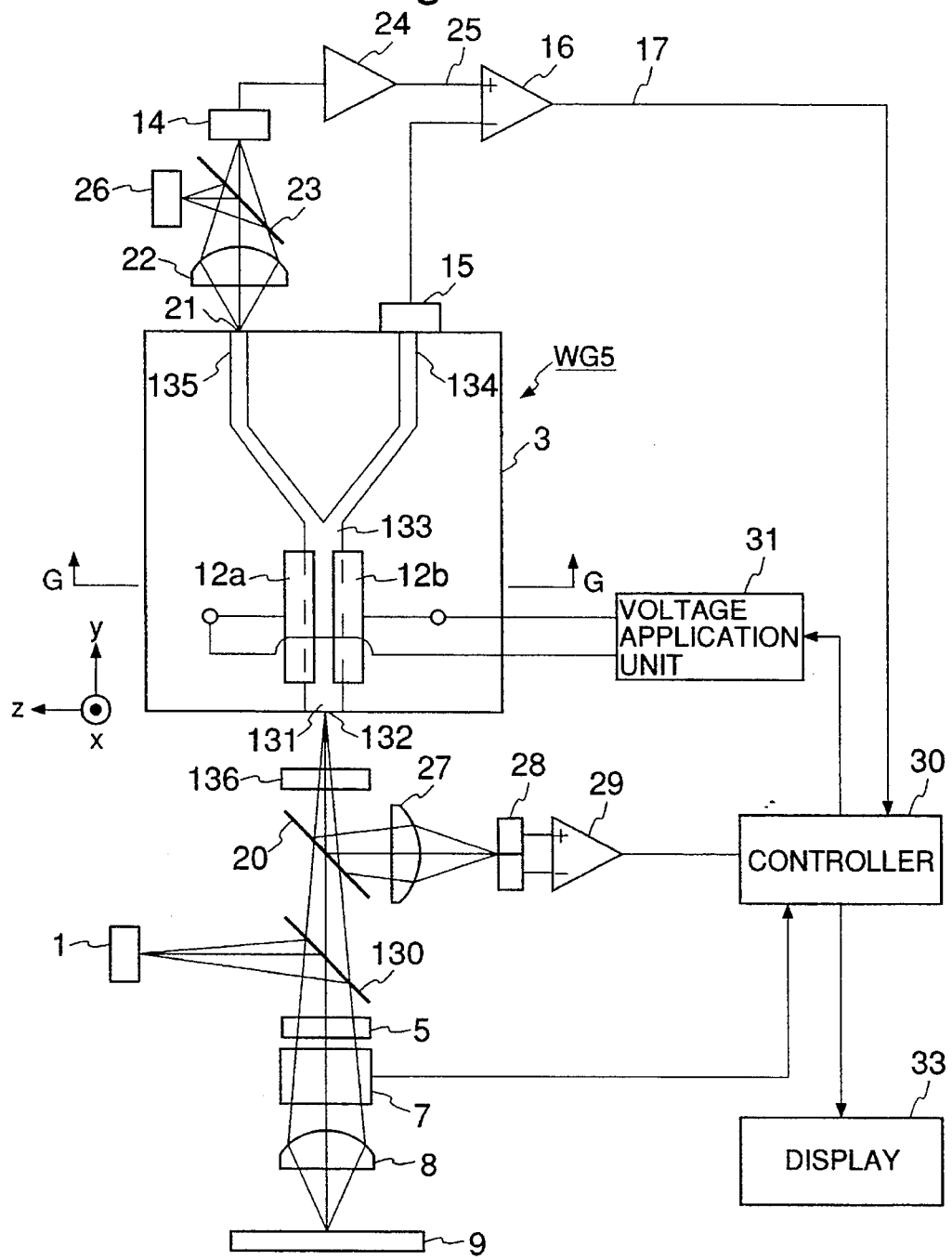
FIG. 9A is a schematic view showing a mode interference type laser scanning microscope according to the fifth embodiment of the present invention.
Figure 9B:
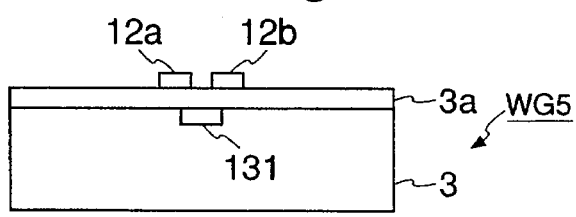
FIG. 9B is a sectional view of an optical branching device in FIG. 9A taken along arrows G—G in FIG. 9A.

FIGS. 9A and 9B are schematic views showing a mode interference type laser scanning microscope according to the fifth embodiment of the present invention.

An optical branching device WG5 shown in FIGS. 9A and 9B comprises a substrate 3, a double-mode waveguide 131 formed on a predetermined region of the substrate 3 to extend in the y-direction of the substrate 3, single-mode waveguides 134 and 135 which are contiguous with the double-mode waveguide 131 via a branching portion 133, a buffer layer 3a formed on the substrate 3, and electrodes 12a and 12b formed on the buffer layer 3a.

The double-mode waveguide 131 and the single-mode waveguides 134 and 135 consist of LiNbO$_3$ containing protons. The width of the double-mode waveguide 131 is larger than those of the single-mode waveguides 134 and 135.

Unlike in the arrangement of the first embodiment, in the arrangement of the fifth embodiment, a light source 1 (first light source) for irradiating light onto an object 9 to be detected is arranged not on the optical waveguide substrate 3 but outside the substrate. Also, a polarizing plate 136 is arranged to prevent DC drift control light (second light) reflected by the object 9 to be detected from becoming incident into the trunk channel waveguide 131. Note that the same reference numerals in FIGS. 9A and 9B denote the same parts as in the first embodiment, and a detailed description thereof will be omitted.

Light emitted by the laser beam source 1 (first light source) is irradiated onto the object 9 to be detected via a beam splitter 130, a quarter-wave plate 5 (polarization conversion member), an X-Y two-dimensional scanner 7, and a focusing optical system 8. In this case, the laser beam source 1 (first light source) is arranged, so that the direction of polarization of light emitted by the laser beam source (first light source) matches the direction a of polarization (polarized light in the direction of depth of the optical waveguide). Thereafter, reflected light (first light) reflected by the object 9 to be detected is transmitted through the focusing optical system 8, the X-Y two-dimensional scanner 7 (scanning device), the quarter-wave plate 5 (polarization conversion member), the beam splitter 130, a beam splitter 20, and the polarizing plate 136, and is incident into the trunk channel waveguide 131 via an end face 132. Note that the above-mentioned optical system is arranged, so that the reflected light (first light) is incident at the center of the trunk channel waveguide 131. The light (first light) reflected by the object 9 to be detected is converted into light in the direction b of polarization by the quarter-wave plate 5 (polarization conversion member). For this reason, the polarizing plate 136 is arranged to transmit only the light in the direction b of polarization. The trunk channel waveguide 131 and the branch channel waveguides 134 and 135 are formed by thermally diffusing Ti in the LiNbO$_3$ substrate 3, and the trunk channel waveguide 131 serves as a double-mode channel waveguide. For this reason, the reflected light (first light) incident into the trunk channel waveguide 131 propagates along the trunk channel waveguide 131 while exciting only 0th-mode light or both 0th-mode light and 1st-mode light depending on its polarization state. The light (first light) propagating along the trunk channel waveguide 131 is branched into two light beams by the branching portion 133, and the two light beams respectively propagate along the two branch channel waveguides 134 and 135. The light beams propagating along the branch channel waveguides 134 and 135 are respectively detected by photodetectors 15 and 14 (second and first photodetectors). Thereafter, phase information and amplitude information of the object to be detected can be observed as in the first embodiment. Light (second light) emitted by a laser beam source 26 (second light source) is incident into the branch channel waveguide 135 as in the first embodiment. At this time, the laser beam source 26 (second light source) is arranged, so that the direction of polarization of light (second light) emitted by the laser beam source 26 (second light source) matches the direction b of polarization. The light (second light) incident into the branch channel waveguide 135 propagates along the branch channel waveguide 135, and then propagates along the trunk channel waveguide 131. At this time, the light (second light) emitted by the laser beam source 26 (second light source) propagates along the trunk channel waveguide 131 while exciting 0th-mode light and 1st-mode light. Thereafter, the light (second light) emerges from the end face 132 of the trunk channel waveguide 131, and is detected by a two-split photodiode 28 (third photodetector) via the beam splitter 20 and a focusing optical system 27. Thereafter, DC drift control is performed as in the first embodiment.

Figure 37:
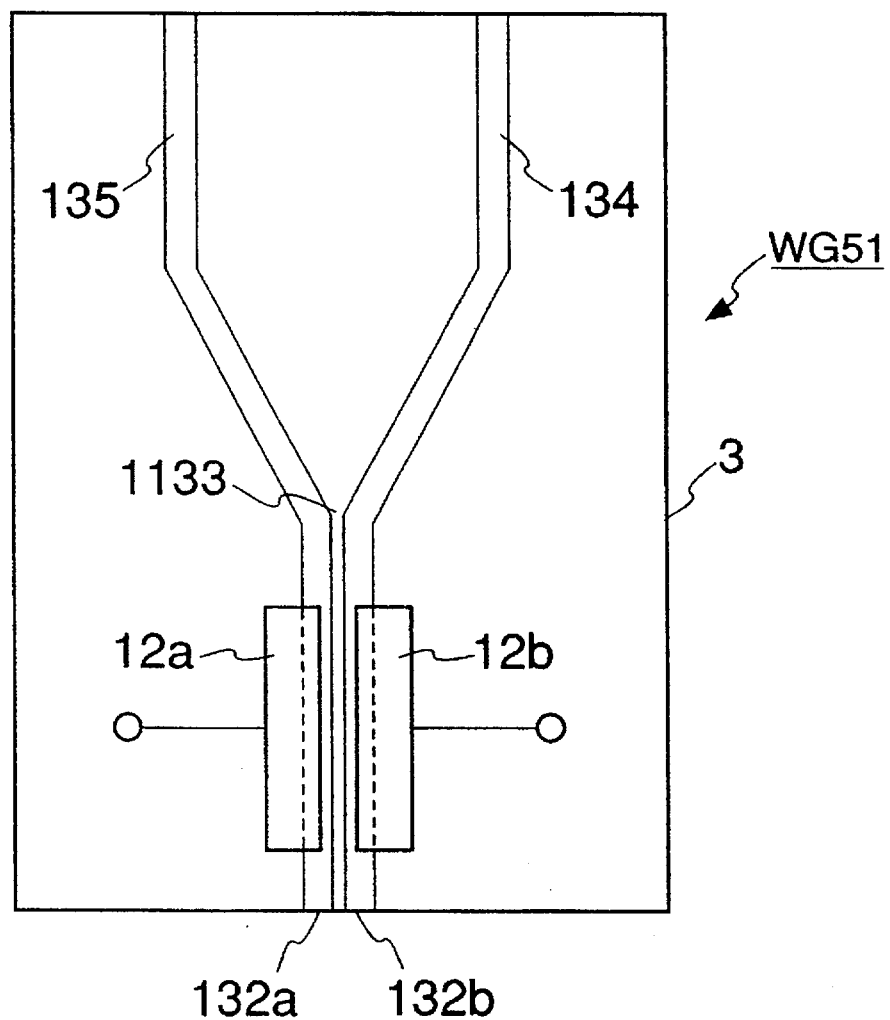
FIG. 37 is a schematic diagram showing an optical branching device.

Further, a double-mode waveguide WG51 shown in FIG. 37 may be applicable to the microscope in stead of the waveguide WG5 shown in FIG. 9A. The branch channel waveguides 134 and 135 are single-mode waveguide, the region of waveguides 134 and 135 near the electrodes 12a and 12b are adjacent each other, and the adjacent region of the waveguides 134 and 135 acts as a double-mode waveguide. In using this system, light beam incident on end faces 132a and 132b passes through the adjacent region and separates into two portions at region 1133, and each separated light beam is transmitted along the respective waveguides 134 and 135.

Further, the optical branching device may be constructed by using optical fibers adjacent each other. In this case, the coupling length of the double-mode waveguide made of the fibers may be changed by drawing the fibers.

In the first to fifth embodiments, the mode interference type laser scanning microscope has been exemplified. However, the present invention is not limited to the microscope, but may be applied to any other apparatuses as long as they have a double-mode channel waveguide, two branch channel waveguides, and means for applying an electric field to the double-mode channel waveguide. For example, the present invention can be applied to an optical information detection device shown in FIGS. 10A and 10B.

Figure 10A:
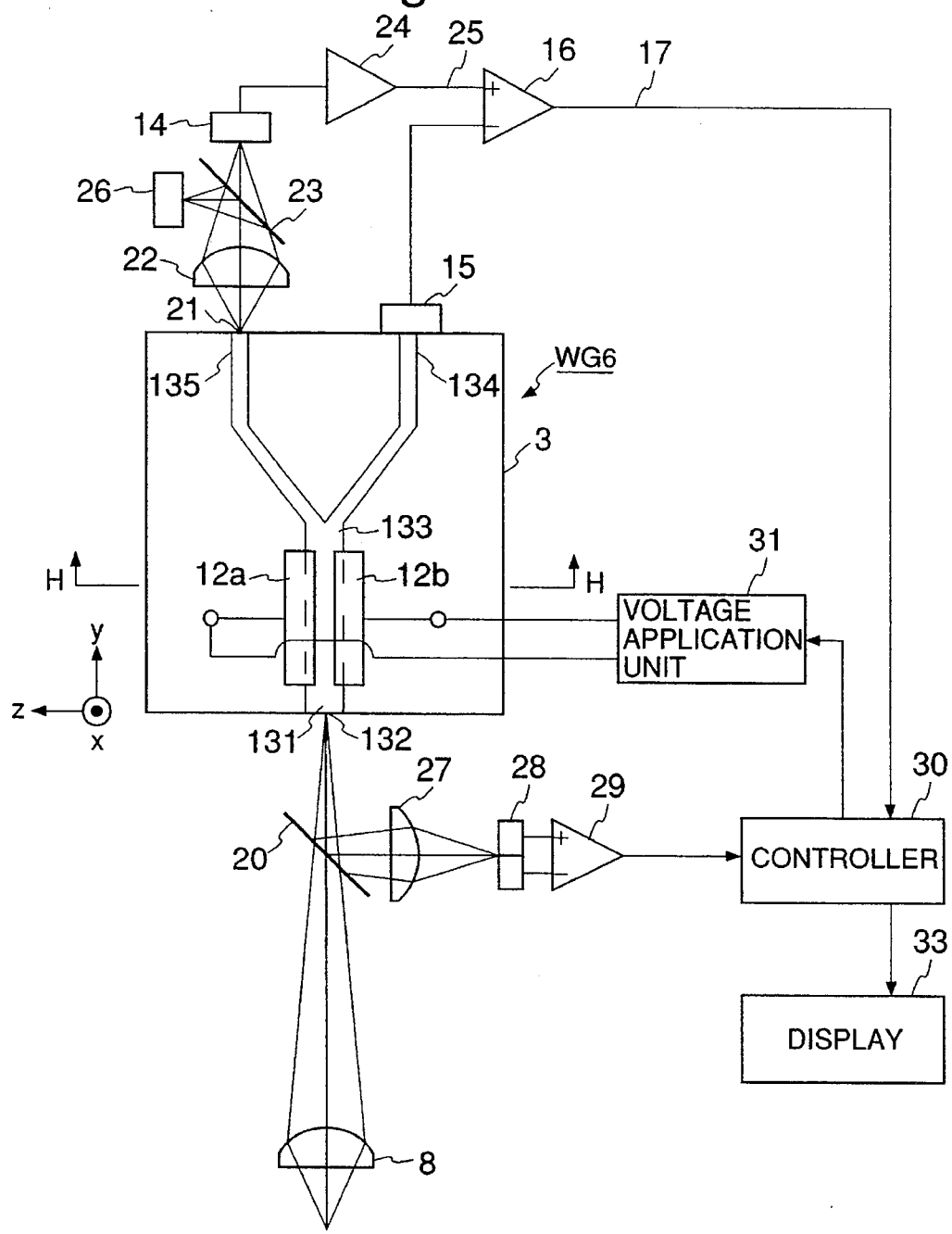
FIG. 10A is a schematic view showing a mode interference type laser scanning microscope according to the sixth embodiment of the present invention.
Figure 10B:
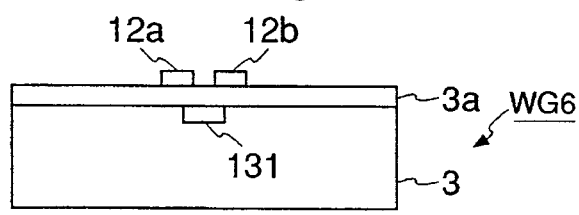
FIG. 10B is a sectional view of an optical branching device in FIG. 10A taken along arrows F—F in FIG. 10A.

FIGS. 10A and 10B are schematic views showing an optical information detection device according to the sixth embodiment of the present invention.

An optical branching device WG6 shown in FIGS. 10A and 10B comprises a substrate 3, a double-mode waveguide 131 formed on a predetermined region of the substrate 3 to extend in the y-direction of the substrate 3, single-mode waveguides 134 and 135 which are contiguous with the double-mode waveguide 131 via a branching portion 133, a buffer layer 3a formed on the substrate 3, and electrodes 12a and 12b formed on the buffer layer 3a, as in the optical branching device WG5 shown in FIGS. 9A and 9B.

The double-mode waveguide 131 and the single-mode waveguides 134 and 135 consist of $LiNbO_3$ containing protons. The width of the double-mode waveguide 131 is larger than those of the single-mode waveguides 134 and 135.

The arrangement of the optical information detection device of the sixth embodiment is substantially the same as the mode interference type laser scanning microscope of the fifth embodiment. The optical information detection device detects the information of light (first light) incident into the trunk channel waveguide 131. Light (first light) to be subjected to information detection is focused by a focusing optical system 8, and is incident at the center of the trunk channel waveguide 131. Therefore, if the phase or amplitude distribution of the light (first light) to be subjected to information detection has a gradient, a signal corresponding to the gradient can be detected based on an output signal 17. DC drift control is the same as that in the first to fifth embodiments, and the method of detecting the information of light is also the same as that in the first to fifth embodiments.

A method of inputting light into the branch channel waveguide 135 in FIGS. 10A and 10B is not limited to the arrangement shown in FIGS. 10A and 10B, and the arrangement of the third or fourth embodiment may be used.

In the mode interference type laser scanning microscope in the first to fifth embodiments, the first and second light sources are separately arranged. Alternatively, the present invention may be applied to an arrangement wherein some light components emitted by the first light source may be split as the second light source.

In the first to sixth embodiments, the optical waveguide consists of Ti-diffused $LiNbO_3$. Alternatively, when a transition metal other than Ti is diffused, the refractive index can be increased, and an optical waveguide can be formed. As a metal to be diffused, transition metals such as Ti, V, Ni, Cu, and the like are used in the case of the $LiNbO_3$ substrate.

A substrate constituting the optical waveguide need only have an electrooptic effect. For example, $LiTaO_3$ single crystal substrate may be used. In the $LiTaO_3$ substrate, a transition metal such as Cu, Ti, Nb, or the like is diffused to form the waveguides.

As a method of forming a high-refractive index layer for only extraordinary rays on the substrate, an $Li_2O$ outward diffusion method may be used. In the $Li_2O$ outward diffusion method, $Li_2O$ is outwardly diffused from the crystal surface to form a high-refractive index layer.

In the first and fourth embodiments, the electrodes 12a and 12b, 100a and 100b, and 112a and 112b for applying a voltage to the channel waveguides 4, 101, and 104 are arranged at positions symmetrical to the channel waveguides 4, 101, and 104. However, depending on the state (e.g., the directions of the crystallographic axes, or the like) of a substrate to be used, the electrode arrangements shown in FIG. 1 and FIGS. 5A and 5B are not always the best. Needless to say, by performing appropriate processing of a differential signal from the photodetectors for detecting the intensities of light beams passing the two channel waveguides, images with various contrasts can be obtained.

In the above embodiments, as a scanning device for moving the light spot relative to the object to be detected, the X-Y two-dimensional scanner using a galvano optical scanner, a resonance type scanner, a polygonal scanner, or the like scans the light spot on the object to be detected. On the contrary, the light spot may be fixed in position, and a stage on which the object to be detected is placed may be scanned.

In the first to sixth embodiments, in order to perform DC drift control, the intensity pattern of light emitted by the second light source and emerging from the trunk channel waveguide is detected by the two-split photodiode. However, the present invention is not limited to the two-split photodiode. For example, a photodetector such as a PSD, a linear sensor, or the like may be used, or a photodetector such as a CCD camera or the like may be used.

In the third and fourth embodiments, the directional coupler and the branching waveguides have been exemplified as the power distributor. However, the present invention is not limited to these. In the third and fourth embodiments, the polarizer and the mode splitter have been exemplified as the return light prevention member. However, the present invention is not limited to these.

As described above, according to the present invention, a change in refractive index of the optical waveguide due to a DC drift can be corrected by controlling the voltage to be applied to the electrodes on the substrate, and stability can be assured for a long period of time.

Devices according to the seventh to 10th embodiments of the present invention will be described below. Prior to a description, how the device of each embodiment was developed will be described. In recent years, optical waveguides have received a lot of attention in various fields since the optical system can be rendered compact and lightweight using the optical waveguide, and is free from adjustment of the optical axis. The optical waveguides are classified into a single-mode waveguide in which only 0th-mode light is excited on the basis of the difference between the refractive indices of an optical waveguide (core portion) and a substrate (cladding portion), and the width or refractive index distribution of the optical waveguide, a double-mode waveguide in which two mode light beams, i.e., 0th- and 1st-mode light beams are excited, and a multi-mode waveguide in which three or more mode light beams, i.e., 0th-, 1st-, 2nd-mode light beams, and the like are excited. In the double-mode waveguide and the multi-mode waveguide, a plurality of mode light beams are not always excited, and these waveguides are classified depending on the maximum number of mode light beams to be excited. For example, only 0th-mode light may be excited depending on the position or state of light incident into the optical waveguide.

As an application of such an optical waveguide to a new field, an optical information detection device which utilizes a mode interference phenomenon in a double-mode channel waveguide is known. As the optical information detection device, a device disclosed in, e.g., Japanese Patent Laid-Open No. 6-160718 is known. This device comprises a substrate having an electrooptic effect, a trunk channel waveguide which guides principal light incident from its one end in double modes, electrodes which are formed on the substrate to apply an electric field to the trunk channel waveguide, a voltage application unit for applying a voltage to the electrodes, right and left branch channel waveguides connected to the other end of the trunk channel waveguide, and right and left photodetectors for detecting the intensities of principal light beams emerging from the other ends of the branch channel waveguides, and the device detects information included in principal light incident on one end of the trunk channel waveguide on the basis of output signals from the two photodetectors.

In the optical information detection device, the coupling length of the trunk channel waveguide is controlled by changing the voltage to be applied to the electrodes, thereby distinguishing phase information and amplitude information included in principal light incident on one end of the trunk channel waveguide from each other. However, when an electric field is applied to the trunk channel waveguide, a phenomenon called a DC drift occurs, and an electric field cannot often be accurately applied to the trunk channel waveguide.

The DC drift is a phenomenon that when a voltage is applied to electrodes formed in the vicinity of the optical waveguide via the buffer layer for a long period of time, a charge moves in the substrate surface or in the buffer layer arranged between the electrodes and the optical waveguide to generate a counter-electric field, and the electric field is not effectively applied to the optical waveguide. In the optical information detection device, the coupling length is determined by controlling the electric field to be applied to the trunk channel waveguide depending on how to observe light incident into the trunk channel waveguide. Therefore, when a DC drift occurs, since the coupling length cannot be accurately determined, information to be observed in light incident into the trunk channel waveguide cannot be defined, and the accuracy of the optical information detection device is degraded.

Therefore, each of the following embodiments has as its object to provide an optical information detection device with higher detection accuracy, and a mode interference type laser scanning microscope using the device.

The device according to each of the seventh to 10th embodiments of the present invention will be briefly described below.

According to this device, an optical information detection device, which comprises a substrate having an electrooptic effect, a trunk channel waveguide which guides principal light incident from its one end in double modes, electrodes for generating an electric field to control the coupling length of the trunk channel waveguide, a voltage application unit for applying a voltage to the electrodes, right and left branch channel waveguides connected to the other end of the trunk channel waveguide, right and left photodetectors for respectively detecting the intensities of the principal light beams emerging from the other ends of the two branch channel waveguides, and a controller for detecting information included in the principal light incident on one end of the trunk channel waveguide on the basis of output signals from the two photodetectors, is characterized in that the voltage application unit applies a voltage obtained by superposing an AC voltage on a DC voltage to the electrodes, the output signals from the right and left photodetectors are respectively input to right and left low-pass filters, output signals from the low-pass filters are input to a main differential amplifier, a calibration light source is arranged to input calibration light to the other end of one of the right and left branch channel waveguides, a calibration light intensity distribution detector is arranged to detect a light intensity distribution at one end of the trunk channel waveguide, which distribution is formed by the calibration light, an output signal from the calibration light intensity distribution detector is input to a calibration differential amplifier, an output signal from the calibration differential amplifier is input to a band-pass filter, and the controller controls the DC voltage on the basis of an output signal from the band-pass filter and detects the information included in the principal light on the basis of the output signal from the main differential amplifier.

The optical information detection device can be applied to a mode interference type laser scanning microscope.

Since the calibration light excites 1st-mode light in the trunk channel waveguide, the light intensity of the calibration light shifts to the right and left in a zigzag pattern in the trunk channel waveguide. Therefore, when the length of the double-mode region of the trunk channel waveguide is represented by L, and the coupling length, i.e., the length obtained when the phase difference between the 0th-mode light and 1st-mode light of light propagating along the trunk channel waveguide in double modes becomes 180°, is represented by $L_C$, the output from the calibration light intensity detector is symmetrically distributed to the right and left if the following equation is satisfied:

$$L=L_C(2m+1)/2 (m=0, 1, 2, \ldots) \qquad (3)$$

When equation (3) is satisfied, the right and left photodetectors detect only phase information included in the principal light. On the other hand, the output from the calibration light intensity detector shifts most to either the right or left if the following equation is satisfied:

$$L=mL_C \ (m=1, 2, \ldots) \qquad (4)$$

When equation (4) is satisfied, the right and left photodetectors detect only amplitude information included in the principal light.

Therefore, when the coupling length $L_C$ of the trunk channel waveguide is changed by changing the voltage to be applied to the electrodes, the output signal from the calibration differential amplifier oscillates between positive and negative peak values. When the output signal from the calibration differential amplifier assumes 0, the main differential amplifier outputs phase information included in the principal light; when the output signal from the calibration differential amplifier assumes a peak value, the main differential amplifier outputs amplitude information included in the principal light.

In the device of the present invention, a voltage obtained by superposing an AC voltage on a DC voltage is applied to the electrodes, and the output from the calibration differential amplifier is input to the band-pass filter. Therefore, when equation (3) is satisfied, the principal frequency component of the output signal from the calibration differential amplifier is a fundamental frequency component corresponding to the frequency of the AC voltage, and the 2nd-order harmonic component becomes zero. For this reason, by adjusting the band-pass filter to detect the 2nd-order harmonic component, and by adjusting the DC voltage to obtain an output=0 from the band-pass filter, phase information included in the principal light can be observed. Similarly, when equation (4) is satisfied, the principal frequency component of the output signal from the calibration differential amplifier is a 2nd-order harmonic component, and the fundamental frequency component becomes zero. For this reasons by adjusting the band-pass filter to detect the fundamental frequency component, and by adjusting the DC voltage to obtain an output=0 from the band-pass filter, amplitude information included in the principal light can be observed.

On the other hand, since a voltage obtained by superposing an AC voltage on a DC voltage is applied to the electrodes, AC components are superposed on the output signals from the two photodetectors. Since the outputs from the two photodetectors are input to the main differential amplifier via the two low-pass filters, phase or amplitude information included in the principal light can be reliably detected. In this manner, high detection accuracy can be maintained independently of the presence/absence of a DC drift.

A mode interference type laser scanning microscope according to the seventh embodiment of the present invention will be described in more detail below with reference to FIGS. 15A to 18.

Figure 15A:
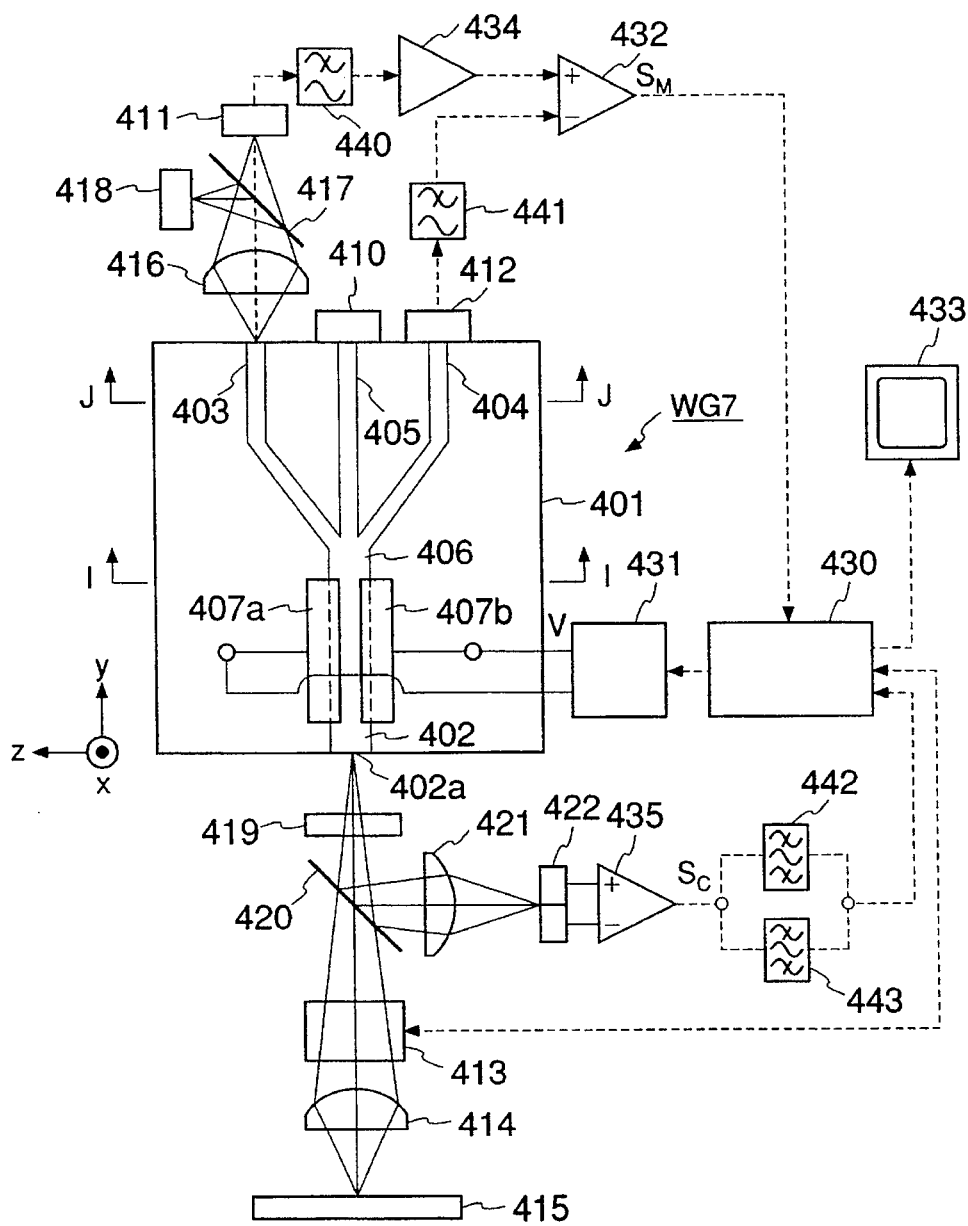
FIG. 15A is a schematic diagram showing a mode interference type laser scanning microscope according to the seventh embodiment of the present invention.
Figure 15B:
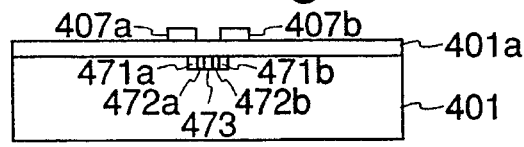
FIG. 15B is a sectional view of an optical branching device in FIG. 15A taken along arrows I—I in FIG. 15A.
Figure 15C:
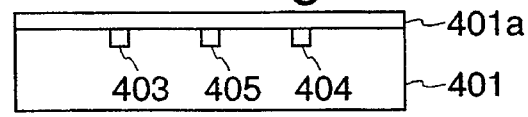
FIG. 15C is a sectional view of the optical branching device in FIG. 15A taken along arrows J—J in FIG. 15A.

An optical branching device WG7 shown in FIGS. 15A to 15C comprises a substrate 401, a double-mode waveguide 402 formed on a predetermined region of the substrate 401 to extend in the y-direction of the substrate 401, single-mode waveguides 403, 404, and 405 which are contiguous with the double-mode waveguide 402 via a branching portion 406, a buffer layer 401a formed on the substrate 401, and electrodes 407a and 407b formed on the buffer layer 401a.

The double-mode waveguide 402 comprises a Ti-diffused $LiNbO_3$ region 473, proton-exchanged $LiNbO_3$ regions 472a and 472b containing Ti, and proton-exchanged $LiNbO_3$ regions 471a and 471b, as in FIG. 2B. The single-mode waveguides 403 and 404 consist of proton-exchanged $LiNbO_3$. The single-mode waveguide 405 consists of Ti-diffused $LiNbO_3$.

The central branch channel waveguide 405, the left branch channel waveguide 403, the right branch channel waveguide 404, and the trunk channel waveguide 402 are formed on the $LiNbO_3$ substrate 401. The substrate 401 is cut along a plane perpendicular to the x-axis of the crystallographic axes x, y, and z of $LiNbO_3$, and the respective channel waveguides are formed in the y-direction. Therefore, the x-direction of the crystal corresponds to the direction of depth of each channel waveguide, and the z-direction of the crystal corresponds to the widthwise direction of each channel waveguide. The lower ends of the branch channel waveguide 403, 404, and 405 are connected to the trunk channel waveguide 402 via the branching portion 406, and the lower end of the trunk channel waveguide 402 serves as an end face 402a through which light enters/exits. The pair of electrodes 407a and 407b are arranged on the two sides of the trunk channel waveguide 402 via the buffer layer 401a, and a voltage V from a voltage application unit 431 is applied across the electrodes 407a and 407b. The voltage V is obtained by superposing a weak high-frequency voltage $V_A$ on a DC voltage $V_D$, and the DC voltage $V_D$ is controlled by a controller 430.

The trunk channel waveguide 402 serves as a single-mode optical waveguide for linearly polarized light in the x-direction (to be referred to as x-polarized light hereinafter), and serves as a double-mode optical waveguide which excites 1st-mode light in the branching direction of the branch channel waveguides, i.e., in the z-direction for linearly polarized light in the z-direction (to be referred to as z-polarized light hereinafter). The central branch channel waveguide 405 serves as a single-mode optical waveguide for both x- and z-polarized light beams. The right and left branch channel waveguides 404 and 403 serve as single-mode optical waveguides for z-polarized light, and do not serve as optical waveguides for x-polarized light. As means for manufacturing the optical waveguides with the above-mentioned functions, known means disclosed in, e.g., Japanese Patent Laid-Open No. 6-160718 can be used.

A main laser beam source 410 for generating x-polarized light is connected to the upper end of the central branch channel waveguide 405, and a right photodetector 412 is connected to the upper end of the right branch channel waveguide 404. A focusing lens 416, a calibration light entrance beam splitter 417 and a left photodetector 411 are arranged in the order named above the upper end of the left branch channel waveguide 403. The beam splitter 417 receives calibration light of z-polarization from a calibration laser beam source 418. The output signal from the left photodetector 411 is input to a main differential amplifier 432 via a left low-pass filter 440 and an amplifier 434, and the output signal from the right photodetector 412 is input to the main differential amplifier 432 via a right low-pass filter 441. The outputs i.e., a main differential signal $S_M$, from the main differential amplifier 432 is input to the controller 430 to which a monitor 433 is connected.

A quarter-wave plate 419, a calibration light exit beam splitter 420, a two-dimensional scanner 413, a focusing optical system 414, and an object 415 to be detected are arranged in the order named below the end face 402a of the trunk channel waveguide. A focusing lens 421 and a two-split photodiode 422 are arranged in the order named beside the calibration light exit beam splitter 420. The output signals from the two-split photodiode 422 are input to a calibration differential amplifier 435. The output, i.e., a calibration differential signal $S_C$, from the calibration differential amplifier 435 is input to the controller 430 via first and second band-pass filters 442 and 443, which are selectively connected. The two-dimensional scanner 413 is controlled by the controller 430.

Figure 16:
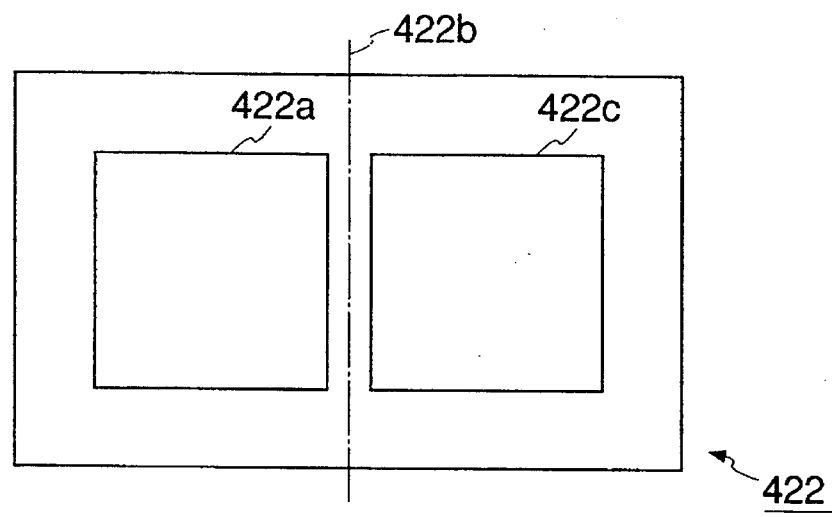
FIG. 16 is an explanatory view showing the light-receiving surfaces of a two-split photodiode.
Figure 17:
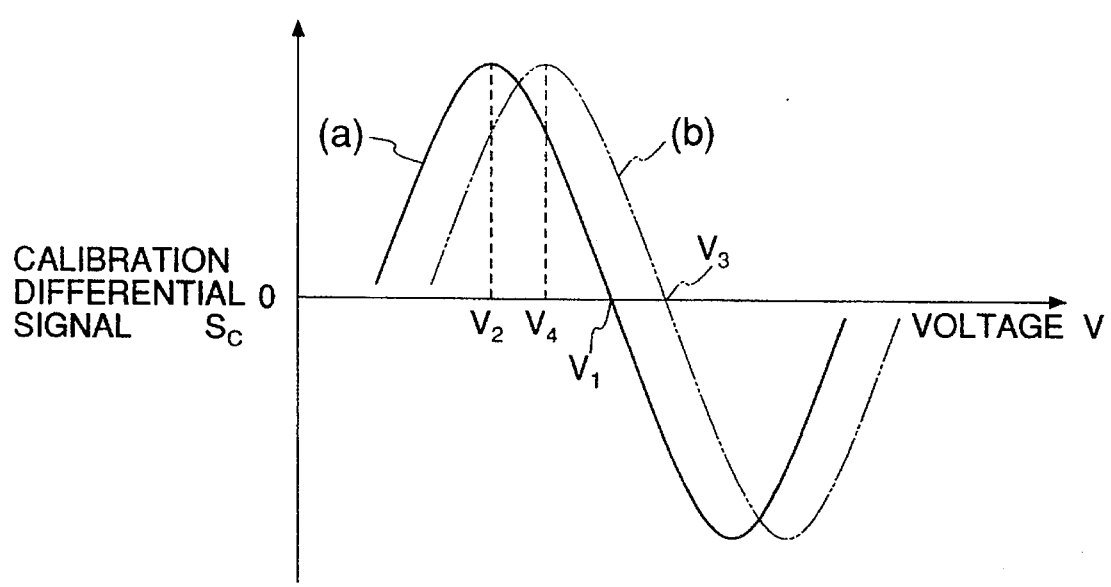
FIG. 17 is a graph for explaining the relationship between the voltage to be applied to electrodes and the calibration differential signal obtained when no DC drift occurs (curve (a)) and when a DC drift occurs (curve (b))

The two-split photodiode 422 has a pair of right and left light-receiving surfaces 422a and 422c, as shown in FIG. 16. An image of the light intensity distribution at the end face 402a of the trunk channel waveguide is formed on the light-receiving surfaces 422a and 422c, and a boundary 422b between the two light-receiving surfaces is arranged to match the center of an end face image of the trunk channel waveguide 402.

The microscope of this embodiment has the above-mentioned arrangement. Illumination light of x-polarization emitted by the main laser beam source 410 propagates along the central branch channel waveguide 405 and the trunk channel waveguide 402, and emerges from the end face 402a of the trunk channel waveguide. Since the trunk channel waveguide 402 serves as a single-mode optical waveguide for x-polarized light, the intensity distribution of the illumination light at the end face 402a of the trunk channel waveguide can be prevented from offsetting even when the central branch channel waveguide 405 and the trunk channel waveguide 402 are not strictly coaxially connected to each other. The illumination light of x-polarization emerging from the end face 402a of the trunk channel waveguide is converted into circularly polarized light when it is transmitted through the quarter-wave plate 419. Some light components of the illumination light are transmitted through the calibration light exit beam splitter 420, and the remaining light components are reflected by the beam splitter 420. The illumination light reflected by the beam splitter 420 is focused on the two-split photodiode 422 by the focusing lens 421. In this case, since the illumination light does not suffer any offset, the calibration differential signal $S_C$ based on the illumination light is 0. The illumination light transmitted through the beam splitter 420 is transmitted through the two-dimensional scanner 413, so that its optical path is deflected in a direction perpendicular to the propagating direction. Thereafter, the illumination light is focused on the object 415 to be detected by the focusing optical system 414, and is reflected by the object 415 to be detected.

The light reflected by the object 415 to be detected propagates along the above-mentioned forward optical path in the opposite direction, and is converted into polarized light in a direction perpendicular to that in the forward optical path, i.e., z-polarized light when it is transmitted through the quarter-wave plate 419. The converted light is focused on the end face 402a of the trunk channel waveguide, and is incident into the trunk channel waveguide 402. Since the end face 402a of the trunk channel waveguide has the same function as that of a pinhole, this microscope serves as a confocal laser scanning microscope.

When the reflection surface of the object 415 to be detected has a slope in the right-and-left direction or the reflectance of the reflection surface has a gradient in the right-and-left direction, the phase or amplitude distribution of the reflected light has a gradient in the right-and-left direction accordingly. When the reflected light whose phase or amplitude distribution has a gradient in the right-and-left direction is incident into the trunk channel waveguide 402, since the trunk channel waveguide 402 serves as a double-mode optical waveguide for z-polarized light, 1st-mode light is excited in the trunk channel waveguide 402 in addition to 0th-mode light, and the intensity distribution of light propagating through the trunk channel waveguide 402 shifts to the right and left in a zigzag pattern upon interference between the two mode light beams.

The reflected light propagating along the trunk channel waveguide 402 is branched into the respective branch channel waveguides by the branching portion 406. Of these branched light beams, the light beam propagating along the right branch channel waveguide 404 is detected by the right photodetector 412. On the other hand, the light beam propagating along the left branch channel waveguide 403 is transmitted through the focusing lens 416 and the calibration light entrance beam splitter 417, and is focused on the left photodetector 411. The output signal from the left photodetector 411 is amplified by the amplifier 434 to compensate for an intensity loss generated upon transmission through the beam splitter 417. The difference between the outputs from the right photodetector 412 and the amplifier 434 is calculated by the main differential amplifier 432, and the controller 430 displays the gradient of the phase or amplitude distribution of the object 415 to be detected, i.e., a differential image, on the monitor 433 on the basis of the calculated main differential signal $S_M$. In this manner, the slope of the reflection surface of the object 415 to be detected is detected on the basis of the phase information of changes in intensity distribution of light propagating along the trunk channel waveguide 402, and the gradient of the reflectance of the object 415 to be detected is detected on the basis of its amplitude information.

The phase information and the amplitude information are discriminated from each other as follows. When the length of the double-mode region of the trunk channel waveguide 402 is represented by L, and the coupling length, i.e., the length obtained when the phase difference between the 0th-mode light and 1st-mode light of light propagating along the trunk channel waveguide 402 in double modes becomes 180°, is represented by $L_C$, only the phase information of the object 415 to be detected is detected if the following equation is satisfied:

$$L=L_C(2m+1)/2 \ (m=0, 1, 2, \dots) \tag{3}$$

On the other hand, only the amplitude information of the object 415 to be detected is detected if the following equation is satisfied:

$$L=mL_C \ (m=1, 2, \dots) \tag{4}$$

When the length L of the double-mode region of the trunk channel waveguide 402 is other than those defined by equations (3) and (4), both the phase information and amplitude information are detected at a predetermined ratio.

The length L of the double-mode region of the trunk channel waveguide 402 means a length in which light actually propagates in double modes, and does not always match the physical length of the trunk channel waveguide 402. For example, when the three single-mode channel waveguides 403, 404, and 405 are connected to the upper end of the trunk channel waveguide 402 via the branching portion 406 as in this embodiment, optical coupling occurs among the respective channel waveguides in a region where the distance between each two adjacent channel waveguides is not sufficient, and light often propagates in the double modes in such a region.

On the other hand, the coupling length $L_C$ can be changed by generating an electric field onto the trunk channel waveguide 402 upon application of a voltage across the two electrodes 407a and 407b. In other words, the coupling length $L_C$ is changed by controlling the voltage to be applied to the electrodes 407a and 407b, and the phase or amplitude information of the object 415 to be detected can be arbitrarily observed.

Calibration light of z-polarization emitted by the calibration laser beam source 418 is reflected by the calibration light entrance beam splitter 417, is focused by the focusing lens 416, and is incident into the left branch channel waveguide 403. Furthermore, the calibration light propagates along the left branch channel waveguide 403, and is incident into the trunk channel waveguide 402 via the branching portion 406. The left branch channel waveguide 403 and the trunk channel waveguide 402 are not coaxially arranged, and the trunk channel waveguide 402 serves as a double-mode optical waveguide for z-polarized light. For these reasons, 1st-mode light is excited in the trunk channel waveguide 402 in addition to 0th-mode light, and the intensity distribution of the calibration light which propagates along the trunk channel waveguide 402 shifts to the right and left in a zigzag pattern upon interference between the two mode light beams.

The calibration light of z-polarization emerging from the end face 402a of the trunk channel waveguide is converted into circularly polarized light when it is transmitted through the quarter-wave plate 419. Some light components of the calibration light are transmitted through the calibration light exit beam splitter 420, and the remaining light components are reflected by the beam splitter 420. The calibration light transmitted through the beam splitter 420 is reflected by the object 415 to be detected, and is converted into circularly polarized light. The converted light propagates along the forward optical path in the opposite direction, and is converted into x-polarized light when it is transmitted through the quarter-wave plate 419. The converted light is then incident into the trunk channel waveguide 402. Since the trunk channel waveguide 402 serves as a single-mode optical waveguide for x-polarized light, no 1st-mode light is excited. In addition, since the right and left branch channel waveguides 404 and 403 do not serve as optical waveguides for x-polarized light; the main differential signal $S_M$ based on the calibration light is zero. On the other hand, the calibration light reflected by the beam splitter 420 is focused on the two-split photodiode 422 by the focusing lens 421, and its intensity distribution is obtained as a calibration differential signal $S_C$.

When the length of the trunk channel waveguide 402 is an integer multiple of the coupling length, i.e., when equation (4) is satisfied, since the calibration light in the trunk channel waveguide 402 shifts most to the right or left in a zigzag pattern, the intensity distribution on the light-receiving surfaces of the two-split photodiode 422 shifts most to the right or left. On the other hand, when the length of the trunk channel waveguide 402 is larger or smaller than the length given by equation (4) by a length half the coupling length, i.e., when equation (3) is satisfied, since the calibration light in the trunk channel waveguide 402 is located at the center in the right-and-left direction, the intensity distribution on the light-receiving surfaces of the two-split photodiode 422 is symmetrically distributed to the right and left.

Therefore, when the coupling length of the trunk channel waveguide 402 is changed by changing the voltage V to be applied from the voltage application unit 431 across the electrodes 407a and 407b, the calibration differential signal $S_C$ also changes, as shown in FIG. 17A. Referring to FIG. 17A, equation (3) is satisfied when the calibration differential signal $S_C$ becomes zero, i.e., the voltage V becomes $V_2$. At this time, the main differential signal $S_M$ detects the phase information of the object 415 to be detected. On the other hand, equation (4) is satisfied when the calibration differential signal $S_C$ has a peak value, i.e., the voltage V becomes $V_2$. At this time, the main differential signal $S_M$ detects the amplitude information of the object 415 to be detected. However, when a DC drift has occurred, since the electric field actually applied to the trunk channel waveguide 402 changes, the voltage for observation of phase information changes from $V_1$ to $V_3$; the voltage for observation of amplitude information changes from $V_2$ to $V_4$, as shown in FIG. 17B.

Figure 18:
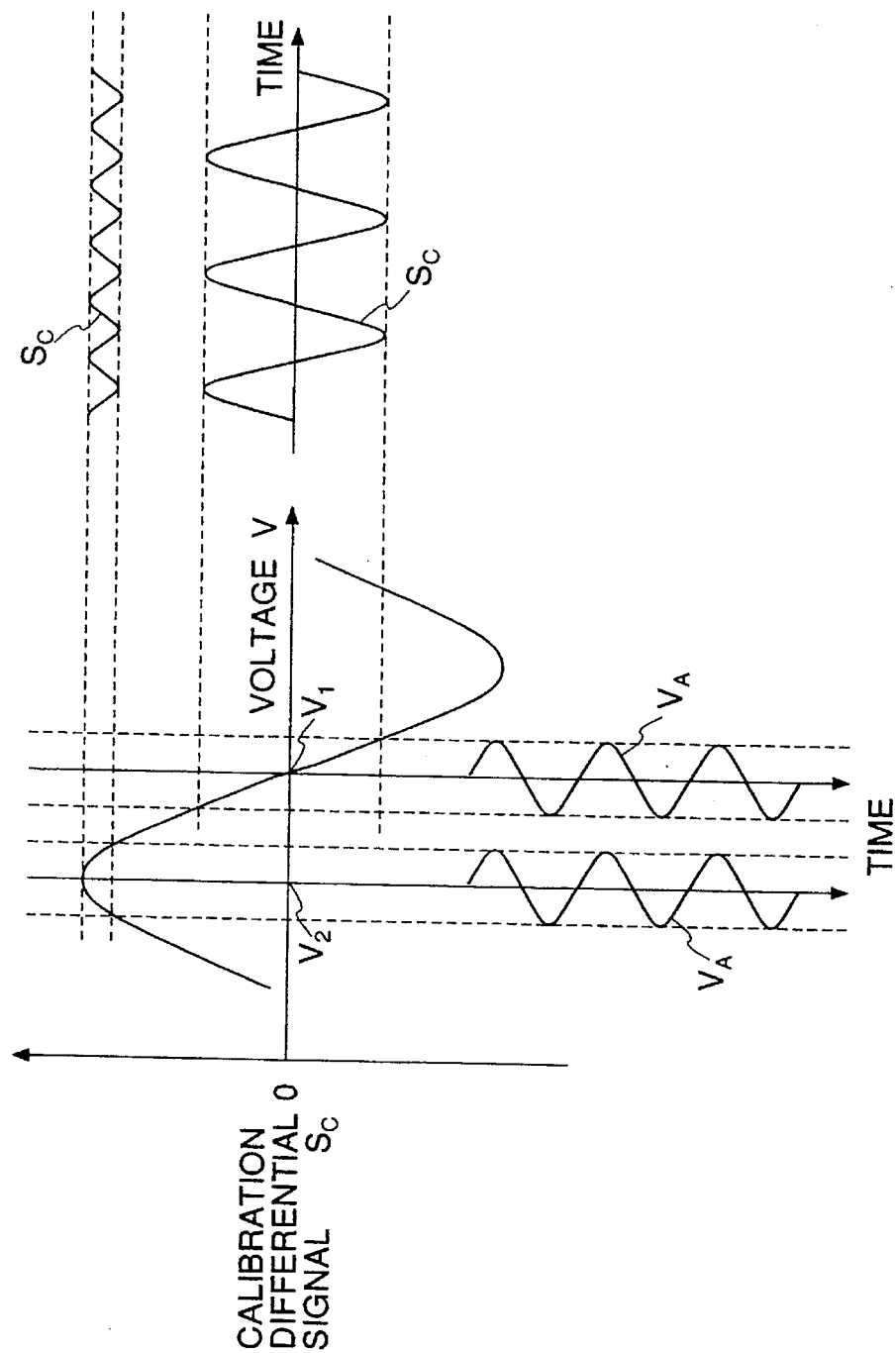
FIG. 18 is a graph for explaining the relationship between the voltage and the calibration differential signal upon application of a voltage obtained by superposing an AC voltage on a DC voltage to electrodes.

In order to correct these changes, as the voltage V to be applied across the electrodes 407a and 407b, the voltage $V=V_D+V_A$ obtained by superposing a weak high-frequency voltage $V_A$ of a frequency f on a DC voltage $V_D$ optimal for observation of phase or amplitude information is used. FIG. 18 shows a change, over time, in calibration differential signal $S_C$ at that time. As can be seen from FIG. 18, when the DC voltage $V_D$ is a voltage $V_1$ optimal for observation of phase information, the principal frequency component of the calibration differential signal $S_C$ is a fundamental frequency component f corresponding to the frequency of one AC voltage, and the 2nd-order harmonic component becomes zero. On the other hand, when the DC voltage $V_D$ is a voltage $V_2$ optimal for observation of amplitude information, the principal frequency component of the calibration differential signal $S_C$ is a 2nd-order harmonic component 2f, and the fundamental frequency component f becomes zero.

Therefore, when phase information is to be observed, the controller 430 adjusts the DC voltage $V_D$, so that the component 2f detected by the first band-pass filter 442 becomes zero; when amplitude information is to be observed, the controller 430 adjusts the DC voltage $V_D$, so that the component f detected by the second band-pass filter 443 becomes zero. Thus, the influence of the DC drift can be eliminated over a long period of time, and information can be detected accurately.

On the other hand, since the voltage to be applied across the electrodes 407a and 407b is obtained by superposing the AC component $V_A$ on the DC voltage $V_D$, AC components remain in the outputs from the right and left photodetectors 412 and 411. However, the two photodetectors 412 and 411 are connected to the right and left low-pass filters 441 and 440, and these filters remove high-frequency components. Therefore, detection of differential information associated with the phase or amplitude is not influenced by these AC components.

Figure 19A:
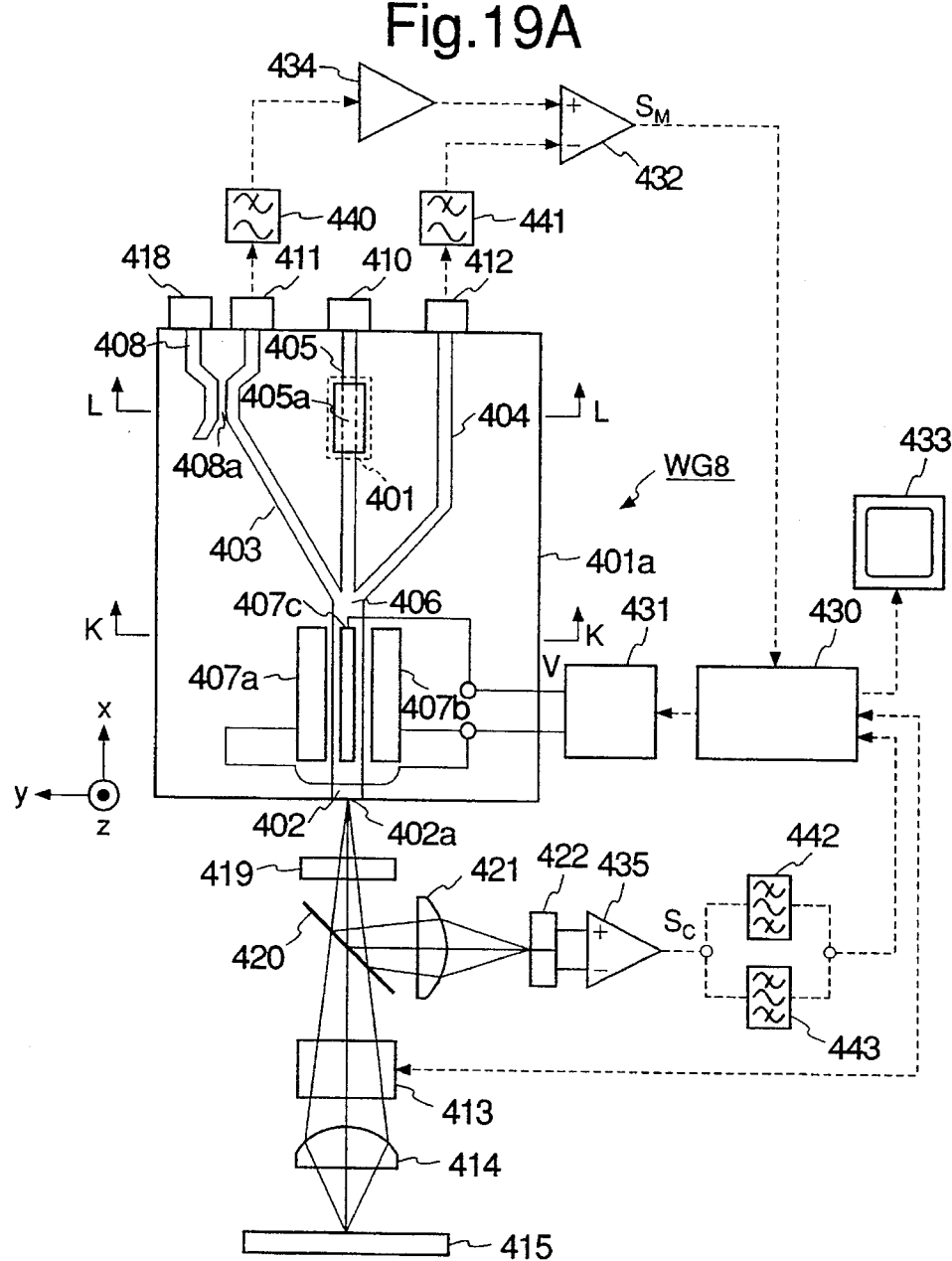
FIG. 19A is a schematic diagram showing a mode interference type laser scanning microscope according to the eighth embodiment of the present invention.
Figure 19B:
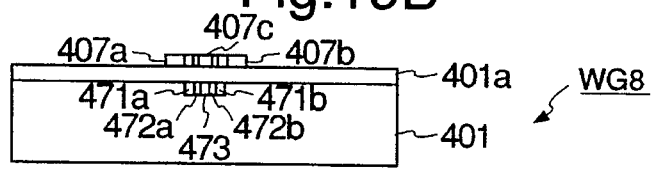
FIG. 19B is a sectional view of an optical branching device in FIG. 19A taken along arrows K—K in FIG. 19A.
Figure 19C:
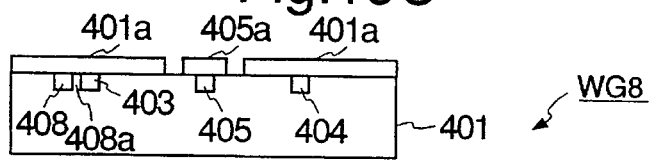
FIG. 19C is a sectional view of the optical branching device in FIG. 19A taken along arrows L—L in FIG. 19A.

FIGS. 19A to 19C are schematic views showing a mode interference type laser scanning microscope according to the eighth embodiment. Note that the same reference numerals in FIGS. 19A to 19C denote the same reference numerals as in FIGS. 15A to 15C. In this embodiment, a substrate 401 is cut along a plane perpendicular to the z-axis of the crystallographic axes x, y, and z of $LiNbO_3$, and respective channel waveguides are formed in the x-direction. For this reason electrodes 407a 407b and 407c for modulating the refractive index of a trunk channel waveguide 402 are arranged on the upper surface and the two sides of the trunk channel waveguide 402. By applying a voltage V across the electrodes 407a, 407b, and 407c on the upper surface and the two sides of the trunk channel waveguide 402, a longitudinal electric field, in the direction of depth, of the trunk channel waveguide 402 is generated.

An optical power distributor is connected to a left branch channel waveguide 403 in an optical branching device WG8, and this embodiment adopts a directional coupler as the optical power distributor. More specifically, a calibration light entrance channel waveguide 408 is formed adjacent to the left branch channel waveguide 403, and a distribution portion 408a where the two channel waveguides are formed to have a smaller interval therebetween is formed between the two channel waveguides 403 and 408. A calibration light source 418 for emitting calibration light of z-polarization, i.e., polarized light in the direction of depth of each channel waveguide, is connected to the upper end of the calibration light entrance channel waveguide 408. This arrangement does not require any alignment of the calibration light source 418. A main light source 410 for emitting illumination light of y-polarization, i.e., polarized light in the widthwise direction of each channel waveguide, is connected to the upper end of a central branch channel waveguide 405.

The trunk channel waveguide 402 serves as a single-mode optical waveguide for y-polarized light, and serves as a double-mode optical waveguide which excites 1st-mode light in the branching direction of the branch channel waveguides, i.e., in the y-direction for z-polarized light. A central branch channel waveguide 405 serves as a single-mode optical waveguide for both y- and z-polarized light beams. A right branch channel waveguide 404, the left branch channel waveguide 403, and the calibration light entrance channel waveguide 408 serve as single-mode optical waveguides for z-polarized light, and do not serve as optical waveguides for y-polarized light.

A return light prevention member is on the central branch channel waveguide 405. More specifically, a polarizer 405a serving as a metal cladding layer 405a is formed on the substrate 401 without sandwiching any buffer layer 401a therebetween, so as to absorb polarized light in the direction of depth and to pass polarized light in the widthwise direction. Illumination light emitted by the main light source 410 is transmitted through the polarizer 405a since it is y-polarized light in the widthwise direction, and light reflected by an object 415 to be detected is absorbed by the polarizer 405a since it is converted into z-polarized light in the direction of depth by a quarter-wave plate 419. Therefore, the reflected light does not reach the main light source 410.

Figure 20A:
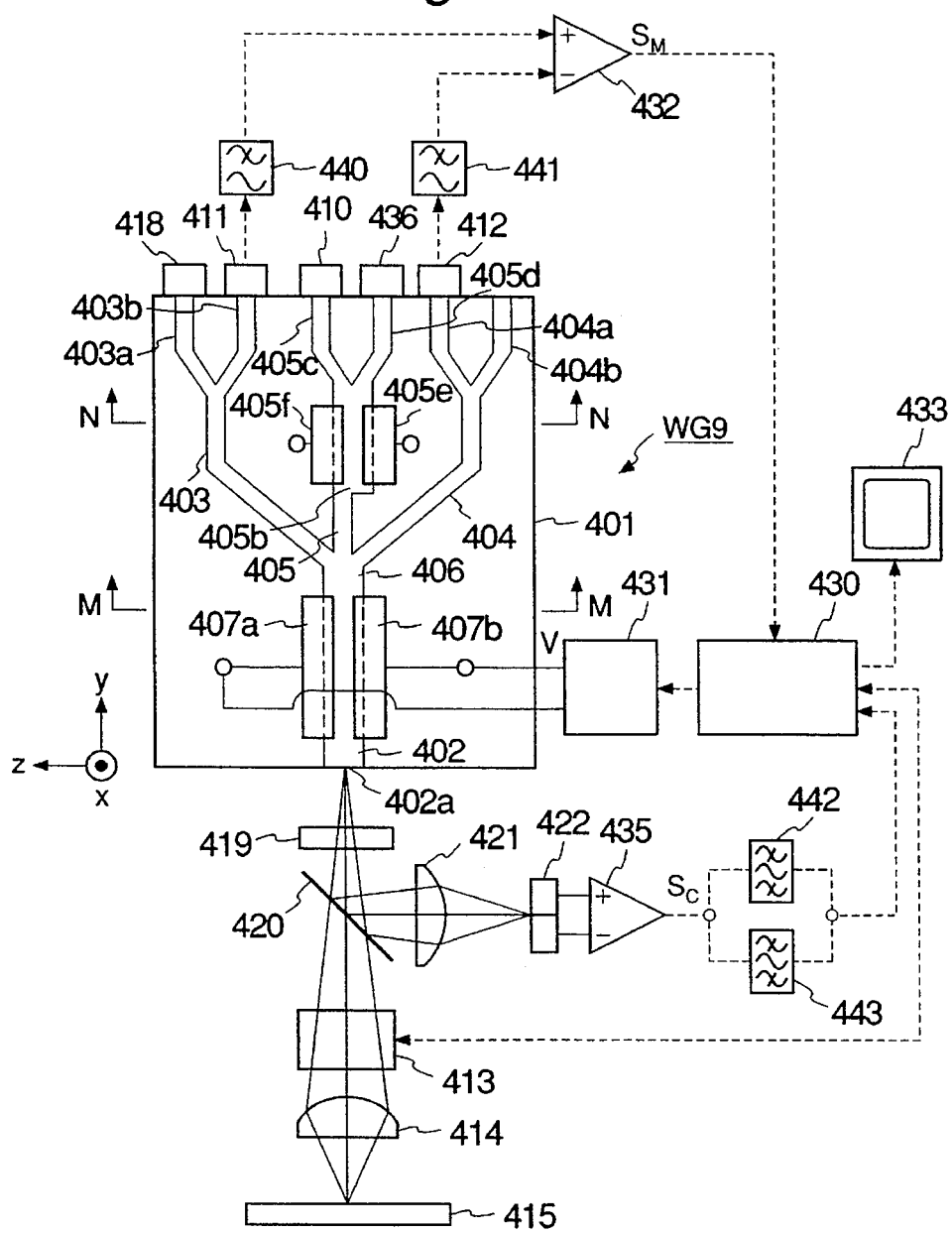
FIG. 20A is a schematic diagram showing a mode interference type laser scanning microscope according to the ninth embodiment of the present invention.
Figure 20B:
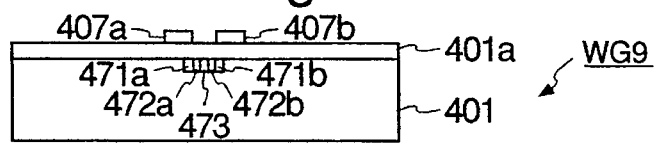
FIG. 20B is a sectional view of an optical branching device in FIG. 20A taken along arrows M—M in FIG. 20A.
Figure 20C:
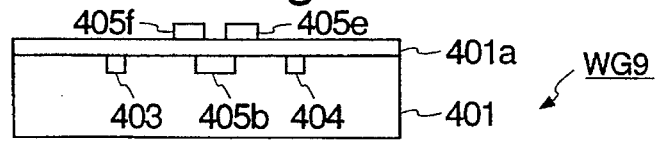
FIG. 20C is a sectional view of the optical branching device in FIG. 20A taken along arrows N—N in FIG. 20A.

FIGS. 20A to 20C are schematic views showing a mode interference type laser scanning microscope according to the ninth embodiment of the present invention. In this microscope, a substrate 401 is cut along a plane perpendicular to the z-axis of the crystallographic axes x, y, and z of $LiNbO_3$, and respective channel waveguides are formed in the x-direction.

In an optical branching device WG9 of this embodiment, a mode splitter for preventing return light is arranged on the upper portion of a central branch channel waveguide 405. More specifically, a central middle channel waveguide 405b is connected to the upper end of the central branch channel waveguide 405, and central right and left channel waveguides 405d and 405c are branched from the upper end of the central middle channel waveguide 405b. A main light source 410 for emitting illumination light of x-polarization is connected to the upper end of the central left channel waveguide 405c, and a return light detector 436 is connected to the upper end of the central right channel waveguide 405d. The central middle channel waveguide 405b is formed as a double-mode optical waveguide, and a pair of mode split electrodes 405e and 405f are formed on the two sides of the waveguide 405b. These electrodes 405e and 405f are used for adjusting the mode split ratio, and may be omitted. However, these electrodes are preferably arranged like in this embodiment to remove variations in device manufacturing processes. The central right and left channel waveguides 405d and 405c are formed as single-mode optical waveguides.

Illumination light of x-polarization emitted by the main light source 410 propagates along the central left channel waveguide 405c, the central middle channel waveguide 405b, the central branch channel waveguide 405, and a trunk channel waveguide 402. Since light reflected by an object 415 to be detected is converted into z-polarized light, the reflected light propagates along the trunk channel waveguide 402, the central branch channel waveguide 405, and the central middle channel waveguide 405b, and then reaches the return light detector 436 via the central right channel waveguide 405d. By adjusting the voltage to be applied across the mode split electrodes 405e and 405f to maximize the light intensity detected by the return light detector 436, the reflected light can be prevented from reaching the main light source 410. Note that the voltage applied to across the mode split electrodes 405e and 405f is used not only for preventing return light but also for adjustment to attain maximum coupling of the illumination light from the main light source to the central branch channel waveguide 405.

Optical power distributors are connected to the upper ends of the right and left branch channel waveguides 403 and 404, and this embodiment adopts optical power distributors with a Y-branch structure. More specifically, a left left channel waveguide 403a and a left right channel waveguide 403b are branched from the upper end of the left branch channel waveguide 403, a calibration light source 418 for emitting calibration light of z-polarization is connected to the upper end of the left left channel waveguide 403a, and a left photodetector 411 is connected to the upper end of the left right channel waveguide 403b. This arrangement does not require any alignment of the calibration light source 418. A right left channel waveguide 404a and a right right channel waveguide 404b are branched from the upper end of the right branch channel waveguide 404, and a right photodetector 412 is connected to the upper end of the right left channel waveguide 404a. The optical power distributors provided to both the right and left branch channel waveguides 404 and 403 are formed to obtain the same split ratio, and as a result, the amplifier 434 in FIG. 19A for compensating for a loss due to the power split is omitted.

Figure 21A:
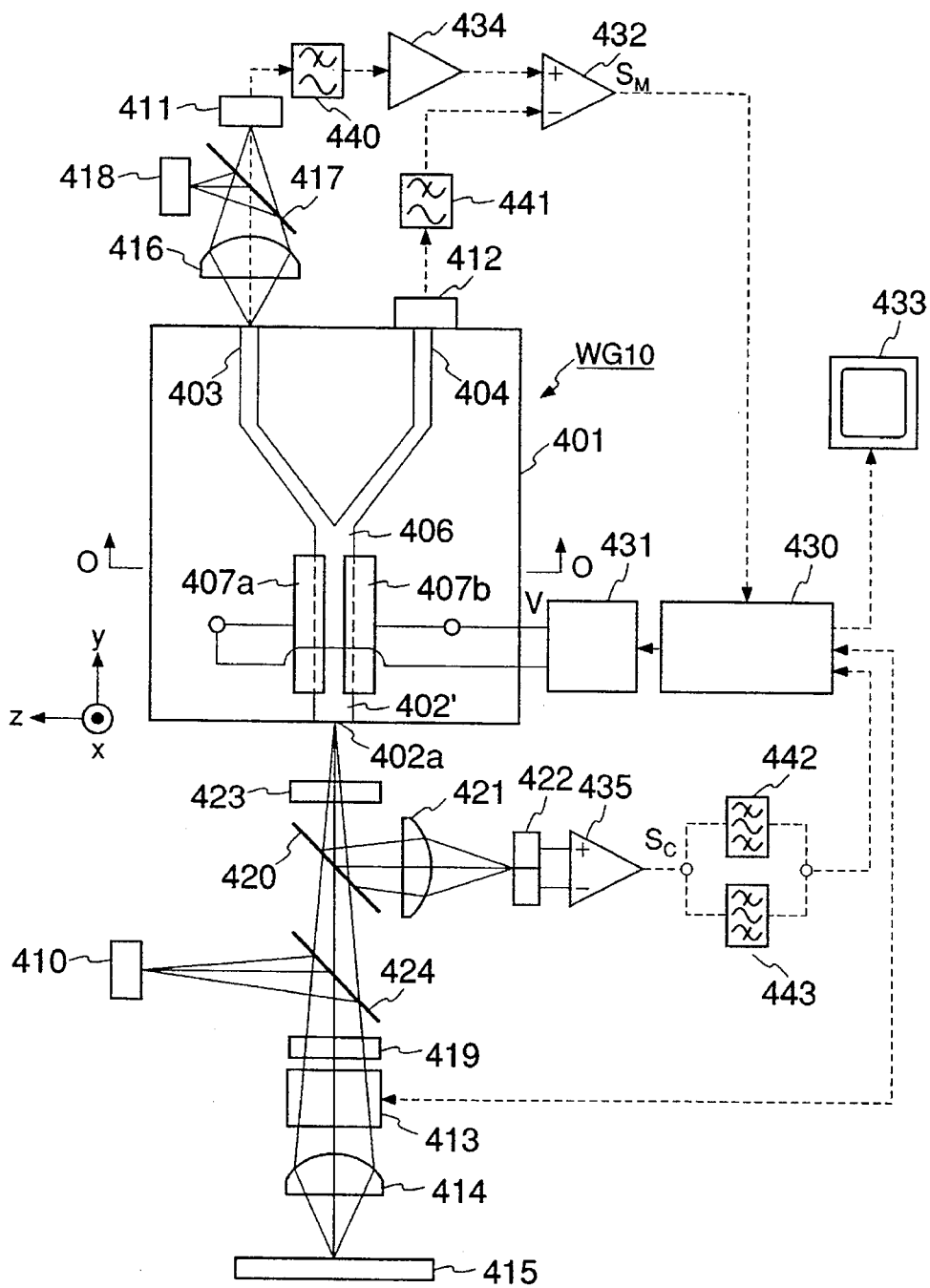
FIG. 21A is a schematic diagram showing a mode interference type laser scanning microscope according to the 10th embodiment of the present invention.
Figure 21B:
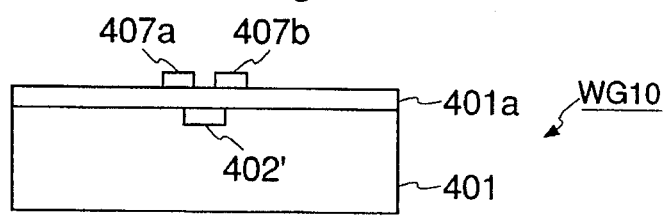
FIG. 21B is a sectional view of an optical branching device in FIG. 21A taken along arrows O—O in FIG. 21A.
Figure 22A:
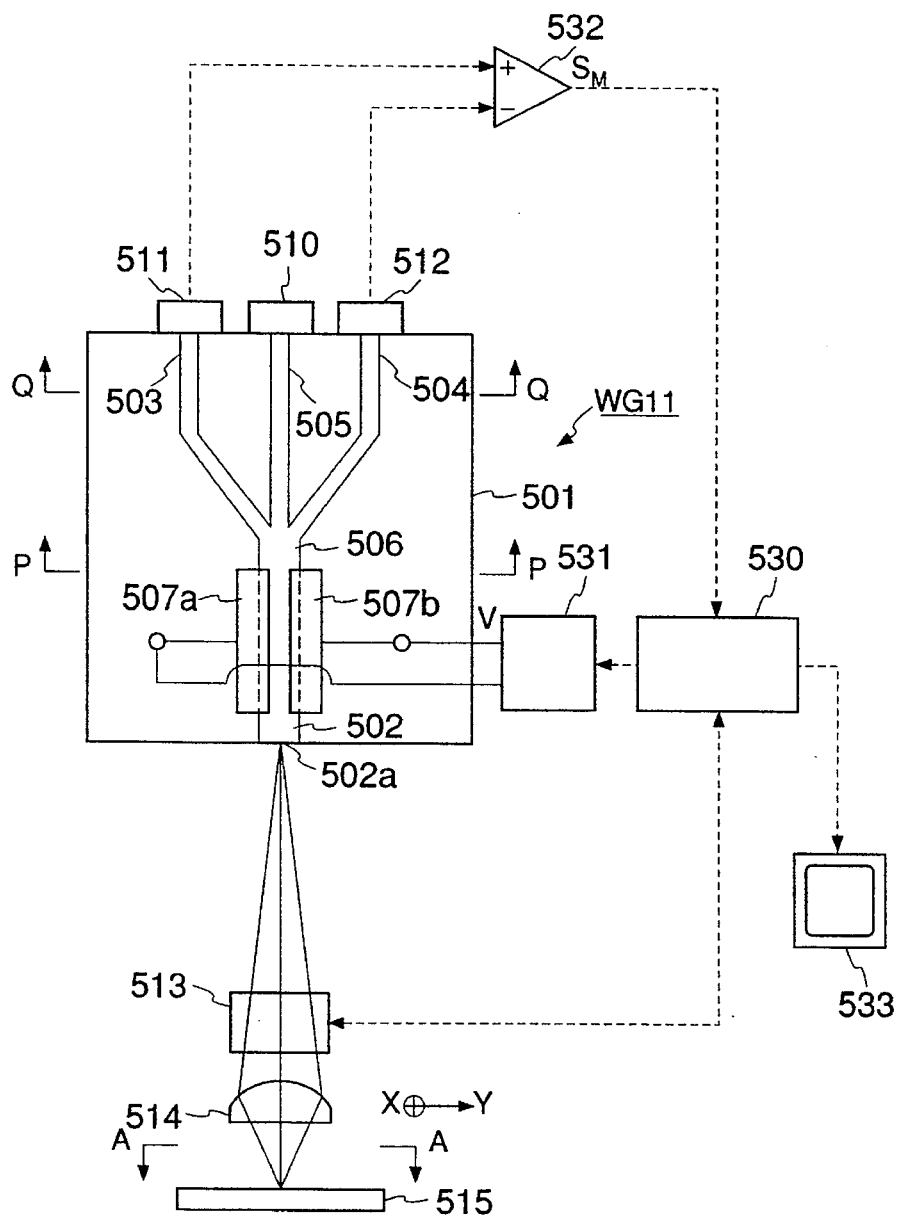
FIG. 22A is a schematic diagram showing a mode interference type laser scanning microscope according to the 11th embodiment of the present invention.
Figure 22B:
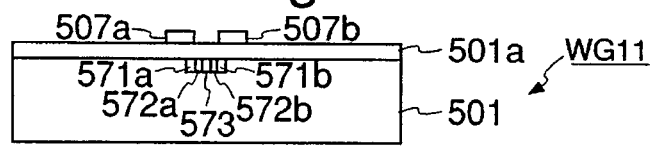
FIG. 22B is a sectional view of an optical branching device in FIG. 22A taken along arrows P—P in FIG. 22A.
Figure 22C:
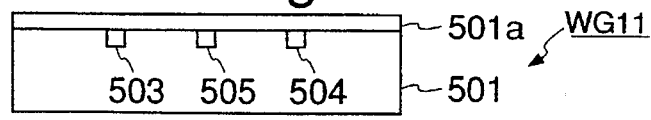
FIG. 22C is a sectional view of the optical branching device in FIG. 22A taken along arrows Q—Q in FIG. 22A.

FIGS. 21A and 21B are schematic views showing a mode interference type laser scanning microscope according to the 10th embodiment of the present invention. In an optical branching device WG10, the central branch channel waveguide 405 in FIG. 15A is omitted. A polarizing plate 423, a calibration light exit beam splitter 420, an illumination light entrance beam splitter 424, a quarter-wave plate 419, a two-dimensional scanner 413, and a focusing optical system 414 are inserted in the order named between an end face 402a of a trunk channel waveguide 402' and an object 415 to be detected. The polarizing plate 423 is arranged to cut x-polarized light and to pass z-polarized light, and the illumination light entrance beam splitter 424 receives illumination light of x-polarization from a main light source 410. According to this arrangement, since illumination light does not pass the respective channel waveguides, the intensity distribution of the illumination light can be perfectly prevented from offsetting. Since calibration light of x-polarization, which is reflected by the object 415 to be detected, and propagates toward the trunk channel waveguide 402', is cut by the polarizing plate 423, a main differential signal $S_M$ based on the calibration light can be perfectly set to be zero.

In the eighth, ninth, and 10th embodiments as well, the output signals from the right and left photodetectors 403 and 404 are input to the main differential amplifier 432 via the right and left low-pass fillers 441 and 440. The output, i.e., the calibration differential signal $S_C$, from the calibration differential amplifier 435 is input to the controller 430 via the first and second band-bass filters 442 and 443 which are selectively connected.

Therefore, when phase information is to be observed, the controller 430 adjusts the DC voltage $V_D$, so that a 2nd-order harmonic component $2f$ detected by the first band-pass filter 442 becomes zero; when amplitude information is to be observed, the controller 430 adjusts the DC voltage $V_D$, so that a fundamental frequency component f detected by the second band-pass filter 443 becomes zero. With this adjustment, the influence of a DC drift can be eliminated. Since the right and left low-pass filters 441 and 440 are connected to the right and left photodetectors 412 and 411, information included in reflected light can be reliably detected.

In each of the above embodiments, the mode interference type laser scanning microscope has been exemplified. However, the present invention is not limited to the microscope, but may be applied to any other apparatuses as long as they have a double-mode optical waveguide, two branch optical waveguides, and means for applying an electric field to the double-mode optical waveguide.

In each of the above embodiments, the pair of electrodes 407a and 407b are arranged on the two sides of the trunk channel waveguide 402. However, the above-mentioned arrangement of the electrodes 407a and 407b is not always the best depending on, e.g., the directions of the crystallographic axes of the substrate 401, and the like, and the electrodes need only be arranged to generate an electric field so as to change the coupling length $L_C$ of the trunk channel waveguide 402. In each of the above embodiments, the light spot is scanned on the object 415 to be detected using the X-Y two-dimensional scanner 413 such as a vibration mirror, a rotary mirror, or the like. However, a scanning device need only move the light spot relative to the object 415 to be detected. For this reason, the light spot may be fixed in position, and the stage on which the object 415 to be detected is placed may be scanned.

Furthermore, in each of the above embodiments, the two-split photodiode 422 is used. In place of the two-split photodiode, a PSD, linear sensor, CCD camera, or the like may be used.

As described above, according to the present invention, a voltage obtained by superposing an AC voltage on a DC voltage is used as a voltage to be applied to the trunk channel waveguide, and the output signal from the calibration differential amplifier is input to the band-pass filter, thus correcting a DC drift. In addition, since the output signals from the right and left photodetectors are input to the right and left low-pass filters, required information can be reliably detected. Therefore, an optical information detection device and a mode interference type laser scanning microscope with high detection accuracy can be provided.

Prior to a description of other embodiments, how devices according to these embodiments were achieved will be explained below.

In recent years, optical waveguides have received a lot of attention in various fields since the optical system can be rendered compact and lightweight using the optical waveguide, and is free from adjustment of the optical axis. The optical waveguides are classified into a single-mode waveguide in which only 0th-mode light is excited on the basis of the difference between the refractive indices of an optical waveguide (core portion) and a substrate (cladding portion), and the width or refractive index distribution of the optical waveguide, a double-mode waveguide in which two mode light beams, i.e., 0th- and 1st-mode light beams are excited, and a multi-mode waveguide in which three or more mode light beams, i.e., 0th-, 1st-, 2nd-mode light beams, and the like are excited. In the double-mode waveguide and the multi-mode waveguide, a plurality of mode light beams are not always excited, and these waveguides are classified depending on the maximum number of mode light beams to be excited. For example, only 0th-mode light may be excited depending on the position or state of light incident into the optical waveguide.

As an application of such an optical waveguide to a new field, an optical information detection device which utilizes a mode interference phenomenon in a double-mode channel optical waveguide is known. As the optical information detection device, a device disclosed in, e.g., Japanese Patent Laid-Open No. 6-160718 is known. This device comprises a trunk channel optical waveguide which guides principal light incident from its one end in double modes, electrodes for applying an electric field to the trunk channel optical waveguide, a voltage application unit for applying a voltage to the electrodes, right and left branch channel optical waveguides connected to the other end of the trunk channel optical waveguide, and right and left photodetectors for detecting intensities of principal light beams emerging from the other ends of the branch channel optical waveguides, and the device detects information included in principal light incident on one end of the trunk channel optical waveguide on the basis of output signals from the two photodetectors.

In the optical information detection device, the coupling length of the trunk channel optical waveguide is changed by changing the voltage to be applied to the electrodes, thereby distinguishing phase information and amplitude information included in principal light incident on one end of the trunk channel optical waveguide from each other. However, when an electric field is applied to the trunk channel optical waveguide, a phenomenon called a DC drift occurs, and an electric field cannot often be accurately applied to the trunk channel optical waveguide.

The DC drift is a phenomenon that when a voltage is applied to electrodes formed in the vicinity of the optical waveguide via the buffer layer for a long period of time, a charge moves in the substrate surface or in the buffer layer arranged between the electrodes and the optical waveguide to generate a counter-electric field, and the electric field is not effectively applied to the optical waveguide. In the optical information detection device, the coupling length is determined by controlling the electric field to be applied to the trunk channel optical waveguide depending on how to observe light incident into the trunk channel optical waveguide. Therefore, when a DC drift occurs, since the coupling length cannot be accurately determined, information to be observed in light incident into the trunk channel optical waveguide cannot be defined, and the accuracy of the optical information detection device is degraded.

Therefore, the present invention has as its object to provide an optical information detection device with higher detection accuracy, and a mode interference type laser scanning microscope using the device.

The device according to each of the 11th to 13th embodiments of the present invention will be briefly described below.

The present invention has been made to achieve the above object, and provides an optical information detection device, which comprises a trunk channel optical waveguide which guides principal light incident from its one end in double modes, electrodes for generating an electric field to control the coupling length of the trunk channel optical waveguide, a voltage application unit for applying a voltage to the electrodes, right and left branch channel optical waveguides connected to the other end of the trunk channel optical waveguide, right and left photodetectors for respectively detecting the intensities of the principal light beams emerging from the other ends of the two branch channel optical waveguides, and a controller for detecting information included in the principal light incident on one end of the trunk channel optical waveguide on the basis of output signals from the two photodetectors, characterized in that the voltage application unit applies an AC voltage to the electrodes, and the controller picks up the output signals from the two photodetectors in synchronism with a timing at which the AC voltage becomes equal to a prescribed value.

The present invention also provides an optical information detection device, which comprises a trunk channel optical waveguide which guides principal light incident from its one end in double modes, electrodes for generating an electric field to control the coupling length of the trunk channel optical waveguide, a voltage application unit for applying a voltage to the electrodes, right and left branch channel optical waveguides connected to the other end of the trunk channel optical waveguide, right and left photodetectors for respectively detecting the intensities of the principal light beams emerging from the other ends of the two branch channel optical waveguides, and a controller for detecting information included in the principal light incident on one end of the trunk channel optical waveguide on the basis of output signals from the two photodetectors, characterized in that the voltage application unit applies an AC voltage to the electrodes, a calibration light source is arranged to input calibration light to the other end of one of the right and left branch channel optical waveguides, a calibration light intensity distribution detector is arranged to detect the light intensity distribution at one end of the trunk channel optical waveguide, which distribution is formed by the calibration light, and the controller picks up the output signals from the two photodetectors in synchronism with a timing at which the output signal from the calibration light intensity distribution detector becomes equal to a prescribed value.

The present invention also provides a mode interference type laser scanning microscope which utilizes the optical information detection device.

Independently of a steady or non-steady voltage, when a voltage with a predetermined polarity is applied to the electrodes, a charge gradually moves, and a DC drift occurs. For this reason, according to the present invention, since an AC voltage whose polarity is inverted along with an elapse of time is applied, a charge can be prevented from staying at a predetermined position in the substrate surface or buffer layer, and a counter-electric field due to movement of a charge can be eliminated, thus eliminating a DC drift.

A mode interference type laser scanning microscope will be described below with reference to FIGS. 22A to 28C. An optical branching device WG11 comprises an LiNbO$_3$ substrate 501, a buffer layer 501a formed on the substrate 501, and a pair of electrodes 507a and 507b formed on a trunk channel optical waveguide 502 via the buffer layer 501a. The trunk channel optical waveguide 502 comprises a region 573 containing Ti, regions 572a and 572b containing Ti and protons, and regions 571a and 571b containing protons. On the substrate 501, a central branch channel optical waveguide 505, a left branch channel optical waveguide 503, a right branch channel optical waveguide 504, and the trunk channel optical waveguide 502 are formed. The lower end of the central branch channel optical waveguide 505 is coaxially connected to the trunk channel optical waveguide 502 via a branching portion 506, the lower ends of the right and left branch channel optical waveguides 504 and 503 are connected to the branching portion 506, and the lower end of the trunk channel optical waveguide 502 serves as an end face 502a through which light enters/exits. The pair of electrodes 507a and 507b are arranged on the two sides of the trunk channel optical waveguide 502 via the buffer layer 501a. A voltage application unit 531 applies an AC voltage V across the two electrodes 507a and 507b, and the voltage V is controlled by a controller 530.

The respective branch channel optical waveguides are formed as single-mode optical waveguides. Note that the right and left branch channel optical waveguides 504 and 503 need not always be formed as single-mode optical waveguides as long as they can guide light. The trunk channel optical waveguide 502 is formed as a double-mode optical waveguide, which excites 1st-mode light in the branching direction of the right and left branch channel optical waveguides. A main laser beam source 510 is connected to the upper end of the central branch channel optical waveguide 505, and right and left photodetectors 512 and 511 are respectively connected to the upper ends of the right and left branch channel optical waveguides 504 and 503. The outputs from the two photodetectors 511 and 512 are input to a main differential amplifier 532. The output, i.e., a main differential signal $S_M$, from the main differential amplifier 532 is input to the controller 530. A monitor 533 is connected to the controller 530.

An X-Y two-dimensional scanner 513, a focusing optical system 514, and an object 515 to be detected are arranged in the order named below the end face 502a of the trunk channel optical waveguide. The two-dimensional scanner 513 is controlled by the controller 530, and the focusing optical system 514 is arranged to focus illumination light emerging from the end face 502a of the trunk channel optical waveguide onto the object 515 to be detected.

Illumination light emitted by the main light source (laser beam source) 510 propagates along the central branch channel optical waveguide 505 and the trunk channel optical waveguide 502, and emerges from the end face 502a of the trunk channel optical waveguide. Since the central branch channel optical waveguide 505 is formed as a single-mode optical waveguide, the illumination light propagating along the central branch channel optical waveguide 505 is single-mode light. Although the trunk channel optical waveguide 502 is formed as a double-mode optical waveguide, since the trunk channel optical waveguide 502 and the central branch channel optical waveguide 505 are coaxially arranged, the illumination light incident from the central branch channel optical waveguide 505 to the trunk channel optical waveguide 502 excites only 0th-mode light in the trunk channel optical waveguide 502, and hence, the illumination light emerging from the end face 502a of the trunk channel optical waveguide is single-mode light. The optical path of the illumination light emerging from the end face 502a of the trunk channel optical waveguide is deflected in a direction perpendicular to its propagating direction, i.e., in the X-Y direction when the light passes the two-dimensional scanner 513. The illumination light is then focused on the object 515 to be detected by the focusing optical system 514, and is reflected by the object 515 to be detected.

The light reflected by the object 515 to be detected propagates the forward optical path in the opposite direction, is focused on the end face 502a of the trunk channel optical waveguide, and is incident into the trunk channel optical waveguide 502. Since the end face 502a of the trunk channel optical waveguide has the same function as a pinhole, this microscope serves as a confocal laser scanning microscope.

When the reflection surface of the object 515 to be detected has a slope in the right-and-left direction or the reflectance of the reflection surface has a gradient in the right-and-left direction, the phase distribution of the reflected light has a gradient in the right-and-left direction or the amplitude distribution of the reflected light becomes asymmetrical in the right-and-left direction, accordingly. When the reflected light whose phase distribution has a gradient in the right-and-left direction, or whose amplitude distribution of the effected light becomes asymmetrical in the right-and-left direction, is incident into the trunk channel optical waveguide 502, 1st-mode light is excited in the trunk channel optical waveguide 502 in addition to 0th-mode light, and the intensity distribution of the light propagating along the trunk channel optical waveguide 502 shifts to the right and left in a zigzag pattern upon interference between the two mode light beams.

The reflected light propagating along the trunk channel optical waveguide 502 is branched to the respective branch channel Optical waveguides by the branching portion 506. Of these branched light beams, the light beams propagating along the right and left branch channel optical waveguides 504 and 503 are respectively detected by the right and left photodetectors 512 and 511. The difference between the outputs from the two photodetectors 511 and 512 is calculated by the main differential amplifier 532. The controller 530 synthesizes the slope of the reflection surface of the object 515 to be detected or the gradient of the reflectance of the reflection surface, i.e., a differential image, and displays the synthesized image on the monitor 533. In this manner, the slope of the reflection surface of the object 515 to be detected is detected on the basis of phase information of changes in intensity distribution of light propagating along the trunk channel optical waveguide 502, and the gradient of the reflectance of the object 515 to be detected is detected on the basis of its amplitude information.

The phase information and the amplitude information are discriminated from each other as follows. When the length of the double-mode region of the trunk channel optical waveguide 502 is represented by L, and the coupling length, i.e., the length obtained when the phase difference between the 0th-mode light and 1st-mode light of light propagating along the trunk channel optical waveguide 502 in double modes becomes 180°, is represented by $L_C$, only the phase information of the object 515 to be detected is detected if the following equation is satisfied:

$$L=L_C(2m+1)/2 \ (m=0, 1, 2, \ldots) \quad (5)$$

On the other hand, only the amplitude information of the object 515 to be detected is detected if the following equation is satisfied:

$$L=mL_C \ (m=1, 2, \ldots) \quad (6)$$

When the length L of the double-mode region of the trunk channel optical waveguide 502 is other than those defined by equations (5) and (6), both the phase information and amplitude information are detected at a predetermined ratio.

The length L of the double-mode region of the trunk channel optical waveguide 502 means a length in which light actually propagates in double modes, and does not always match the physical length of the trunk channel optical waveguide 502. For example, when the three single-mode channel optical waveguides 503, 504, and 505 are connected to the upper end of the trunk channel optical waveguide 502 via the branching portion 506 as in this embodiment, optical coupling occurs among the respective channel optical waveguides in a region where the distance between each two adjacent channel optical waveguides is not sufficient, and light often propagates in the double modes in such a region.

On the other hand, the coupling length $L_C$ can be changed by generating an electric field onto the trunk channel waveguide 502 upon application of a voltage across the two electrodes 507a and 507b. In other words, the coupling length $L_C$ is changed by controlling a voltage V to be applied to the electrodes 507a and 507b, and the phase or amplitude information of the object 515 to be detected can be arbitrarily observed.

Figure 23A:
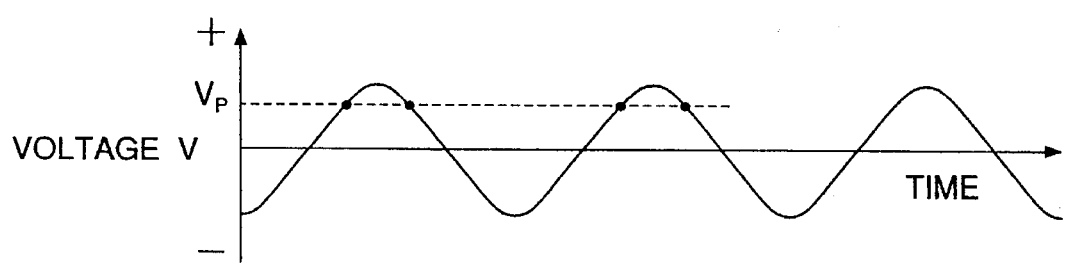
FIGS. 23A and 23B are charts showing the voltages to be applied to electrodes of the 11th embodiment.
Figure 23B:
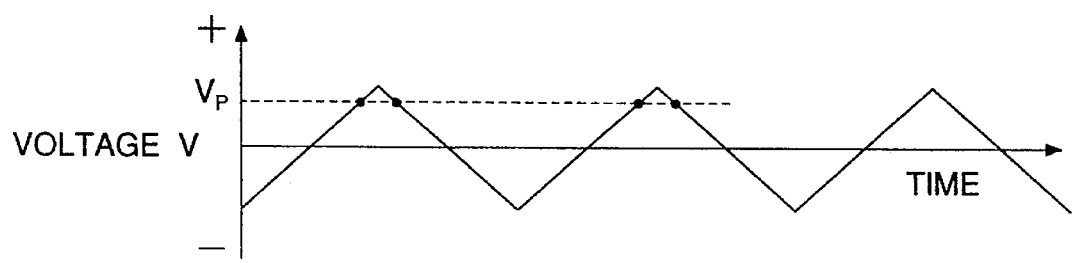

In a conventional mode interference type laser scanning microscope, a voltage with a constant polarity is applied to the electrodes 507a and 507b. However, in this embodiment, an AC voltage V whose polarity changes along with an elapse of time is applied to the electrodes. The AC voltage V may have a sine waveform, as shown in FIG. 23A, or a triangular waveform, as shown in FIG. 23B. Also, the AC voltage V may have a rectangular waveform, or a voltage having an asymmetrical waveform pattern on the positive and negative sides may be applied. Data is fetched at a timing at which the AC voltage V coincides with a prescribed value $V_P$, i.e., a voltage corresponding to required information, as indicated by full circles in FIGS. 23A and 23B. Therefore, when the prescribed value $V_P$ is zero, the voltage V has either the positive or negative polarity while data is not picked up. On the other hand, when the prescribed value $V_P$ is not zero, the polarity of the voltage V is inverted for a predetermined period while data is not picked up.

Figure 24:
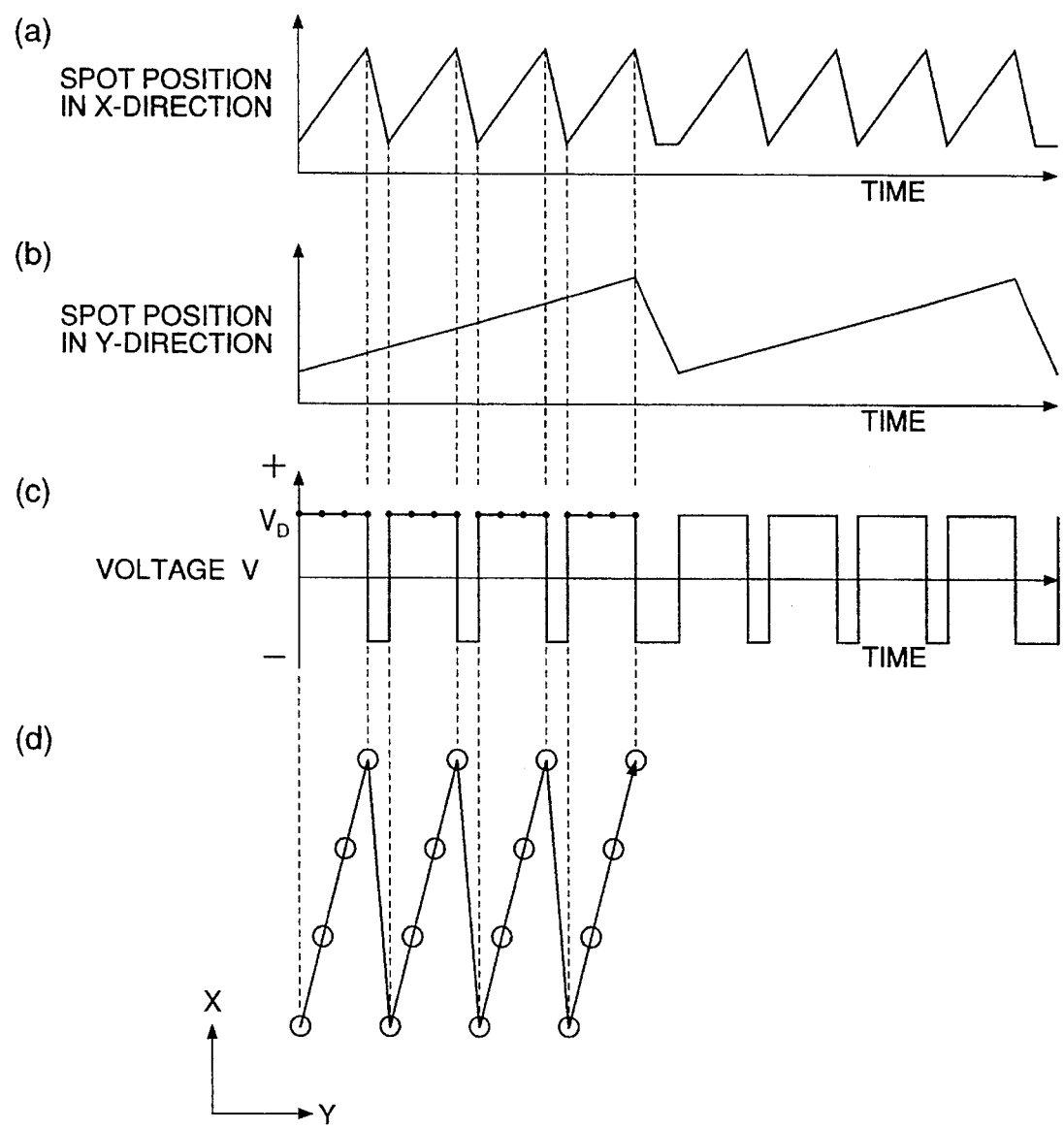
FIG. 24 shows the relationships between the voltage to be applied to the electrodes of the 11th embodiment and the operation of a two-dimensional scanner.
Figure 25:
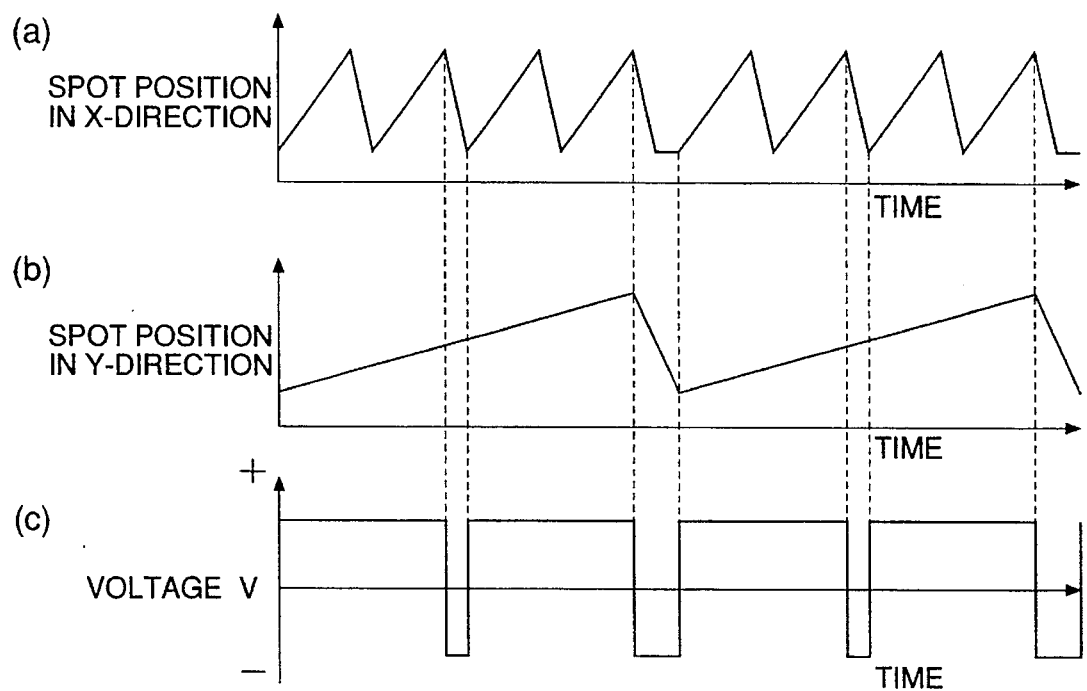
FIG. 25 shows another relationships between the voltage to be applied to the electrodes of the 11th embodiment and the operation of a two-dimensional scanner.
Figure 26:
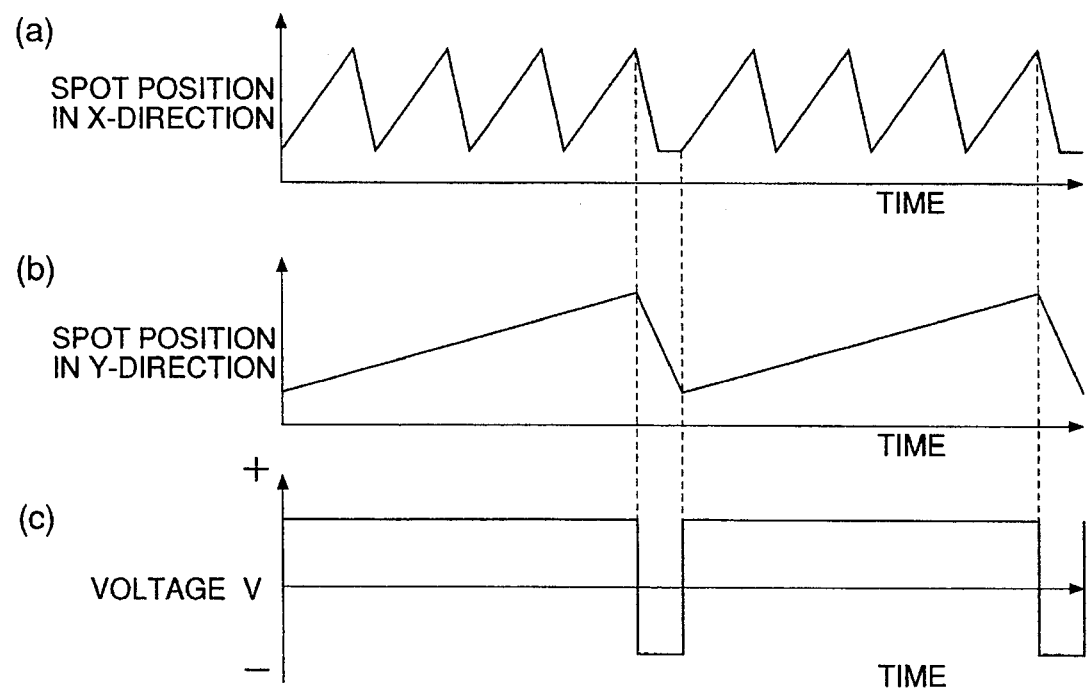
FIG. 26 shows still another relationships between the voltage to be applied to the electrodes of the 11th embodiment and the operation of a two-dimensional scanner.
Figure 27:
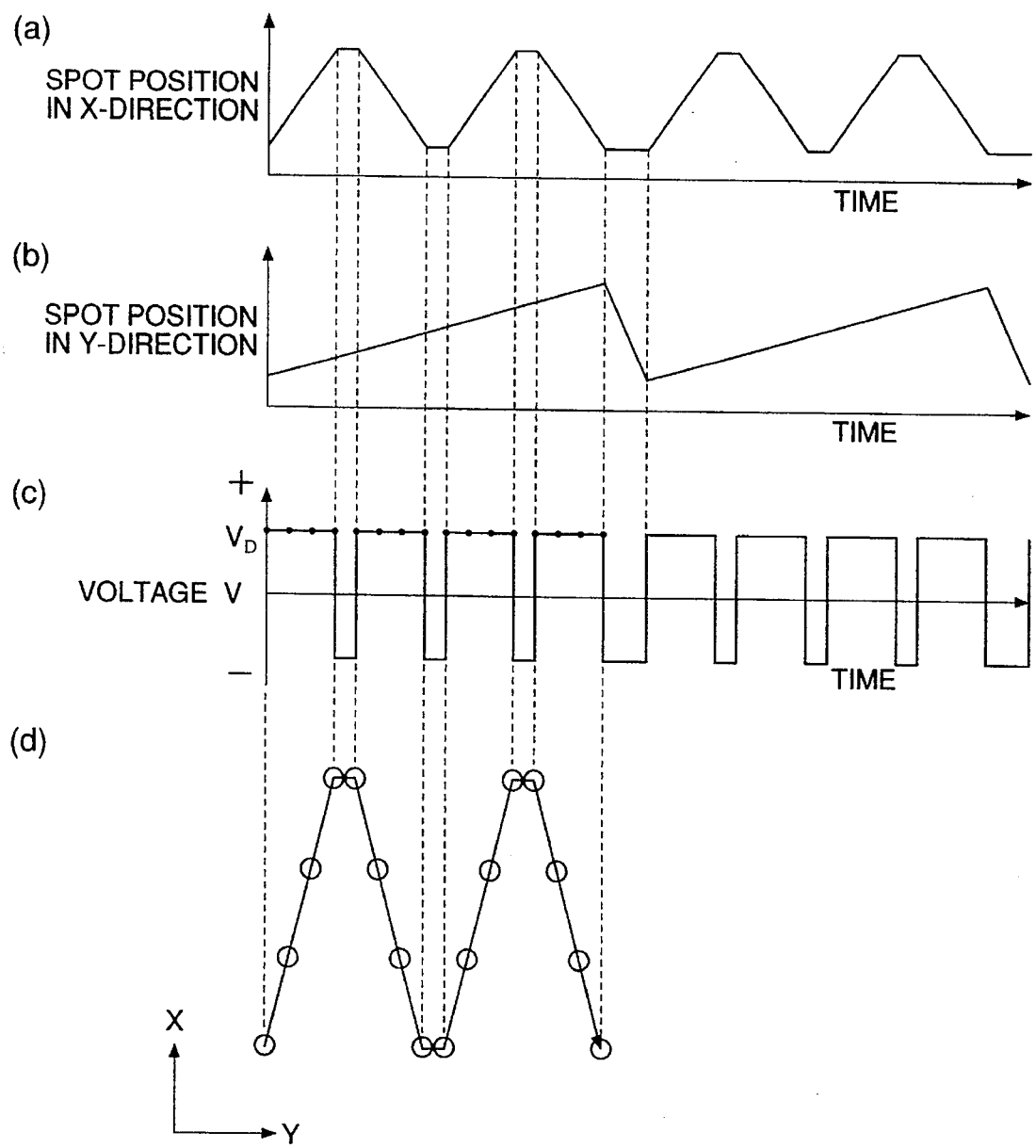
FIG. 27 shows still another relationships between the voltage to be applied to the electrodes of the 11th embodiment and the operation of a two-dimensional scanner.
Figure 28:
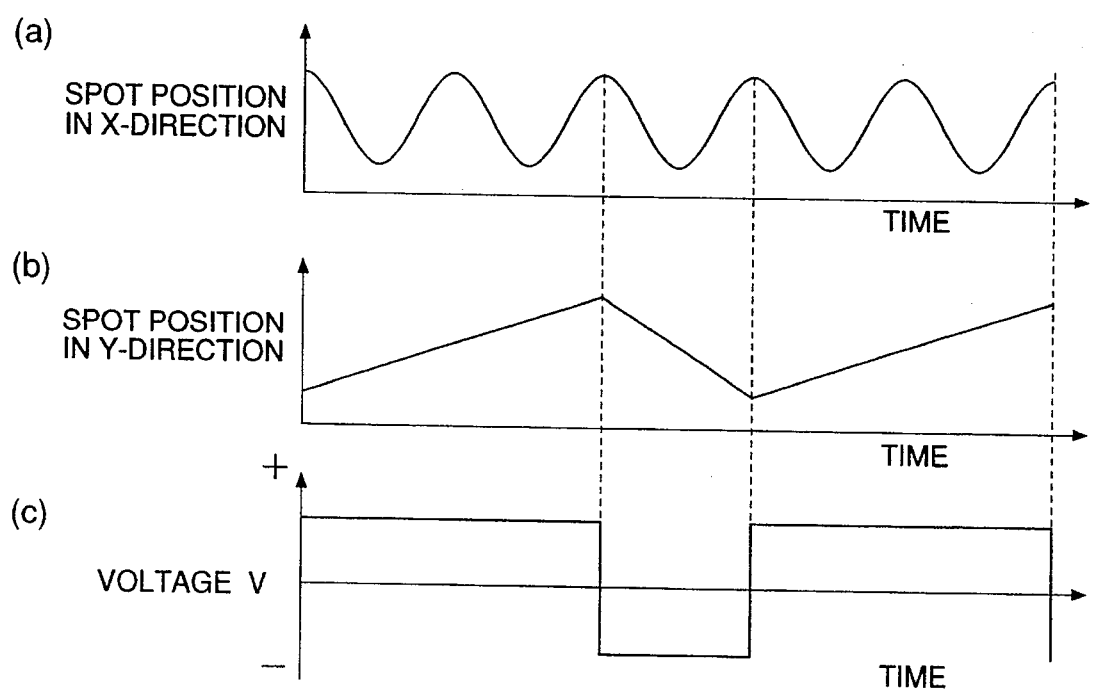
FIG. 28 shows still another relationships between the voltage to be applied to the electrodes of the 11th embodiment and the operation of a two-dimensional scanner.

The relationship between the voltage V to be applied to the electrodes 507a and 507b and the operation of the two-dimensional scanner 513 will be described below with reference to FIG. 24. Note that one image is defined by a large number of pixels in the microscope of this embodiment, but is defined by 16 (=4×4) pixels in FIG. 24 (a) to (d), for the sake of simplicity. FIG. 24(d) is a sectional view taken along a line A—A in FIG. 22A, and open circles in FIG. 24 (a) represent the spot positions of illumination light when a signal is picked up. FIG. 24 (a) shows the movement of the light spot in the X-direction, and FIG. 24 (b) shows the movement of the light spot in the Y-direction. The spot position is controlled by the X-Y two-dimensional scanner 513, which may comprise, e.g., a combination of two galvanometer scanners in the X- and Y-directions. FIG. 24 (c) shows the voltage V to be applied to the electrodes 507a and 507b. In this embodiment, the voltage V to be applied has a rectangular waveform, and is an asymmetrical voltage on the positive and negative sides. In addition, the polarity of the voltage is inverted for a period required for returning the spot position in the X-direction to an original position, after the light spot is scanned in the X-direction.

Other relationships between the voltage V to be applied to the electrodes 507a and 507b and the operation of the two-dimensional scanner 513 will be described below with reference to FIGS. 25 to 28. In the relationship shown in FIG. 25 (a) to (c), the polarity of the voltage is inverted in every other periods of the periods required for returning the spot position in the X-direction to an original position. In the relationship shown in FIG. 26 (a) to (c), the polarity of the voltage is inverted only for a period required for returning the spot position in the Y-direction to an original position after data for one frame is picked up. In the relationship shown in FIG. 27 (a) to (d), data is fetched in the forward and backward scans in the X-direction, and the polarity of the voltage is inverted for only a period required for switching between the forward and backward scans. In the relationship shown in FIG. 28 (a) to (c), a scan in the X-direction is performed in a sine pattern.

As described above, in this embodiment, since the AC voltage V is applied to the electrodes 507a and 507b formed on the double-mode optical waveguide, i.e., the trunk channel optical waveguide 502, movement of a charge in the surface of the substrate 501 or in the buffer layer arranged between the substrate 501 and the electrodes 507a and 507b can be prevented from offsetting, and hence, a DC drift can be eliminated.

Figure 29A:
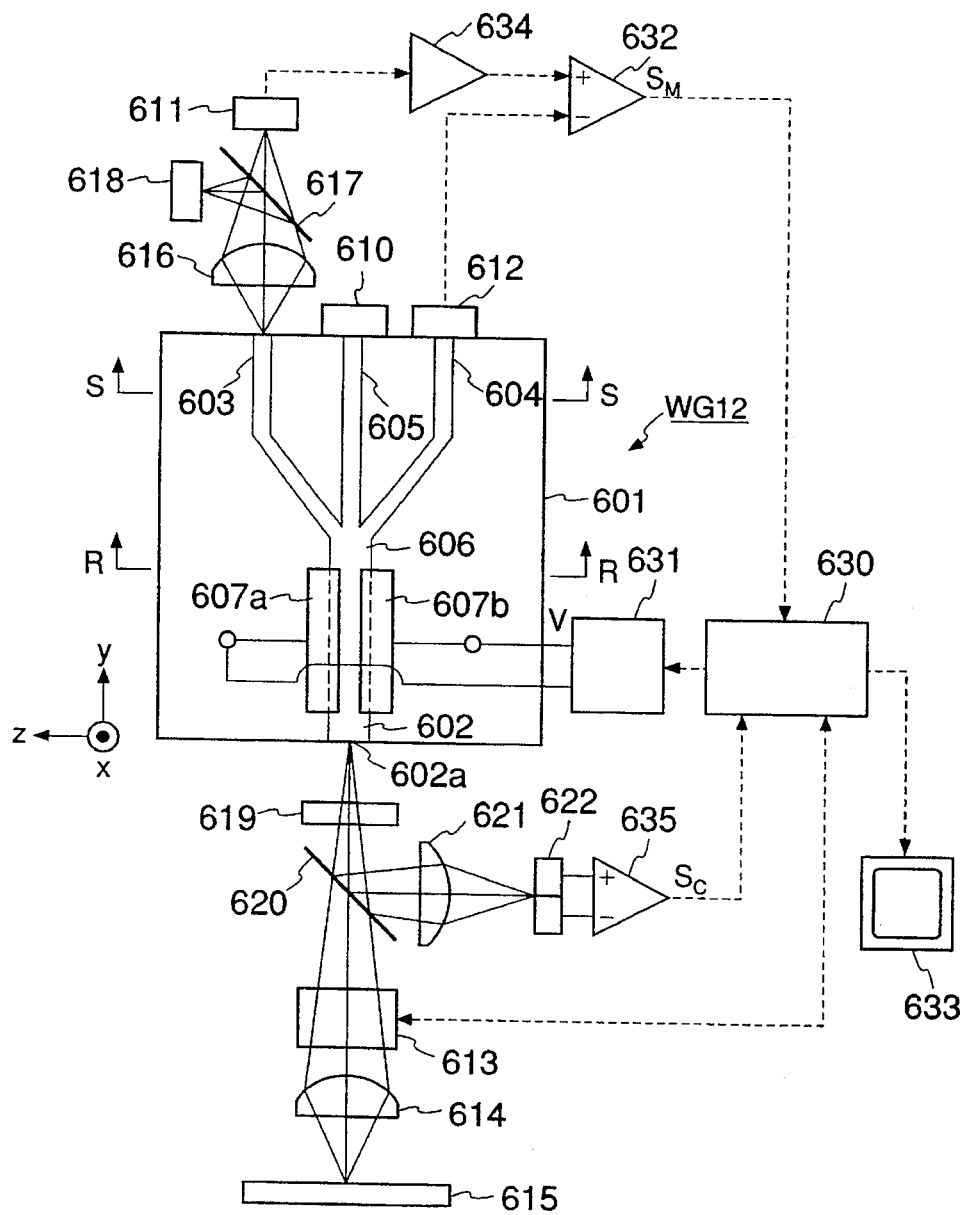
FIG. 29A is a schematic diagram showing a mode interference type laser scanning microscope according to the 12th embodiment of the present invention.
Figure 29B:
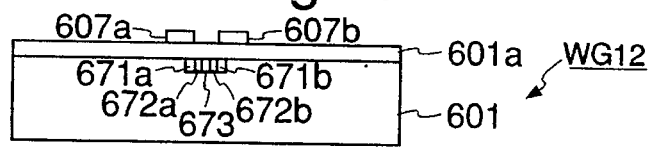
FIG. 29B is a sectional view of an optical branching device in FIG. 29A taken along arrows R—R in FIG. 29A.
Figure 29C:
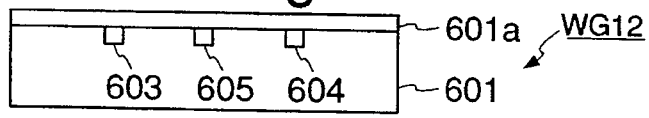
FIG. 29C is a sectional view of the optical branching device in FIG. 29A taken along arrows S—S in FIG. 29A.

FIGS. 29A, 29B, and 29C show a mode interference type laser scanning microscope according to the 12th embodiment of the present invention. An optical branching device WG12 comprises a substrate 601, a main channel 602 formed on a predetermined region of the substrate 601, and a pair of electrodes 607a and 607b formed on the main channel 602 via a buffer layer 601a. The main channel 602 comprises a region 673 containing Ti, regions 672a and 672b containing Ti and protons, and regions 671a and 671b containing protons. A central branch channel optical waveguide 605, a left branch channel optical waveguide 603, a right branch channel optical waveguide 604, and the trunk channel optical waveguide 602 are formed on the LiNbO$_3$ substrate 601. The substrate 601 is cut along a plane perpendicular to the x-axis of the crystallographic axes x, y, and z of LiNbO$_3$, and respective channel waveguides are formed in the y-direction. Therefore, the x-direction of the crystal corresponds to the direction of depth of each channel optical waveguide, and the z-direction of the crystal corresponds to the widthwise direction of each channel optical waveguide. The lower ends of the branch channel optical waveguides are connected to the trunk channel optical waveguide 602 via a branching portion 606, and the lower end of the trunk channel optical waveguide 602 serves as an end face 602a through which light enters/exits. The pair of electrodes 607a and 607b are formed on the two sides of the trunk channel optical waveguide 602 via the buffer layer 601a, and a voltage application unit 631 applies an AC voltage V across the two electrodes 607a and 607b. The voltage V is controlled by a controller 630.

The trunk channel optical waveguide 602 serves as a single-mode optical waveguide for linearly polarized light in the x-direction, and as a double-mode optical waveguide which excites 1st-mode light in the branching direction of the branch channel optical waveguides, i.e., in the z-direction for linearly polarized light in the z-direction. The central branch channel optical waveguide 605 serves as a single-mode optical waveguide for both the x- and z-polarized light beams. The right and left branch channel optical waveguides 604 and 603 serve as single-mode optical waveguides for z-polarized light, and do not serve as optical waveguides for x-polarized light. As means for manufacturing the optical waveguides with the above-mentioned functions, known means disclosed in, e.g., Japanese Patent Laid-Open No. 6-160718 can be used.

A main laser beam source (light source) 610 for generating x-polarized light is connected to the upper end of the central branch channel optical waveguide 605, and a right photodetector 612 is connected to the upper end of the right branch channel optical waveguide 604. A focusing lens 616, a calibration light entrance beam splitter 617, and a left photodetector 611 are arranged in the order named above the upper end of the left branch channel optical waveguide 603. The beam splitter 617 receives calibration light of z-polarization from a calibration laser beam source (light source) 618. The output signal from the left photodetector 611 is input to a main differential amplifier 632 via an amplifier 634, and the output signal from the right photodetector 612 is directly input to the main differential amplifier 632. The output, i.e., a main differential signal $S_M$, from the main differential amplifier 632 is input to the controller 630. A monitor 633 is connected to the controller 630.

A quarter-wave plate 619, a calibration light exit beam splitter 620, a two-dimensional scanner 613, a focusing optical system 614, and an object 615 to be detected are arranged in the order named below the end face 602a of the trunk channel optical waveguide. A focusing lens 621 and a two-split photodiode 622 are arranged in the order named beside the calibration light exit beam splitter 620. The output signals from the two-split photodiode 622 are input to a calibration differential amplifier 635. The output, i.e., a calibration differential signal $S_C$, from the calibration differential amplifier 635 is input to the controller 630. The two-dimensional scanner 613 is controlled by the controller 630.

Figure 30:
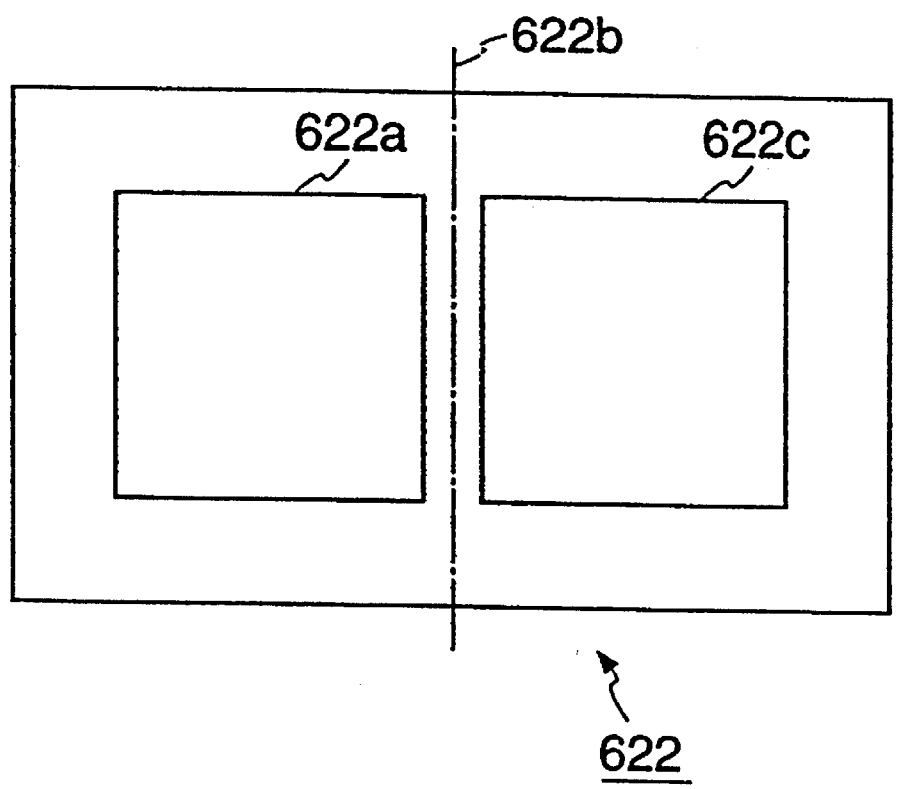
FIG. 30 is a view showing the light-receiving surfaces of a two-split photodiode of the 12th embodiment.

The two-split photodiode 622 has a pair of right and left light-receiving surfaces 622a and 622c, as shown in FIG. 30. An image of the light intensity distribution at the end face 602a of the trunk channel optical waveguide is formed on the light-receiving surfaces 622a and 622c, and a boundary 622b between the two light-receiving surfaces is arranged to match the center of an end face image of the trunk channel optical waveguide 602.

Illumination light of x-polarization emitted by the main light source 610 propagates along the central branch channel optical waveguide 605 and the trunk channel optical waveguide 602, and emerges from the end face 602a of the trunk channel optical waveguide. Since the trunk channel optical waveguide 602 serves as a single-mode optical waveguide for x-polarized light, the intensity distribution of the illumination light at the end face 602a of the trunk channel optical waveguide can be prevented from offsetting even when the central branch channel optical waveguide 605 and the trunk channel optical waveguide 602 are not strictly coaxially connected to each other.

The illumination light of x-polarization emerging from the end face 602a of the trunk channel optical waveguide is converted into circularly polarized light when it is transmitted through the quarter-wave plate 619. Some light components of the illumination light are transmitted through the calibration light exit beam splitter 620, and the remaining light components are reflected by the beam splitter 620. The illumination light reflected by the beam splitter 620 is focused on the two-split photodiode 622 by the focusing lens 621. In this case, since the illumination light does not suffer any offset, the calibration differential signal $S_C$ based on the illumination light is 0. The illumination light transmitted through the beam splitter 620 is transmitted through the two-dimensional scanner 613, so that its optical path is deflected in a direction perpendicular to the propagating direction. Thereafter, the illumination light is focused on the object 615 to be detected by the focusing optical system 614, and is reflected by the object 615 to be detected.

The light reflected by the object 615 to be detected is converted into circularly polarized light of rotation opposite to that in the forward optical path, and propagates along the forward optical path in the opposite direction. The reflected light is converted into polarized light in a direction perpendicular to that in the forward optical path, i.e., z-polarized light when it is transmitted through the quarter-wave plate 619. The converted light is focused on the end face 602a of the trunk channel optical waveguide, and is incident into the trunk channel optical waveguide 602. Since the trunk channel optical waveguide 602 serves as a double-mode optical waveguide for z-polarized light, 1st-mode light is excited in the trunk channel optical waveguide 602 in addition to 0th-mode light in correspondence with the slope of the reflection surface of the object 615 to be detected or the gradient of the reflectance, and the intensity distribution of the light propagating along the trunk channel optical waveguide 602 shifts to the right and left in a zigzag pattern upon interference between the two mode light beams.

The reflected light propagating along the trunk channel optical waveguide 602 is branched into the respective branch channel optical waveguides. Of these branched light beams, the light beam propagating along the right branch channel optical waveguide 604 is detected by the right photodetector 612. On the other hand, the light beam propagating along the left branch channel optical waveguide 603 is transmitted through the focusing lens 616 and the calibration light entrance beam splitter 617, and is focused on the left photodetector 611. The output signal from the left photodetector 611 is amplified by the amplifier 634 to compensate for an intensity loss generated upon transmission through the beam splitter 617. The difference between the outputs from the right photodetector 612 and the amplifier 634 is calculated by the main differential amplifier 632. The controller 630 synthesizes a differential image of the object 615 to be detected based on the main differential signal $S_M$, and displays the image on the monitor 633.

On the other hand, calibration light of z-polarization emitted by the calibration light source 618 is reflected by the calibration light entrance beam splitter 617, is focused by the focusing lens 616, and is incident into the left branch channel optical waveguide 603. Furthermore, the calibration light propagates along the left branch channel optical waveguide 603, and is incident into the trunk channel optical waveguide 602 via the branching portion 606. The left branch channel optical waveguide 603 and the trunk channel optical waveguide 602 are not coaxially arranged, and the trunk channel optical waveguide 602 serves as a double-mode optical waveguide for z-polarized light. For these reasons, 1st-mode light is excited in the trunk channel optical waveguide 602 in addition to 0th-mode light, and the intensity distribution of the calibration light which propagates along the trunk channel optical waveguide 602 shifts to the right and left in a zigzag pattern upon interference between the two mode light beams.

The calibration light of z-polarization emerging from the end face 602a of the trunk channel optical waveguide is converted into circularly polarized light of reverse rotation when it is transmitted through the quarter-wave plate 619. Some light components of the calibration light are transmitted through the calibration light exit beam splitter 620, and the remaining light components are reflected by the beam splitter 620. The calibration light transmitted through the beam splitter 620 is reflected by the object 615 to be detected, and is converted into circularly polarized light of forward rotation. The converted light propagates along the forward optical path in the opposite direction, and is converted into x-polarized light when it is transmitted through the quarter-wave plate 619. The converted light is then incident into the trunk channel optical waveguide 602. Since the trunk channel optical waveguide 602 serves as a single-mode optical waveguide for x-polarized light, no 1st-mode light is excited. In addition, since the right and left branch channel optical waveguides 604 and 603 do not serve as optical waveguides for x-polarized light, the main differential signal $S_M$ based on the calibration light is zero. On the other hand, the calibration light reflected by the beam splitter 620 is focused on the two-split photodiode 622 by the focusing lens 621, and its intensity distribution is obtained as a calibration differential signal $S_C$.

Figure 31A:
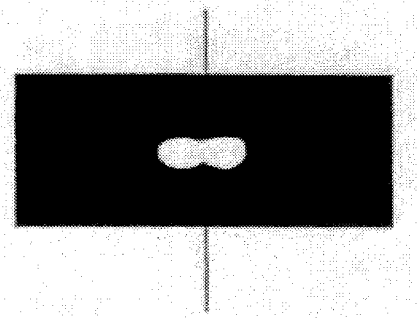
FIG. 31A is a view showing an image on the light-receiving surfaces upon observation of a phase object.
Figure 31B:
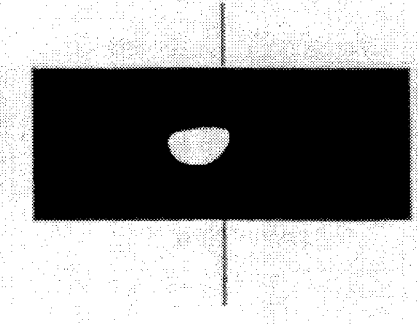
FIG. 31B is a view showing an image on the light-receiving surfaces upon observation of an amplitude object.

When the length of the trunk channel optical waveguide 602 is an integer multiple of the coupling length, i.e., when equation (6) is satisfied, since the calibration light in the trunk channel optical waveguide 602 shifts most to the right or left in a zigzag pattern, the intensity distribution on the light-receiving surfaces 622a and 622c of the two-split photodiode 622 shifts most to the right or left, as shown in FIG. 31B. On the other hand, when the length of the trunk channel optical waveguide 602 is larger or smaller than the length given by equation (6) by a length half the coupling length, i.e., when equation (5) is satisfied, since the calibration light in the trunk channel optical waveguide 602 is located at the center in the right-and-left direction, the intensity distribution on the light-receiving surfaces 622a and 622c of the two-split photodiode 622 is uniformly distributed to the right and left, as shown in FIG. 31A.

Figure 32:
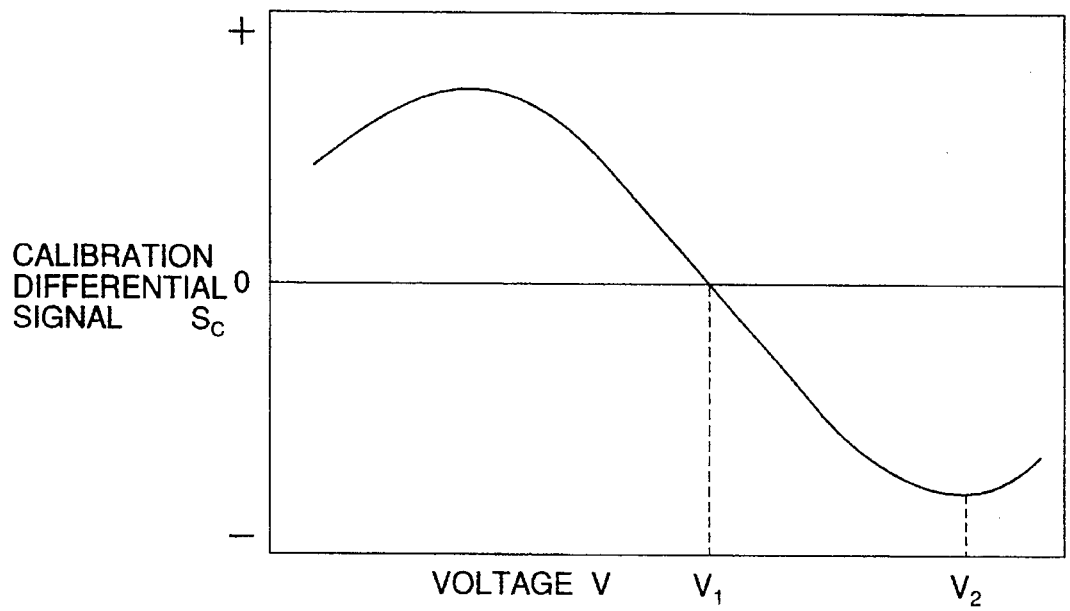
FIG. 32 is a graph showing the relationship between the voltage to be applied to electrodes and the calibration differential signal.

Therefore, when the coupling length of the trunk channel optical waveguide 602 is changed by changing the voltage V to be applied from the voltage application unit 631 to the electrodes 607a and 607b, the calibration differential signal $S_C$ also changes, as shown in FIG. 32. Referring to FIG. 32, equation (5) is satisfied when the calibration differential signal $S_C$ becomes zero, i.e., the voltage V becomes $V_1$. At this time, the main differential signal $S_M$ detects the phase information of the object 615 to be detected. On the other hand, equation (6) is satisfied when the calibration differential signal $S_C$ has a peak value, i.e., the voltage V becomes $V_2$. At this time, the main differential signal $S_M$ detects the amplitude information of the object 615 to be detected. Since these relationships are independent from the presence/absence of a DC drift, the influence of the DC drift can be eliminated using the calibration differential signal $S_C$.

Figure 33A:
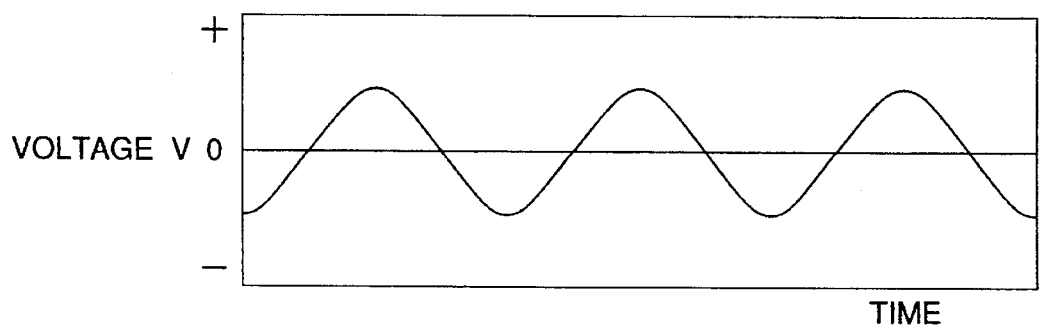
FIG. 33A and 33B are charts respectively showing changes over time in voltage to be applied to the electrodes and in calibration differential signal.
Figure 33B:
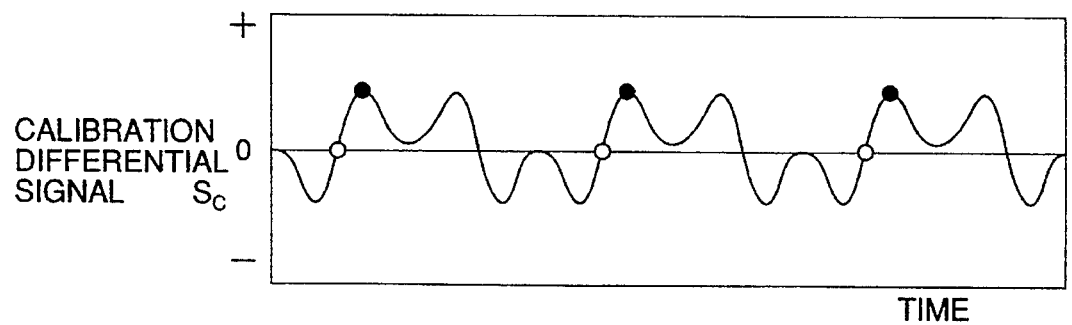

In this embodiment as well, an AC voltage whose polarity changes along with an elapse of time is used as the voltage V to be applied to the electrodes 607a and 607b, as in the 11th embodiment. FIGS. 33A and 33B show another relationship between the voltage V and the calibration differential signal $S_C$. In FIGS. 33A and 33B, open circles represent the data pickup timings when the calibration differential signal $S_C$ assumes zero, i.e., when a phase object is to be observed, and full circles represent the data pickup timings when the calibration differential signal $S_C$ assumes a peak value, i.e., when an amplitude object is to be observed. As described above, according to the 12th embodiment, since the polarity of the voltage V is inverted along with an elapse of time, generation of a DC drift can be suppressed, and required information can be obtained without knowing the prescribed value $V_P$ of a voltage, which is required in the 11th embodiment.

Figure 34A:
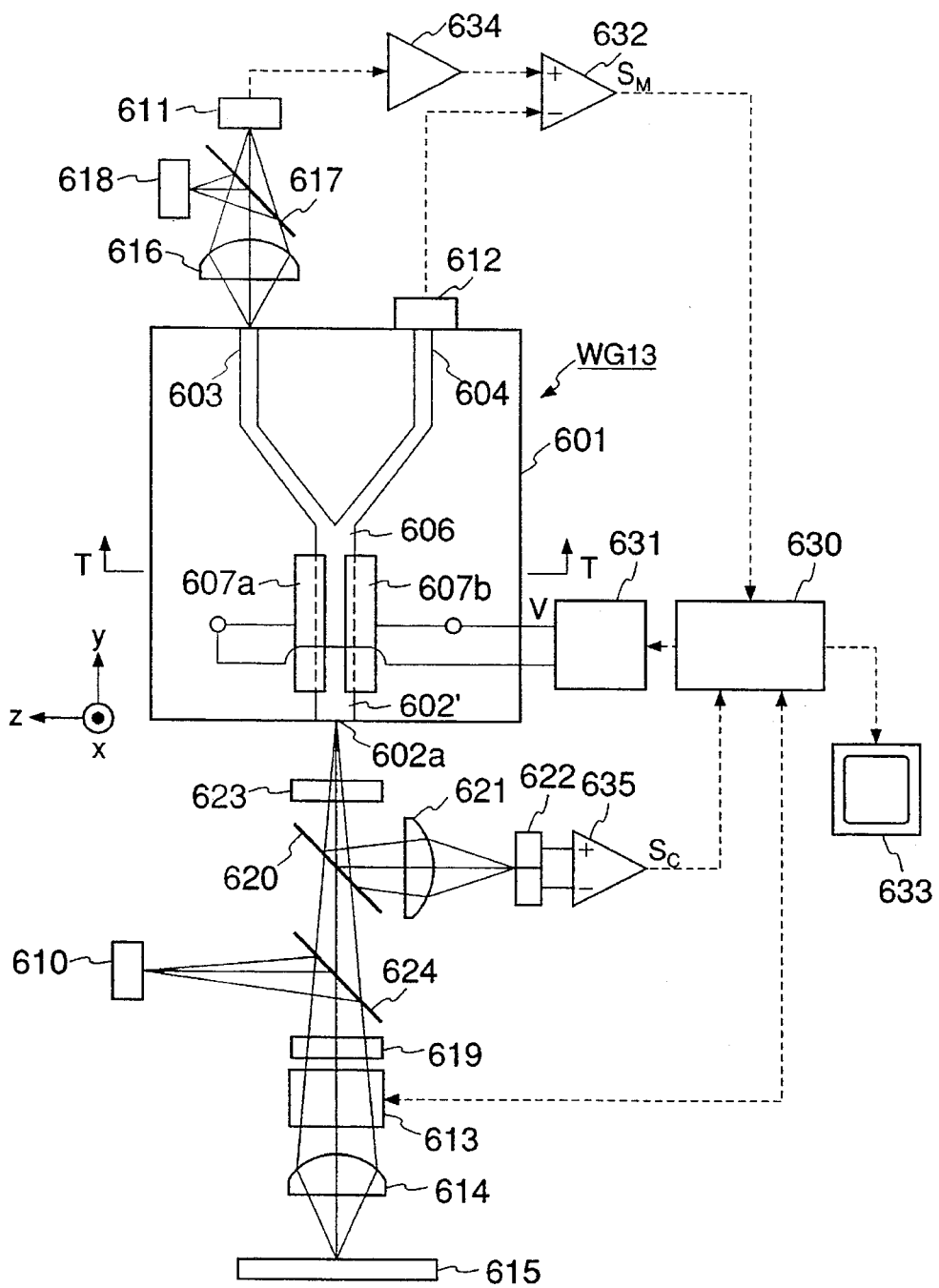
FIG. 34A is a schematic diagram showing a mode interference type laser scanning microscope according to the 13th embodiment of the present invention.
Figure 34B:
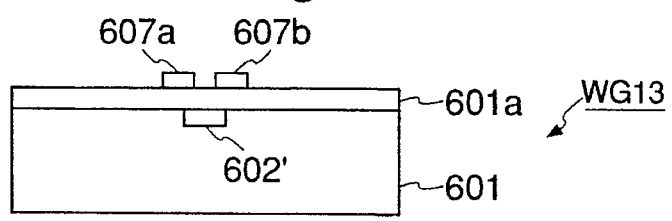
FIG. 34B is a sectional view of an optical branching device in FIG. 34A taken along arrows T—T in FIG. 34A.

FIGS. 34A and 34B show a mode interference type laser scanning microscope according to the 13th embodiment of the present invention. Note that the same reference numerals in FIGS. 34A and 34B denote the same parts as in FIGS. 29A to 29C. An optical branching device WG13 comprises a double-mode waveguide 602' formed on a predetermined region of a substrate 601, and single-mode waveguides 603 and 604 connected to the double-mode waveguide 602' via a branching portion 606. The waveguides 602', 603, and 604 consist of proton-exchanged $LiNbO_3$. In this embodiment, the central branch channel optical waveguide 605 in FIG. 29A is omitted. A polarizing plate (polarizer) 623, a calibration light exit beam splitter 620, an illumination light entrance beam splitter 624, a quarter-wave plate 619, a two-dimensional scanner 613, and a focusing optical system 614 are inserted in the order named between an end face 602a of the trunk channel optical waveguide 602' and an object 615 to be detected. The polarizing plate 623 is arranged to cut x-polarized light and to pass z-polarized light, and the illumination light entrance beam splitter 624 receives illumination light of x-polarization from a main light source 610. According to this arrangement, since illumination light does not pass the respective channel optical waveguides, the intensity distribution of the illumination light can be perfectly prevented from offsetting. Since calibration light of x-polarization, which is reflected by the object 615 to be detected, and propagates toward the trunk channel optical waveguide 602', is cut by the polarizing plate 623, the main differential signal $S_M$ based on the calibration light can be perfectly set to be zero.

When the beam splitter 624 comprises a polarization beam splitter, the amount of light lost in the beam splitter 624 can be reduced.

In this embodiment as well, an AC voltage V is applied to the electrodes 607a and 607b, and hence, generation of a DC drift can be eliminated.

In this device, the mode interference type laser scanning microscope has been exemplified. However, the present invention is not limited to the microscope, but may be applied to any other apparatuses as long as they have a double-mode optical waveguide, two branch optical waveguides, and means for applying an electric field to the double-mode optical waveguide.

In this device, the pair of electrodes 607a and 607b are arranged on the two sides of the trunk channel optical waveguide 602'. However, the above-mentioned arrangement of the electrodes 607a and 607b is not always the best depending on, e.g., the directions of the crystallographic axes of the substrate 601, and the like, and the electrodes need only be arranged to generate an electric field so as to change the coupling length $L_C$ of the trunk channel optical waveguide 602'. In this device, the light spot is scanned on the object 615 to be detected using the X-Y two-dimensional scanner 613 such as a vibration mirror, a rotary mirror, or the like. However, a scanning device need only move the light spot relative to the object 615 to be detected. For this reason, the light spot may be fixed in position, and the stage on which the object 615 to be detected is placed may be scanned.

Furthermore, in the 12th and 13th embodiments, the calibration light entrance beam splitter 617 is used for splitting light incident from the calibration light source 618 into the left branch channel optical waveguide 603 and light emerging from the left branch channel optical waveguide 603 to the left photodetector 611. In place of the calibration light entrance beam splitter, an optical waveguide type power distributor such as a Y-split optical waveguide, a directional coupler, or the like may be formed on the substrate 601 to be connected to the left branch channel optical waveguide 603. In the 12th and 13th embodiments, the two-split photodiode 622 is used. In place of the two-split photodiode, a PSD, linear sensor, CCD camera, or the like may be used.

As described above, according to the present invention, since an AC voltage whose polarity is inverted along with an elapse of time is used as a voltage to be applied to the trunk channel optical waveguide for guiding light in double modes, generation of a DC drift can be suppressed. Therefore, an optical information detection device and a mode interference type laser scanning microscope, which can maintain high detection accuracy can be provided.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 6-107091 (107091/1994) filed on May 20, 1994; 7-070677 (070677/1995) filed on Mar. 3, 1995; and 7-070676 (070676/1995) filed on Mar. 3, 1995 are hereby incorporated by reference.

What is claimed is:

1. A system for detecting an optical information, comprising:
    an optical branching device having:
        a trunk channel waveguide with a changeable coupling length, wherein first light including the optical information is introduced into said trunk channel waveguide through an end face of said trunk channel waveguide, and
        at least two branch channel waveguides connected to said trunk channel waveguide;
    a first photodetector and a second photodetector for respectively detecting lights passing through said branch channel waveguides to detect the optical information;
    a light source for emitting second light into one of said branch channel waveguides;
    a third photodetector for detecting a light intensity distribution formed on the end face of the trunk channel waveguide based on the second light.

2. A system according to claim 1, wherein said trunk channel waveguide has the characteristic that 0th-mode light and 1st-mode light or only 0th-mode light is transmittable in said trunk channel waveguide.

3. A system according to claim 1, wherein said system is a mode interference type laser scanning microscope which detects the surface information of an object by detecting the first light reflected by the object with said first and second photodetectors.

4. A system according to claim 1, further comprising a first light source for emitting the first light onto an object.

5. A system according to claim 1, further comprising:
    at least two electrodes formed nearby said trunk channel waveguide, for changing the coupling length of said trunk channel waveguide;
    a buffer layer disposed between said trunk channel waveguide and said electrodes;
    a voltage application unit for applying a predetermined voltage between said electrodes; and
    a controller for controlling the voltage to be applied from the voltage application unit to said electrodes in accordance with the output signal from said third photodetector.

6. A system according to claim 3, further comprising a central branch channel waveguide which is arranged between said branch channel waveguides, wherein the first light is emitted onto the object through said central branch channel waveguide and said trunk channel waveguide in a single mode.

7. A system according to claim 3,
    wherein said trunk channel waveguide is comprised of a material having refractive index anisotropy to serve as a single-mode channel waveguide for linearly polarized light in a first direction of polarization and to serve as a double-mode channel waveguide for linearly polarized light in a second direction of polarization;
    wherein the first light emitted onto the object through said trunk channel waveguide is linearly polarized light in the first direction; and
    wherein the second light is linearly polarized light in the second direction.

8. A system according to claim 7, further comprising:
    a central branch channel waveguide which is arranged between said branch channel waveguides, wherein the first light is emitted onto the object through said central branch channel waveguide and said trunk channel waveguide in a single mode, and wherein said central branch channel waveguide and said trunk channel waveguide guide the first light; and
    a polarization conversion member for converting the direction of polarization of light passing therethrough, being arranged between said trunk channel waveguide and the object.

9. A system according to claim 8, further comprising:
    a first light source for emitting the first light into the central branch channel waveguide; and
    a return light prevention member on said central branch channel waveguide, for preventing light in the second direction of polarization from propagating along said central branch channel waveguide and becoming incident on said first light source.

10. A system according to claim 1, wherein said trunk channel waveguide is comprised of a material serves as a cladding portion for light polarized in the second direction, and serves as a core portion for light polarized in the first direction.

11. A system according to claim 1, comprises a power distributor connected to one of the two branch channel waveguides.

12. A system according to claim 11, wherein said power distributor is a directional coupler.

13. A system according to claim 1, wherein said trunk channel waveguide is formed in an $LiNbO_3$ single crystal; and wherein said trunk channel waveguide is comprised of a transition metal-diffused $LiNbO_3$ single crystal, and a proton-exchanged $LiNbO_3$ single crystal.

14. A system according to claim 5, wherein said controller controls the voltage to be applied from said voltage application unit to the electrodes in correspondence with a change in signal from said third photodetector.

15. A system according to claim 1,
at least two electrodes formed on said trunk channel waveguide, for changing the coupling length of said trunk channel waveguide;
a voltage application unit for applying a voltage obtained by superposing an AC voltage on a DC voltage between said electrodes,
a first low-pass filter to which the output signal from said first photodetector is input;
a second low-pass filter to which the output signal from said second photodetector is input;
a first differential amplifier to which the output signals from said first and second low-pass filters are input;
a second differential amplifier to which the output signal from said third photodetector is input;
a first band-pass filter to which the output signal from said second differential amplifier is input;
a controller for controlling the DC voltage on the basis of the output signal from the band-pass filter and detects the information included in the first light on the basis of the output signal from the first differential amplifier.

16. A system according to claim 15, further comprising a second band-pass filter to which the output signal from said second differential amplifier is input.

17. A system according to claim 16, wherein the output signal form said second differential amplifier is alternatively input to one of said first and second band-pass filters.

18. A system according to claim 1, said third photodetector has two light receiving regions isolated each other.

19. A system according to claim 1, further comprising:
at least two electrodes formed nearby said trunk channel waveguide, for changing the coupling length of said trunk channel waveguide; and
a voltage application unit for applying an AC voltage between said electrodes.

20. A system according to claim 19, further comprising a controller for picking up the output signals from said first and second photodetectors in synchronism with a timing at which the AC voltage becomes equal to a prescribed value.

21. A system according to claim 19, further comprising a controller for picking up the output signals from said first and second photodetectors in synchronism with a timing at which the output signal from said third photodetector becomes a predetermined value.

22. A system according to claim 1, further comprising a heater formed on said trunk channel waveguide.

23. A system according to claim 1, further comprising an optical fiber for optically connecting said second photodetector with one of said branch channel waveguides.

24. A system for detecting an optical information, comprising:
a waveguide with a changeable coupling length, wherein first light including the optical information is introduced into said waveguide through an end face thereof;
at least two electrodes formed nearby said waveguide, for changing the coupling length of said waveguide; and
a voltage application unit for applying an AC voltage between said electrodes.

25. A system according to claim 24, further comprising:
first and second photodetectors for detecting light passing through said waveguide to detect the optical information;
a controller for picking up the output signals from said first and second photodetectors in synchronism with a timing at which the AC voltage becomes equal to a predetermined value.

* * * * *